(12) United States Patent
Yi et al.

(10) Patent No.: US 12,082,201 B2
(45) Date of Patent: Sep. 3, 2024

(54) WIRELESS COMMUNICATIONS AND CONTROL INFORMATION TRANSMISSION/RECEPTION

(71) Applicant: Comcast Cable Communications, LLC, Philadelphia, PA (US)

(72) Inventors: Yunjung Yi, Vienna, VA (US); Esmael Dinan, McLean, VA (US); Hua Zhou, Herndon, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 190 days.

(21) Appl. No.: 16/898,817

(22) Filed: Jun. 11, 2020

(65) Prior Publication Data

US 2020/0396760 A1 Dec. 17, 2020

Related U.S. Application Data

(60) Provisional application No. 62/860,111, filed on Jun. 11, 2019.

(51) Int. Cl.
*H04W 72/20* (2023.01)
*H04L 1/1812* (2023.01)
*H04W 72/23* (2023.01)

(52) U.S. Cl.
CPC ........... *H04W 72/23* (2023.01); *H04L 1/1812* (2013.01)

(58) Field of Classification Search
CPC ........... H04W 72/1289; H04W 72/042; H04W 72/0493; H04W 72/0453; H04W 72/0446; H04L 1/1812; H04L 1/1864
See application file for complete search history.

(56) References Cited

U.S. PATENT DOCUMENTS

| | | | |
|---|---|---|---|
| 9,628,227 B2 * | 4/2017 | Aiba | H04L 5/0053 |
| 10,306,669 B2 * | 5/2019 | Koorapaty | H04L 1/1854 |
| 10,420,165 B2 | 9/2019 | Dinan et al. | |
| 2018/0092070 A1 | 3/2018 | Liao et al. | |
| 2019/0306838 A1 | 10/2019 | Hui et al. | |
| 2019/0380143 A1 * | 12/2019 | Zhang | H04W 72/23 |
| 2019/0393987 A1 | 12/2019 | Hong et al. | |

(Continued)

FOREIGN PATENT DOCUMENTS

| | | |
|---|---|---|
| EP | 2750429 A1 | 7/2014 |
| WO | 2018108247 A1 | 6/2018 |

OTHER PUBLICATIONS

R1-1701588 3GPP TSG RAN WG1 Meeting #88, Athens, Greece, Feb. 13-17, 2017, Source: ZTE, ZTE Microelectronics, Title: PDCCH procedure and DCI carried by PDSCH region.

(Continued)

*Primary Examiner* — Hanh N Nguyen

(74) *Attorney, Agent, or Firm* — Banner & Witcoff, Ltd.

(57) ABSTRACT

Wireless communications for control information are described. A base station may send control information to a wireless device for data scheduling and/or other operations. A portion of the control information may not be received/decoded by the wireless device and/or may not be sent by the base station. A wireless device may be configured to use a first portion of the control information for various operations such as for receiving data, for example, even if a second portion of the control information is not successfully received/decoded.

20 Claims, 35 Drawing Sheets

(56) References Cited

U.S. PATENT DOCUMENTS

| | | | | |
|---|---|---|---|---|
| 2020/0107400 | A1* | 4/2020 | Sun | H04B 7/024 |
| 2022/0039100 | A1* | 2/2022 | Yoshioka | H04W 72/543 |
| 2022/0256543 | A1* | 8/2022 | Tian | H04L 1/1819 |
| 2023/0128411 | A1* | 4/2023 | Lee | H04L 5/0092 |
| | | | | 370/329 |

OTHER PUBLICATIONS

R1-1702581 3GPP TSG RAN WG1 Meeting #88, Athens, Greece, Feb. 13-17, 2017, Source: LG Electronics, Title: Discussion on DCI design.

Nov. 5, 2020—European Search Report—EP 20179488.0.

3GPP TS 38.213 V15.5.0 (Mar. 2019), Technical Specification, 3rd Generation Partnership Project; Technical Specification Group Radio Access Network; NR; Physical layer procedures for control (Release 15).

3GPP TS 38.331 V15.4.0 (Dec. 2018), Technical Specification, 3rd Generation Partnership Project; Technical Specification Group Radio Access Network; NR; Radio Resource Control (RRC) protocol specification (Release 15).

R1-1905995 3GPP TSG RAN WG1 Meeting #97, Reno, USA, May 13-17, 2019, Source: Huawei, HiSilicon, Title: Discussion on HARQ for NTN.

R1-1906088 3GPP TSG RAN WG1 Meeting #97, Reno, USA, May 13-17, 2019, Source: Nokia, Nokia Shanghai Bell, Title: Consideration on HARQ in NTN.

R1-1906265 3GPP TSG RAN WG1 Meeting #97, Reno, USA, May 13-17, 2019, Source: Panasonic, Title: Discussion on Retransmission Mechanisms for NTN.

R1-1906326 3GPP TSG RAN WG1 Meeting #97, Reno, USA, May 13-17, 2019, Source: CATT, Title: HARQ consideration for NTN.

R1-1906386 3GPP TSG RAN WG1 Meeting #97, Reno, USA, May 13-17, 2019, Source: OPPO, Title: Delay-tolerant HARQ operation for NTN.

R1-1906466 3GPP TSG RAN WG1 Meeting #97, Reno, USA, May 13-17, 2019, Source: MediaTek Inc., Title: Delay-tolerant retransmission mechanisms in NR-NTN.

R1-1906805 3GPP TSG RAN WG1 Meeting #97, Reno, USA, May 13-17, 2019, Source: Intel Corporation, Title: Discussion on HARQ for NTN.

R1-1906873 3GPP TSG RAN WG1 Meeting #97, Reno, USA, May 13-17, 2019, Source: ZTE, Title: Discussion on the HARQ procedure for NTN.

R1-1906954 3GPP TSG RAN WG1 Meeting #97, Reno, USA, May 13-17, 2019, Source: Samsung, Title: HARQ procedure in NTN.

R1-1907279 3GPP TSG RAN WG1 Meeting #97, Reno, USA, May 13-17, 2019, Source: Qualcomm Incorporated, Title: Delay-Tolerant Retransmission Mechanisms for NTN.

R1-1907392 3GPP TSG RAN WG1 Meeting #97, Reno, USA, May 13-17, 2019, Source: Ericsson, Title: On adapting HARQ procedures for NTN.

* cited by examiner

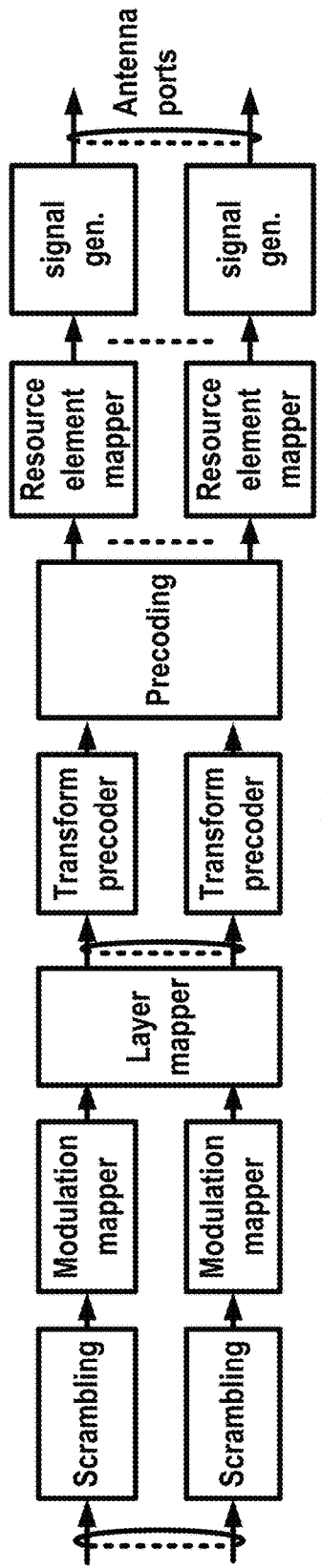
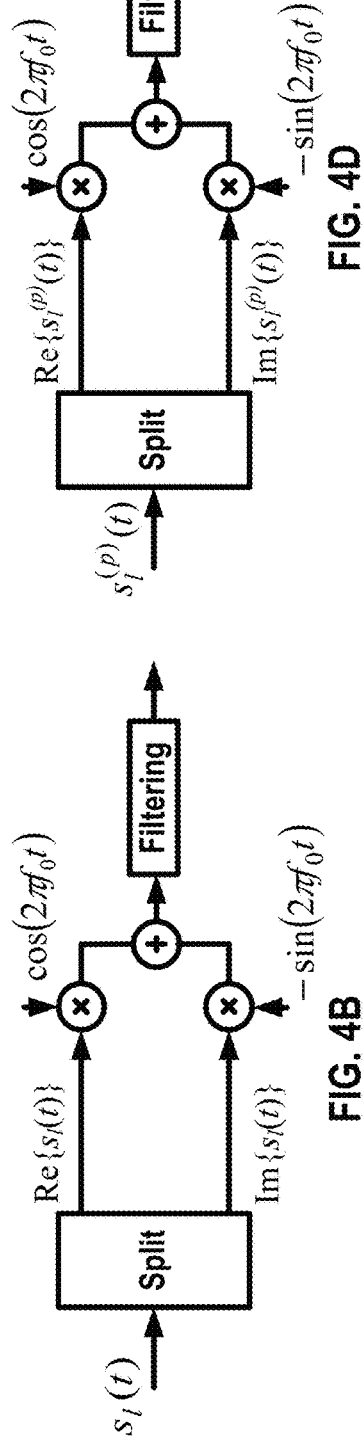
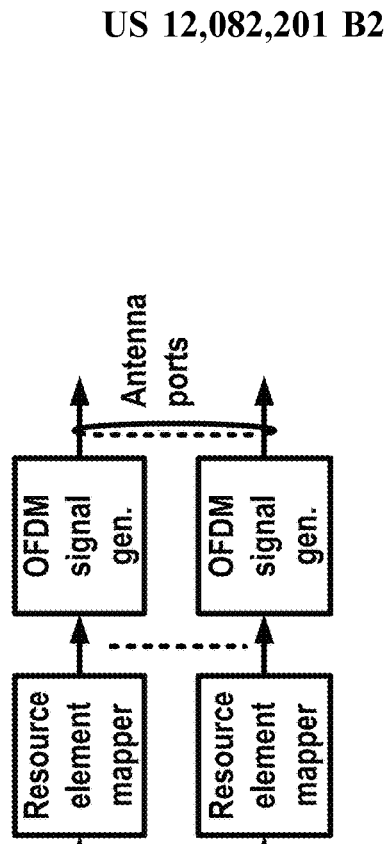
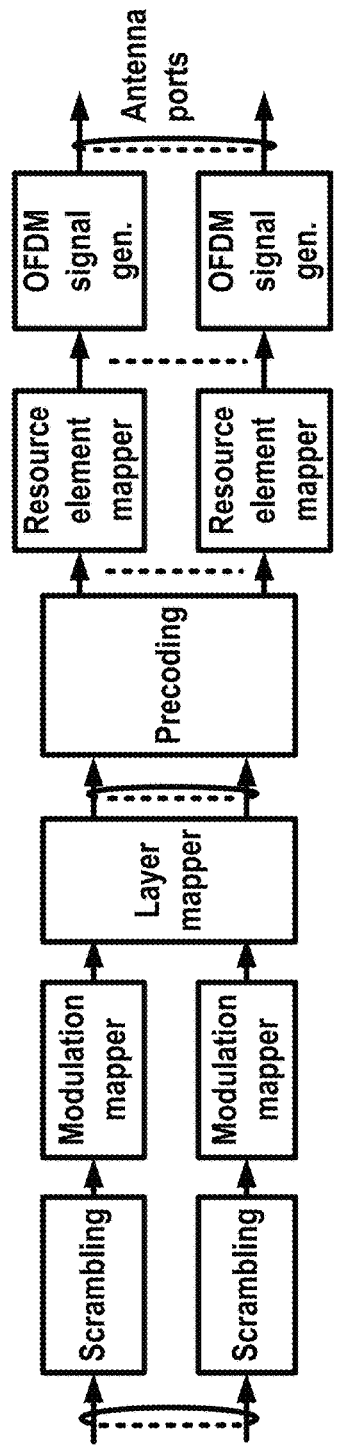
FIG. 4A
FIG. 4B
FIG. 4D
FIG. 4C

DL Scheduling DCI format 1804 (e.g., DCI format 1_4)

First level DCI 1804-1:
- DCI format Indicator
- Carrier indicator
- BWP ID
- Frequency Domain Resource Allocation
- Time Domain Resource Allocation
- 1st TB MCS
- 1st TB NDI
- 1st TB RV
- HARQ
- Antenna ports
- TCI
- CBG Second level DCI 1804-2:
- VRB-to-PRB
- PRB bundling size
- Rate matching indicator
- ZP-CSI trigger
- 2nd TB MCS
- 2nd TB NDI
- 2nd TB RV
- DAI
- TPC
- PUCCH ARI
- HARQ feedback timing
- SRS Request
- Puncturing Indication
- Transform precoder

FIG. 18

UL Scheduling DCI format 1904 (e.g., DCI format 0_4)

First level DCI 1904-1:
- DCI format Indicator
- Carrier indicator
- UL/SUL indicator
- BWP ID
- Frequency Domain Resource Allocation
- Time Domain Resource Allocation
- MCS
- NDI
- RV
- HARQ
- SRI
- Precoding information
- Antenna ports Second level DCI 1904-2:
- Frequency Hopping
- 1st DAI
- 2nd DAI
- TPC
- CSI request
- PTRS-DMRS association
- beta offset
- Transform precoder
- UL-SCH indicator

FIG. 19

| sub-DCI format 3004-1 |
|---|
| DCI format Indicator |
| Carrier indicator |
| BWP Id |
| Frequency Domain Resource Allocation |
| Time Domain Resource Allocation |
| 1st TB MCS |
| 1st TB NDI |
| 1st TB RV |
| HARQ |
| Antenna ports |
| TCI |
| CBG |

| sub-DCI format 3004-2 |
|---|
| DCI format Indicator |
| Carrier indicator |
| BWP Id |
| Frequency Domain Resource Allocation |
| Time Domain Resource Allocation |
| 1st TB MCS |
| 1st TB NDI |
| 1st TB RV |
| HARQ |
| TPC |
| PUCCH ARI |
| HARQ feedback timing |
| SRS Request |

| sub-DCI format 3004-3 |
|---|
| DCI format Indicator |
| Carrier indicator |
| BWP Id |
| VRB-to-PRB |
| PRB bundling size |
| Rate matching indicator |
| ZP-CSI trigger |
| DAI |
| TPC |
| PUCCH ARI |
| HARQ feedback timing |
| SRS Request |
| Puncturing Indication |
| Transform precoder |

Second-stage DCI sub-DCI format 3104-3: VRB-to-PRB | PRB bundling size | Rate matching indicator | ZP-CSI trigger | 2nd TB MCS | 2nd TB NDI | 2nd TB RV | DAI | TPC | PUCCH ARI | HARQ feedback timing | SRS Request | Puncturing Indication | Transform precoder sub-DCI format 3104-2: VRB-to-PRB | PRB bundling size | Rate matching indicator | ZP-CSI trigger | DAI | TPC | PUCCH ARI | HARQ feedback timing | SRS Request sub-DCI format 3104-1: 2nd TB MCS | 2nd TB NDI | 2nd TB RV | DAI | TPC

WIRELESS COMMUNICATIONS AND CONTROL INFORMATION TRANSMISSION/RECEPTION

CROSS-REFERENCE TO RELATED APPLICATIONS

This application claims the benefit of U.S. Provisional Application No. 62/860,111, filed on Jun. 11, 2019. The above-referenced application is hereby incorporated by reference in its entirety.

BACKGROUND

Base stations and wireless devices send and receive a variety of messages, include control information for configuring communications.

SUMMARY

The following summary presents a simplified summary of certain features. The summary is not an extensive overview and is not intended to identify key or critical elements.

Wireless communications and transmission/reception of control information are described. Control information may be used to schedule transmissions, such as downlink transmissions, uplink transmissions, sidelink transmissions, and/or any other transmissions. The control information may be sent via multiple stages. For example, control information may be sent in a first portion (e.g., first-stage) comprising a first type of information (e.g., downlink data, high priority data/information and/or service, low latency data/information and/or service, etc.) and a second portion comprising a second type of information (e.g., acknowledgments, low priority data/information and/or service, etc.). A node (e.g., a base station) may perform various operations such as skipping transmission of a portion of control information, sending an indication that other control information (e.g., sent in configuration messages and/or prior control messages) may be used by another node (e.g., a wireless device), and/or dynamically selecting a control information format. A wireless device may perform first operations (e.g., required wireless device operations, high priority operations, etc.) based on receiving the first portion of the control information. The wireless device may perform these first operations, for example, even if the wireless device may not receive the second portion (or other portions) of the control information. The wireless device may use configured default settings and/or may perform configured default operations, for example, if the wireless device does not receive at least a portion of the control information. Examples described herein may provide advantages such as more efficient control information signaling, increased reliability of wireless communications, and/or reduced transmission latencies.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 4A, FIG. 4B, FIG. 4C, and FIG. 4D show examples of uplink and downlink signal transmission.

FIG. 18 shows an example downlink scheduling DCI format.

FIG. 19 shows an example of an uplink scheduling multiple-stage DCI format for an uplink scheduling DCI.

FIG. 30 shows an example of different sub-DCI formats.

FIG. 31 shows example DCI fields in second-stage DCI corresponding to different sub-DCI formats.

DETAILED DESCRIPTION

Figure 1:
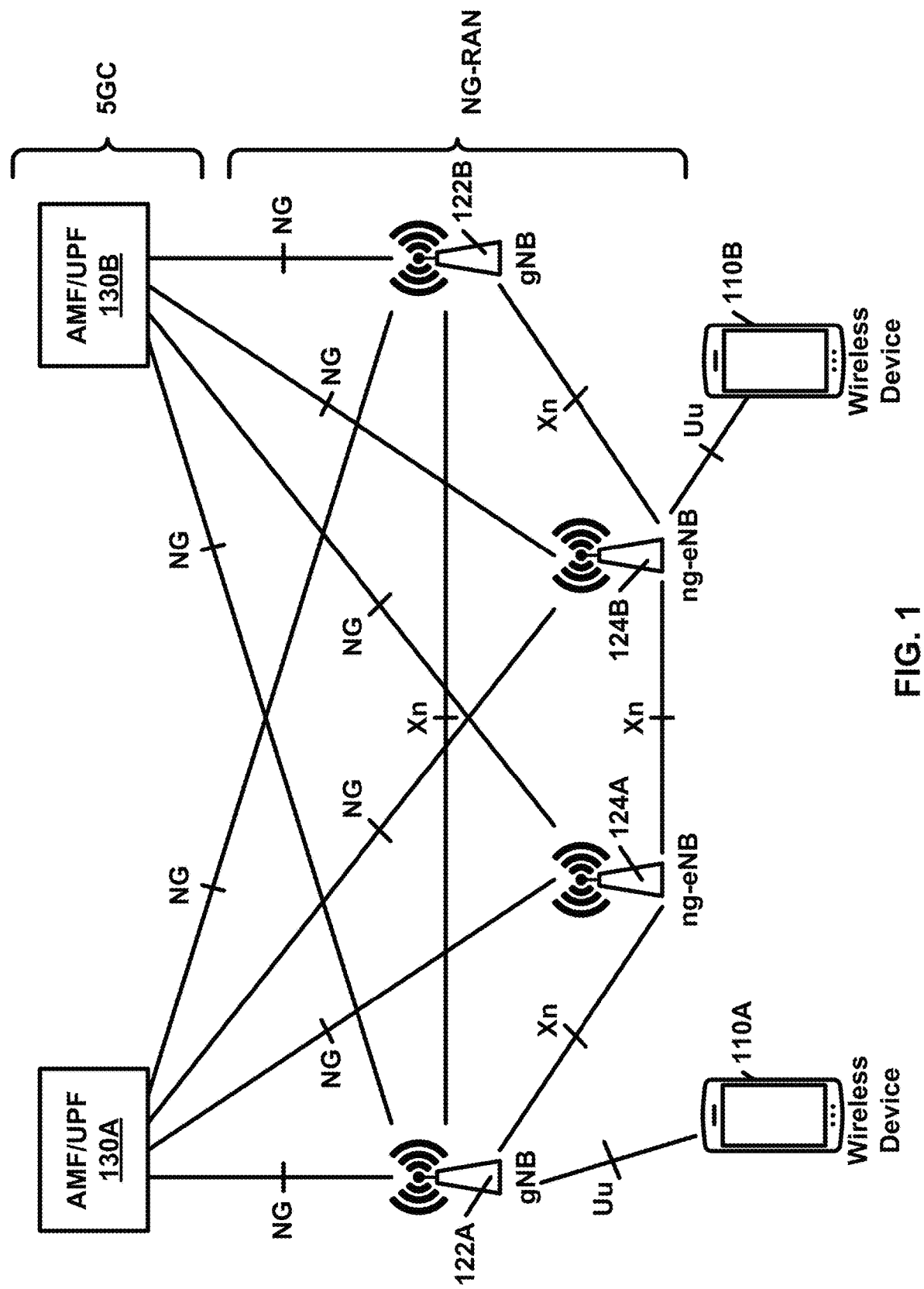
FIG. 1 shows an example radio access network (RAN) architecture.

The accompanying drawings and descriptions provide examples. It is to be understood that the examples shown in the drawings and/or described are non-exclusive and that there are other examples of how features shown and described may be practiced.

Examples are provided for operation of wireless communication systems which may be used in the technical field of multicarrier communication systems. More particularly, the embodiments of the technology disclosed herein may relate to transmission and reception of control information for wireless communications.

The following acronyms are used throughout the drawings and/or descriptions, and are provided below for convenience although other acronyms may be introduced in the detailed description:

3GPP 3rd Generation Partnership Project
5GC 5G Core Network
ACK Acknowledgement
AMF Access and Mobility Management Function
ARI Acknowledgment Resource Indicator
ARQ Automatic Repeat Request
AS Access Stratum
ASIC Application-Specific Integrated Circuit
BA Bandwidth Adaptation
BCCH Broadcast Control Channel
BCH Broadcast Channel
BFR Beam Failure Recovery
BLER Block Error Rate
BPSK Binary Phase Shift Keying
BWP Bandwidth Part
CA Carrier Aggregation
CC Component Carrier
CCCH Common Control CHannel
CCE Control Channel Element
CDMA Code Division Multiple Access
CN Core Network
CORESET Control Resource Set
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CRC Cyclic Redundancy Check
CU Central Unit
DAI Downlink Assignment Index
DC Dual Connectivity
DCCH Dedicated Control Channel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic Channel
DU Distributed Unit
EPC Evolved Packet Core
EPS Evolved Packet System
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IMSI Internation Mobile Subscriber Identity
IP Internet Protocol
LCH Logical Channel
LCID Logical Channel Identifier
LTE Long Term Evolution
MAC Medium Access Control
MBMS Multimedia Broadcast Multicast Service
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NDI New Data Indicator
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM Orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PF Paging Frame
PHICH Physical HARQ Indicator CHannel
PHY PHYsical
PLMN Public Land Mobile Network
PMI Precoding Matrix Indicator
PO Paging Occasion
PRACH Physical Random Access CHannel
PRB Physical Resource Block
P-RNTI Paging Radio Network Temporary Identifier
PSCell Primary Secondary Cell
PSM Power Saving Mode
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QCLed Quasi-Co-Located
QCL Quasi-Co-Location
QFI Quality of Service Indicator
QoS Quality of Service QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RE Resource Element
RI Rank indicator
RLC Radio Link Control
RLM Radio Link Monitoring
RNTI Radio Network Temptorary Identifier
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SIM Subscriber Identity Module
SINR Signal-to-Interference-plus-Noise Ratio
SMF Session Management Function
SN Secondary Node
SpCell Special Cell
SPR Semi-Persistent Resource
SPS Semi-Persistent Scheduling
SR Scheduling Request
SRB Signaling Radio Bearer
SRS Sounding Reference Signal
SS Synchronization Signal
SSB Synchronization Signal Block
SSS Secondary Synchronization Signal
sTAG secondary Timing Advance Group
S-TMSI Serving Temporary Mobile Subscriber Identity
SUL Supplemental Uplink
TA Timing Advance
TAG Timing Advance Group
TAI Tracking Area Identifier
TAT Time Alignment Timer
TB Transport Block
TC-RNTI Temporary Cell-Radio Network Temporary Identifier
TCI Transmission Configuration Indication
TDD Time Division Duplex
TDMA Time Division Multiple Access
TPC Transmit Power Control
TRP Transmission and Receiving Point
TTI Transmission Time Interval
UCI Uplink Control Information
UE User Equipment
UL Uplink
UL-SCH Uplink Shared CHannel
UPF User Plane Function
UPGW User Plane Gateway
URLLC Ultra-Reliable Low-Latency Communication
USS UE-Specific Search Space
VHDL VHSIC Hardware Description Language
VRB Virtual Resource Block
V2X Vehicle-to-Everything
Xn-C Xn-Control plane
Xn-U Xn-User plane
ZP Zero Power Examples described herein may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and/or OFDM/CDMA may be used. Various modulation schemes may be used for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, 1024-QAM and/or the like. Physical radio transmission may be enhanced by dynamically or semi-dynamically changing the modulation and coding scheme, for example, depending on transmission requirements and/or radio conditions.

FIG. 1 shows an example Radio Access Network (RAN) architecture. A RAN node may comprise a next generation Node B (gNB) (e.g., 122A, 122B) providing New Radio (NR) user plane and control plane protocol terminations towards a first wireless device (e.g., 110A). A RAN node may comprise a base station such as a next generation evolved Node B (ng-eNB) (e.g., 124A, 124B), providing Evolved UMTS Terrestrial Radio Access (E-UTRA) user plane and control plane protocol terminations towards a second wireless device (e.g., 110B). A first wireless device 110A may communicate with a base station, such as a gNB 122A, over a Uu interface. A second wireless device 110B may communicate with a base station, such as an ng-eNB 124B, over a Uu interface. The wireless devices 110A and/or 110B may be structurally similar to wireless devices shown in and/or described in connection with other drawing figures. The Node B 122A, the Node B 122B, the Node B 124A, and/or the Node B 124B may be structurally similar to Nodes B and/or base stations shown in and/or described in connection with other drawing figures. Wireless device 110A and 110B may be structurally similar to wireless device 110. Base stations 122A and/or 122B may be structurally similarly to base station 120. Base station 120 may comprise at least one of a gNB (e.g. 122A and/or 122B), ng-eNB (e.g. 124A and/or 124B), and or the like A base station, such as a gNB (e.g., 122A, 122B, etc.) and/or an ng-eNB (e.g., 124A, 124B, etc.) may host functions such as: radio resource management and scheduling, IP header compression, encryption and integrity protection of data, selection of Access and Mobility Management Function (AMF) at wireless device (e.g., User Equipment (UE)) attachment, routing of user plane and control plane data, connection setup and release, scheduling and transmission of paging messages (e.g., originated from the AMF), scheduling and transmission of system broadcast information (e.g., originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in an inactive state (e.g., RRC_INACTIVE state), distribution function for Non-Access Stratum (NAS) messages, RAN sharing, dual connectivity, and/or tight interworking between NR and E-UTRA.

One or more first base stations (e.g., gNBs 122A and 122B) and/or one or more second base stations (e.g., ng-eNBs 124A and 124B) may be interconnected with each other via Xn interface. A first base station (e.g., gNB 122A, 122B, etc.) or a second base station (e.g., ng-eNB 124A, 124B, etc.) may be connected via NG interfaces to a network, such as a 5G Core Network (5GC). A 5GC may comprise one or more AMF/User Plan Function (UPF) functions (e.g., 130A and/or 130B). A base station (e.g., a gNB and/or an ng-eNB) may be connected to a UPF via an NG-User plane (NG-U) interface. The NG-U interface may provide delivery (e.g., non-guaranteed delivery) of user plane Protocol Data Units (PDUs) between a RAN node and the UPF. A base station (e.g., a gNB and/or an ng-eNB) may be connected to an AMF via an NG-Control plane (NG-C) interface. The NG-C interface may provide functions such as NG interface management, wireless device (e.g., UE) context management, wireless device (e.g., UE) mobility management, transport of NAS messages, paging, PDU session management, configuration transfer, and/or warning message transmission, combinations thereof, and/or the like.

A UPF may host functions such as anchor point for intra-/inter-Radio Access Technology (RAT) mobility (e.g., if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, quality of service (QoS) handling for user plane, packet filtering, gating, Uplink (UL)/Downlink (DL) rate enforcement, uplink traffic verification (e.g., Service Data Flow (SDF) to QoS flow mapping), downlink packet buffering, and/or downlink data notification triggering.

An AMF may host functions such as NAS signaling termination, NAS signaling security, Access Stratum (AS) security control, inter Core Network (CN) node signaling (e.g., for mobility between 3rd Generation Partnership Project (3GPP) access networks), idle mode wireless device reachability (e.g., control and execution of paging retransmission), registration area management, support of intra-system and inter-system mobility, access authentication, access authorization including check of roaming rights, mobility management control (e.g., subscription and/or policies), support of network slicing, and/or Session Management Function (SMF) selection.

Figure 2A:
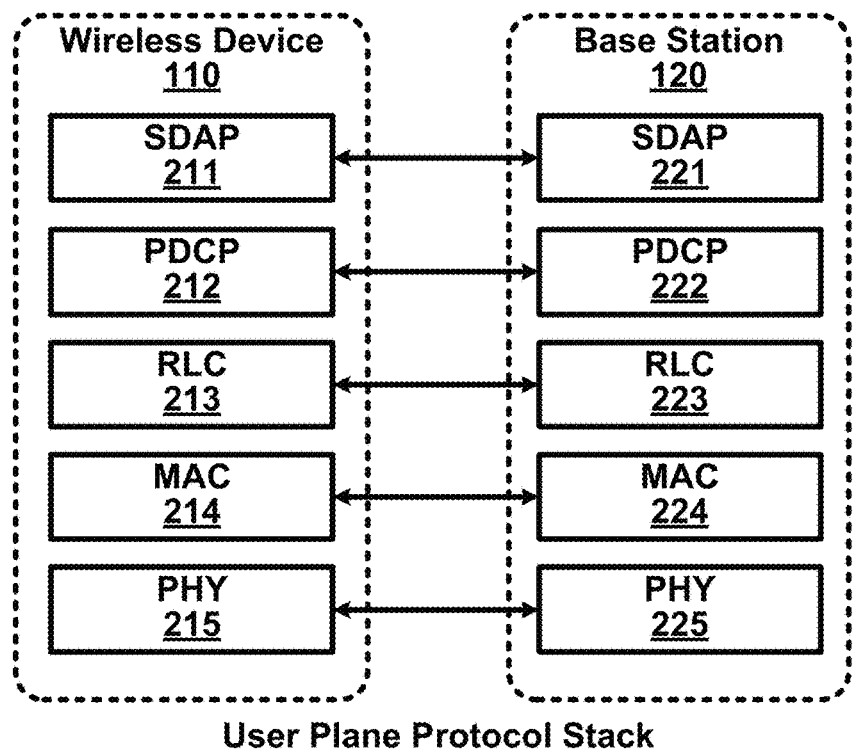
FIG. 2A shows an example user plane protocol stack.

FIG. 2A shows an example user plane protocol stack. A Service Data Adaptation Protocol (SDAP) (e.g., 211 and 221), Packet Data Convergence Protocol (PDCP) (e.g., 212 and 222), Radio Link Control (RLC) (e.g., 213 and 223), and Medium Access Control (MAC) (e.g., 214 and 224) sublayers, and a Physical (PHY) (e.g., 215 and 225) layer, may be terminated in a wireless device (e.g., 110) and in a base station (e.g., 120) on a network side. A PHY layer may provide transport services to higher layers (e.g., MAC, RRC, etc.). Services and/or functions of a MAC sublayer may comprise mapping between logical channels and transport channels, multiplexing and/or demultiplexing of MAC Service Data Units (SDUs) belonging to the same or different logical channels into and/or from Transport Blocks (TBs) delivered to and/or from the PHY layer, scheduling information reporting, error correction through Hybrid Automatic Repeat request (HARQ) (e.g., one HARQ entity per carrier for Carrier Aggregation (CA)), priority handling between wireless devices such as by using dynamic scheduling, priority handling between logical channels of a wireless device such as by using logical channel prioritization, and/or padding. A MAC entity may support one or multiple numerologies and/or transmission timings. Mapping restrictions in a logical channel prioritization may control which numerology and/or transmission timing a logical channel may use. An RLC sublayer may support transparent mode (TM), unacknowledged mode (UM), and/or acknowledged mode (AM) transmission modes. The RLC configuration may be per logical channel with no dependency on numerologies and/or Transmission Time Interval (TTI) durations. Automatic Repeat Request (ARQ) may operate on any of the numerologies and/or TTI durations with which the logical channel is configured. Services and functions of the PDCP layer for the user plane may comprise, for example, sequence numbering, header compression and decompression, transfer of user data, reordering and duplicate detection, PDCP PDU routing (e.g., such as for split bearers), retransmission of PDCP SDUs, ciphering, deciphering and integrity protection, PDCP SDU discard, PDCP re-establishment and data recovery for RLC AM, and/or duplication of PDCP PDUs. Services and/or functions of SDAP may comprise, for example, mapping between a QoS flow and a data radio bearer. Services and/or functions of SDAP may comprise mapping a Quality of Service Indicator (QFI) in DL and UL packets. A protocol entity of SDAP may be configured for an individual PDU session.

Figure 2B:
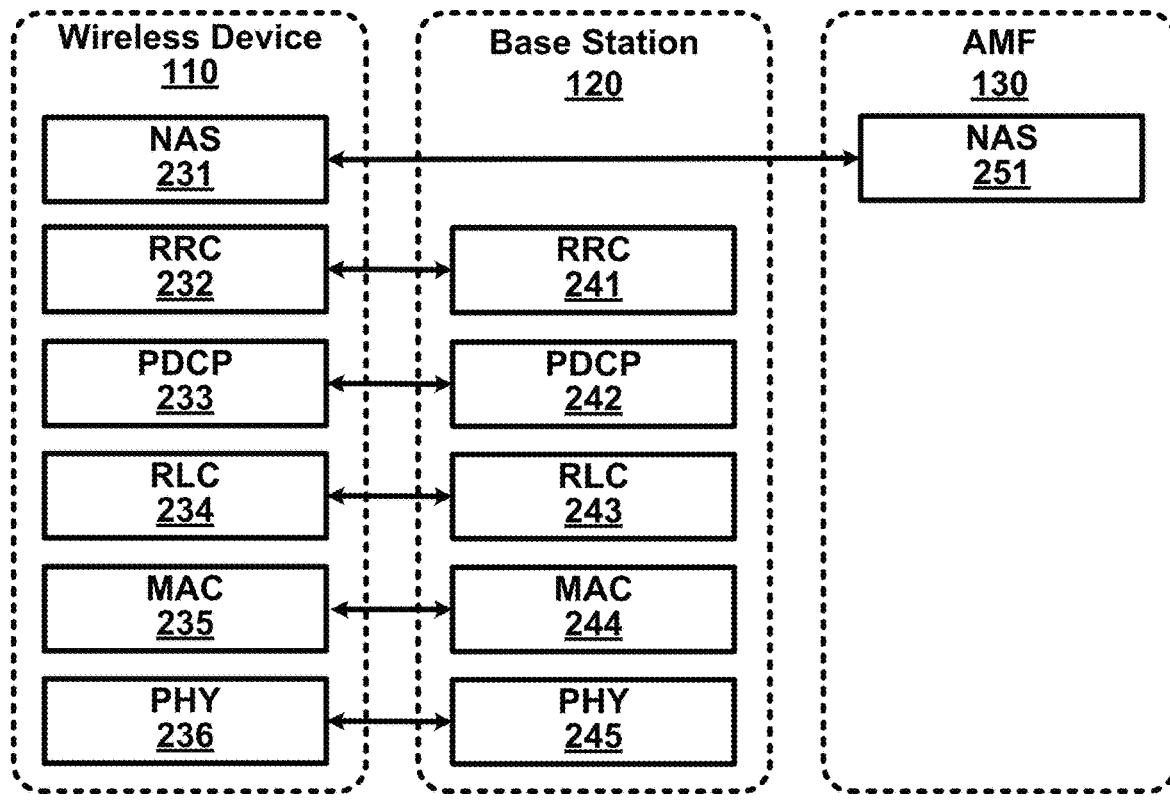
FIG. 2B shows an example control plane protocol stack.

FIG. 2B shows an example control plane protocol stack. A PDCP (e.g., 233 and 242), RLC (e.g., 234 and 243), and MAC (e.g., 235 and 244) sublayers, and a PHY (e.g., 236 and 245) layer, may be terminated in a wireless device (e.g., 110), and in a base station (e.g., 120) on a network side, and perform service and/or functions described above. RRC (e.g., 232 and 241) may be terminated in a wireless device and a base station on a network side. Services and/or functions of RRC may comprise broadcast of system information related to AS and/or NAS; paging (e.g., initiated by a 5GC or a RAN); establishment, maintenance, and/or release of an RRC connection between the wireless device and RAN; security functions such as key management, establishment, configuration, maintenance, and/or release of Signaling Radio Bearers (SRBs) and Data Radio Bearers (DRBs); mobility functions; QoS management functions; wireless device measurement reporting and control of the reporting; detection of and recovery from radio link failure; and/or NAS message transfer to/from NAS from/to a wireless device. NAS control protocol (e.g., 231 and 251) may be terminated in the wireless device and AMF (e.g., 130) on a network side. NAS control protocol may perform functions such as authentication, mobility management between a wireless device and an AMF (e.g., for 3GPP access and non-3GPP access), and/or session management between a wireless device and an SMF (e.g., for 3GPP access and non-3GPP access).

A base station may configure a plurality of logical channels for a wireless device. A logical channel of the plurality of logical channels may correspond to a radio bearer. The radio bearer may be associated with a QoS requirement. A base station may configure a logical channel to be mapped to one or more TTIs and/or numerologies in a plurality of TTIs and/or numerologies. The wireless device may receive Downlink Control Information (DCI) via a Physical Downlink Control CHannel (PDCCH) indicating an uplink grant. The uplink grant may be for a first TTI and/or a first numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise, for example, priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or to one or more MAC Control Elements (CEs). The one or more first logical channels may be mapped to the first TTI and/or the first numerology. The MAC layer at the wireless device may multiplex one or more MAC CEs and/or one or more MAC SDUs (e.g., logical channel) in a MAC PDU (e.g., transport block). The MAC PDU may comprise a MAC header comprising a plurality of MAC sub-headers. A MAC sub-header in the plurality of MAC sub-headers may correspond to a MAC CE or a MAC SUD (e.g., logical channel) in the one or more MAC CEs and/or in the one or more MAC SDUs. A MAC CE and/or a logical channel may be configured with a Logical Channel IDentifier (LCID). An LCID for a logical channel and/or a MAC CE may be fixed and/or pre-configured. An LCID for a logical channel and/or MAC CE may be configured for the wireless device by the base station. The MAC sub-header corresponding to a MAC CE and/or a MAC SDU may comprise an LCID associated with the MAC CE and/or the MAC SDU.

A base station may activate, deactivate, and/or impact one or more processes (e.g., set values of one or more parameters of the one or more processes or start and/or stop one or more timers of the one or more processes) at the wireless device, for example, by using one or more MAC commands. The one or more MAC commands may comprise one or more MAC control elements. The one or more processes may comprise activation and/or deactivation of PDCP packet duplication for one or more radio bearers. The base station may send (e.g., transmit) a MAC CE comprising one or more fields. The values of the fields may indicate activation and/or deactivation of PDCP duplication for the one or more radio bearers. The one or more processes may comprise Channel State Information (CSI) transmission of on one or more cells. The base station may send (e.g., transmit) one or more MAC CEs indicating activation and/or deactivation of the CSI transmission on the one or more cells. The one or more processes may comprise activation and/or deactivation of one or more secondary cells. The base station may send (e.g., transmit) a MAC CE indicating activation and/or deactivation of one or more secondary cells. The base station may send (e.g., transmit) one or more MAC CEs indicating starting and/or stopping of one or more Discontinuous Reception (DRX) timers at the wireless device. The base station may send (e.g., transmit) one or more MAC CEs that indicate one or more timing advance values for one or more Timing Advance Groups (TAGs).

Figure 3:
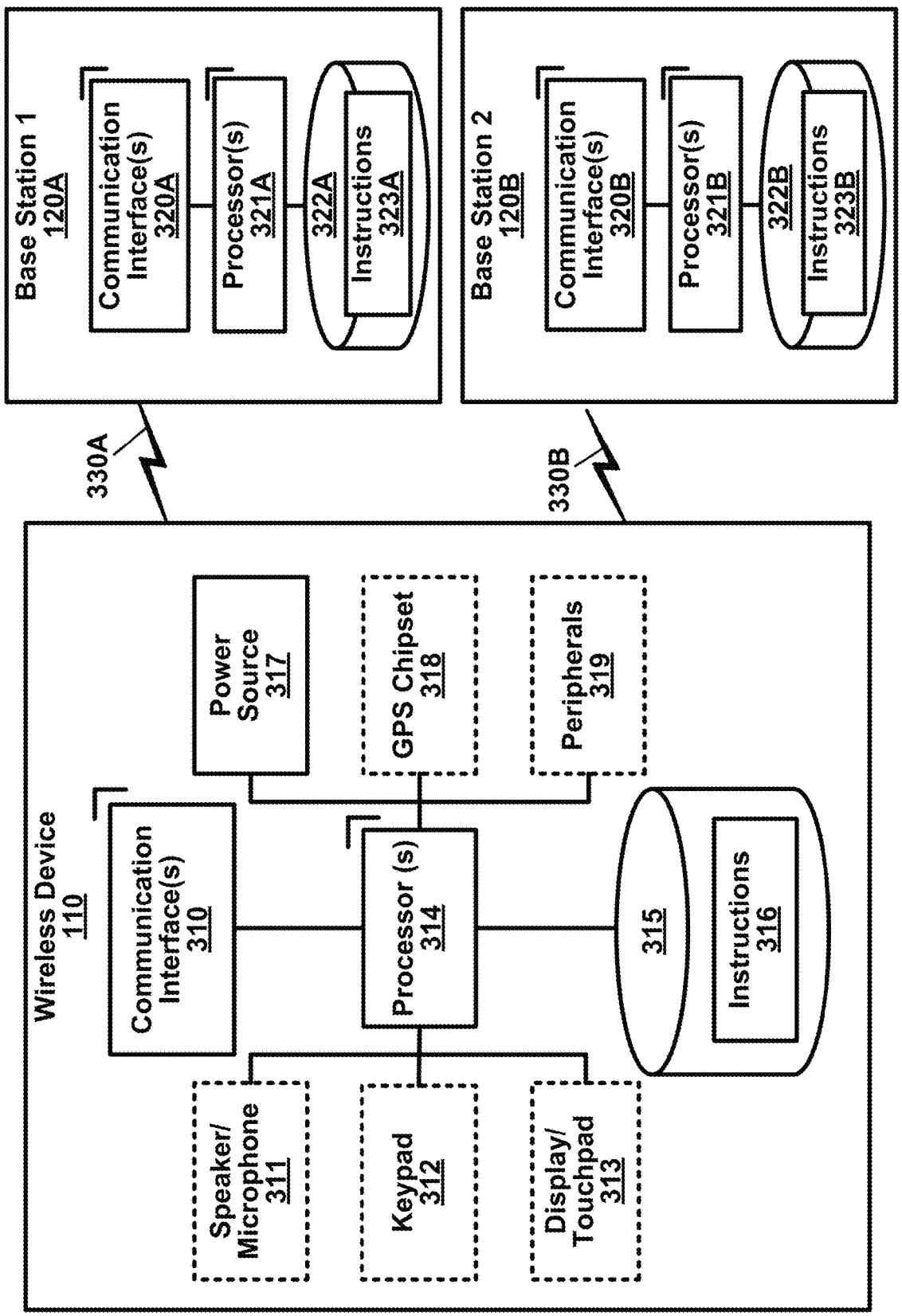
FIG. 3 shows an example wireless device and two base stations.

FIG. 3 shows an example of base stations (base station 1, 120A, and base station 2, 120B) and a wireless device 110. The wireless device 110 may comprise a UE or any other wireless device. The base station (e.g., 120A, 120B) may comprise a Node B, eNB, gNB, ng-eNB, one or more transmission and reception points (TRPs), or any other base station. A wireless device and/or a base station may perform one or more functions of a relay node. The base station 1, 120A, may comprise at least one communication interface 320A (e.g., a wireless modem, an antenna, a wired modem, and/or the like), at least one processor 321A, and at least one set of program code instructions 323A that may be stored in non-transitory memory 322A and executable by the at least one processor 321A. The base station 2, 120B, may comprise at least one communication interface 320B, at least one processor 321B, and at least one set of program code instructions 323B that may be stored in non-transitory memory 322B and executable by the at least one processor 321B.

A base station may comprise any quantity/number of sectors, for example: 1, 2, 3, 4, or 6 sectors. A base station may comprise any quantity/number of transmission and reception points (TRPs) (e.g., two TRPs, or any quantity of TRPs). A base station may comprise any quantity/number of cells, for example, ranging from 1 to 50 cells or more. A cell may be categorized, for example, as a primary cell or secondary cell. At Radio Resource Control (RRC) connection establishment, re-establishment, handover, etc., a serving cell may provide NAS (non-access stratum) mobility information (e.g., Tracking Area Identifier (TAI)). At RRC connection re-establishment and/or handover, a serving cell may provide security input. This serving cell may be referred to as the Primary Cell (PCell). In the downlink, a carrier corresponding to the PCell may be a DL Primary Component Carrier (PCC). In the uplink, a carrier may be an UL PCC. Secondary Cells (SCells) may be configured to form together with a PCell a set of serving cells, for example, depending on wireless device capabilities. In a downlink, a carrier corresponding to an SCell may be a downlink secondary component carrier (DL SCC). In an uplink, a carrier may be an uplink secondary component carrier (UL SCC). An SCell may or may not have an uplink carrier.

A cell, comprising a downlink carrier and optionally an uplink carrier, may be assigned a physical cell ID and/or a cell index. A carrier (downlink and/or uplink) may belong to one cell. The cell ID and/or cell index may identify the downlink carrier and/or uplink carrier of the cell (e.g., depending on the context it is used). A cell ID may be equally referred to as a carrier ID, and a cell index may be referred to as a carrier index. A physical cell ID and/or a cell index may be assigned to a cell. A cell ID may be determined using a synchronization signal transmitted via a downlink carrier. A cell index may be determined using RRC messages. A first physical cell ID for a first downlink carrier may indicate that the first physical cell ID is for a cell comprising the first downlink carrier. The same concept may be used, for example, with carrier activation and/or deactivation (e.g., secondary cell activation and/or deactivation). A first carrier that is activated may indicate that a cell comprising the first carrier is activated.

A base station may send (e.g., transmit) to a wireless device one or more messages (e.g., RRC messages) comprising a plurality of configuration parameters for one or more cells. One or more cells may comprise at least one primary cell and at least one secondary cell. An RRC message may be broadcasted and/or unicasted to the wireless device. Configuration parameters may comprise common parameters and dedicated parameters.

Services and/or functions of an RRC sublayer may comprise at least one of: broadcast of system information related to AS and/or NAS; paging initiated by a 5GC and/or an NG-RAN; establishment, maintenance, and/or release of an RRC connection between a wireless device and an NG-RAN, which may comprise at least one of addition, modification, and/or release of carrier aggregation; and/or addition, modification, and/or release of dual connectivity in NR or between E-UTRA and NR. Services and/or functions of an RRC sublayer may comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g., intra NR mobility or inter-RAT mobility) and/or a context transfer; and/or a wireless device cell selection and/or reselection and/or control of cell selection and reselection. Services and/or functions of an RRC sublayer may comprise at least one of QoS management functions; a wireless device measurement configuration/reporting; detection of and/or recovery from radio link failure; and/or NAS message transfer to and/or from a core network entity (e.g., AMF, Mobility Management Entity (MME)) from and/or to the wireless device.

An RRC sublayer may support an RRC_Idle state, an RRC_Inactive state, and/or an RRC_Connected state for a wireless device. In an RRC_Idle state, a wireless device may perform at least one of: Public Land Mobile Network (PLMN) selection; receiving broadcasted system information; cell selection and/or re-selection; monitoring and/or receiving a paging for mobile terminated data initiated by 5GC; paging for mobile terminated data area managed by 5GC; and/or DRX for CN paging configured via NAS. In an RRC_Inactive state, a wireless device may perform at least one of: receiving broadcasted system information; cell selection and/or re-selection; monitoring and/or receiving a RAN and/or CN paging initiated by an NG-RAN and/or a 5GC; RAN-based notification area (RNA) managed by an NG-RAN; and/or DRX for a RAN and/or CN paging configured by NG-RAN/NAS. In an RRC_Idle state of a wireless device, a base station (e.g., NG-RAN) may keep a 5GC-NG-RAN connection (e.g., both C/U-planes) for the wireless device; and/or store a wireless device AS context for the wireless device. In an RRC_Connected state of a wireless device, a base station (e.g., NG-RAN) may perform at least one of: establishment of 5GC-NG-RAN connection (both C/U-planes) for the wireless device; storing a UE AS context for the wireless device; send (e.g., transmit) and/or receive of unicast data to and/or from the wireless device; and/or network-controlled mobility based on measurement results received from the wireless device. In an RRC_Connected state of a wireless device, an NG-RAN may know a cell to which the wireless device belongs.

System information (SI) may be divided into minimum SI and other SI. The minimum SI may be periodically broadcast. The minimum SI may comprise basic information required for initial access and/or information for acquiring any other SI broadcast periodically and/or provisioned on-demand (e.g., scheduling information). The other SI may either be broadcast, and/or be provisioned in a dedicated manner, such as either triggered by a network and/or upon request from a wireless device. A minimum SI may be transmitted via two different downlink channels using different messages (e.g., MasterinformationBlock and SystemInformationBlockType1). Another SI may be transmitted via SystemInformationBlockType2. For a wireless device in an RRC_Connected state, dedicated RRC signaling may be used for the request and delivery of the other SI. For the wireless device in the RRC_Idle state and/or in the RRC_Inactive state, the request may trigger a random access procedure.

A wireless device may report its radio access capability information, which may be static. A base station may request one or more indications of capabilities for a wireless device to report based on band information. A temporary capability restriction request may be sent by the wireless device (e.g., if allowed by a network) to signal the limited availability of some capabilities (e.g., due to hardware sharing, interference, and/or overheating) to the base station. The base station may confirm or reject the request. The temporary capability restriction may be transparent to 5GC (e.g., static capabilities may be stored in 5GC).

A wireless device may have an RRC connection with a network, for example, if CA is configured. At RRC connection establishment, re-establishment, and/or handover procedures, a serving cell may provide NAS mobility information. At RRC connection re-establishment and/or handover, a serving cell may provide a security input. This serving cell may be referred to as the PCell. SCells may be configured to form together with the PCell a set of serving cells, for example, depending on the capabilities of the wireless device. The configured set of serving cells for the wireless device may comprise a PCell and one or more SCells.

The reconfiguration, addition, and/or removal of SCells may be performed by RRC messaging. At intra-NR handover, RRC may add, remove, and/or reconfigure SCells for usage with the target PCell. Dedicated RRC signaling may be used (e.g., if adding a new SCell) to send all required system information of the SCell (e.g., if in connected mode, wireless devices may not acquire broadcasted system information directly from the SCells).

The purpose of an RRC connection reconfiguration procedure may be to modify an RRC connection, (e.g., to establish, modify, and/or release RBs; to perform handover; to setup, modify, and/or release measurements, for example, to add, modify, and/or release SCells and cell groups). NAS dedicated information may be transferred from the network to the wireless device, for example, as part of the RRC connection reconfiguration procedure. The RRCConnectionReconfiguration message may be a command to modify an RRC connection. One or more RRC messages may convey information for measurement configuration, mobility control, and/or radio resource configuration (e.g., RBs, MAC main configuration, and/or physical channel configuration), which may comprise any associated dedicated NAS information and/or security configuration. The wireless device may perform an SCell release, for example, if the received RRC Connection Reconfiguration message includes the sCellToReleaseList. The wireless device may perform SCell additions or modification, for example, if the received RRC Connection Reconfiguration message includes the sCellToAddModList.

An RRC connection establishment, reestablishment, and/or resume procedure may be to establish, reestablish, and/or resume an RRC connection, respectively. An RRC connection establishment procedure may comprise SRB1 establishment. The RRC connection establishment procedure may be used to transfer the initial NAS dedicated information and/or message from a wireless device to an E-UTRAN. The RRCConnectionReestablishment message may be used to re-establish SRB1.

A measurement report procedure may be used to transfer measurement results from a wireless device to an NG-RAN. The wireless device may initiate a measurement report procedure, for example, after successful security activation. A measurement report message may be used to send (e.g., transmit) measurement results.

The wireless device 110 may comprise at least one communication interface 310 (e.g., a wireless modem, an antenna, and/or the like), at least one processor 314, and at least one set of program code instructions 316 that may be stored in non-transitory memory 315 and executable by the at least one processor 314. The wireless device 110 may further comprise at least one of at least one speaker and/or microphone 311, at least one keypad 312, at least one display and/or touchpad 313, at least one power source 317, at least one global positioning system (GPS) chipset 318, and/or other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and/or the like. The processor 314 of the wireless device 110, the processor 321A in base station 1 120A, and/or the processor 321B in base station 2 120B may perform at least one of signal coding and/or processing, data processing, power control, input/output processing, and/or any other functionality that may enable the wireless device 110, the base station 1 120A and/or the base station 2 120B to operate in a wireless environment.

The processor 314 of the wireless device 110 may be connected to and/or in communication with the speaker and/or microphone 311, the keypad 312, and/or the display and/or touchpad 313. The processor 314 may receive user input data from and/or provide user output data to the speaker and/or microphone 311, the keypad 312, and/or the display and/or touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and/or the like. The processor 314 may be connected to the GPS chipset 318. The GPS chipset 318 may be configured to provide geographic location information of the wireless device 110.

The processor 314 of the wireless device 110 may further be connected to and/or in communication with other peripherals 319, which may comprise one or more software and/or hardware modules that may provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and/or the like.

The communication interface 320A of the base station 1, 120A, and/or the communication interface 320B of the base station 2, 120B, may be configured to communicate with the communication interface 310 of the wireless device 110, for example, via a wireless link 330A and/or via a wireless link 330B, respectively. The communication interface 320A of the base station 1, 120A, may communicate with the communication interface 320B of the base station 2 and/or other RAN and/or core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110, and/or the base station 2 120B and the wireless device 110, may be configured to send and receive transport blocks, for example, via the wireless link 330A and/or via the wireless link 330B, respectively. The wireless link 330A and/or the wireless link 330B may use at least one frequency carrier. Transceiver(s) may be used. A transceiver may be a device that comprises both a transmitter and a receiver. Transceivers may be used in devices such as wireless devices, base stations, relay nodes, transmission and reception points (TRPs), computing devices, and/or the like. Radio technology may be implemented in the communication interface 310, 320A, and/or 320B, and the wireless link 330A and/or 330B. The radio technology may comprise one or more elements shown in FIG. 4A, FIG. 4B, FIG. 4C, FIG. 4D, FIG. 6, FIG. 7A, FIG. 7B, FIG. 8, and associated text, described below.

Other nodes in a wireless network (e.g., AMF, UPF, SMF, etc.) may comprise one or more communication interfaces, one or more processors, and memory storing instructions. A node (e.g., wireless device, base station, AMF, SMF, UPF, servers, switches, antennas, and/or the like) may comprise one or more processors, and memory storing instructions that when executed by the one or more processors causes the node to perform certain processes and/or functions. Single-carrier and/or multi-carrier communication operation may be performed. A non-transitory tangible computer readable media may comprise instructions executable by one or more processors to cause operation of single-carrier and/or multi-carrier communications. An article of manufacture may comprise a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, and/or electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and/or code stored in (and/or in communication with) a memory device to implement connections, electronic device operations, protocol(s), protocol layers, communication drivers, device drivers, hardware operations, combinations thereof, and/or the like.

A communication network may comprise the wireless device 110, the base station 1, 120A, the base station 2, 120B, and/or any other device. The communication network may comprise any quantity/number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a WiFi access point), a TRP, a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

FIG. 4A, FIG. 4B, FIG. 4C and FIG. 4D show examples of uplink and downlink signal transmission. FIG. 4A shows an example uplink transmitter for at least one physical channel A baseband signal representing a physical uplink shared channel may perform one or more functions. The one or more functions may comprise at least one of: scrambling (e.g., by Scrambling); modulation of scrambled bits to generate complex-valued symbols (e.g., by a Modulation mapper); mapping of the complex-valued modulation symbols onto one or several transmission layers (e.g., by a Layer mapper); transform precoding to generate complex-valued symbols (e.g., by a Transform precoder); precoding of the complex-valued symbols (e.g., by a Precoder); mapping of precoded complex-valued symbols to resource elements (e.g., by a Resource element mapper); generation of complex-valued time-domain Single Carrier-Frequency Division Multiple Access (SC-FDMA) or CP-OFDM signal for an antenna port (e.g., by a signal gen.); and/or the like. A SC-FDMA signal for uplink transmission may be generated, for example, if transform precoding is enabled. A CP-OFDM signal for uplink transmission may be generated by FIG. 4A, for example, if transform precoding is not enabled. These functions are shown as examples and other mechanisms may be implemented.

FIG. 4B shows an example of modulation and up-conversion to the carrier frequency of a complex-valued SC-FDMA or CP-OFDM baseband signal for an antenna port and/or for the complex-valued Physical Random Access CHannel (PRACH) baseband signal. Filtering may be performed prior to transmission.

FIG. 4C shows an example of downlink transmissions. The baseband signal representing a downlink physical channel may perform one or more functions. The one or more functions may comprise: scrambling of coded bits in a codeword to be transmitted on a physical channel (e.g., by Scrambling); modulation of scrambled bits to generate complex-valued modulation symbols (e.g., by a Modulation mapper); mapping of the complex-valued modulation symbols onto one or several transmission layers (e.g., by a Layer mapper); precoding of the complex-valued modulation symbols on a layer for transmission on the antenna ports (e.g., by Precoding); mapping of complex-valued modulation symbols for an antenna port to resource elements (e.g., by a Resource element mapper); generation of complex-valued time-domain OFDM signal for an antenna port (e.g., by an OFDM signal gen.); and/or the like. These functions are shown as examples and other mechanisms may be implemented.

A base station may send (e.g., transmit) a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. A first antenna port and a second antenna port may be quasi co-located, for example, if one or more large-scale properties of the channel over which a first symbol on the first antenna port is conveyed may be inferred from the channel over which a second symbol on a second antenna port is conveyed. The one or more large-scale properties may comprise at least one of: delay spread; Doppler spread; Doppler shift; average gain; average delay; and/or spatial receiving (Rx) parameters.

FIG. 4D shows an example modulation and up-conversion to the carrier frequency of the complex-valued OFDM baseband signal for an antenna port. Filtering may be performed prior to transmission.

Figure 5A:
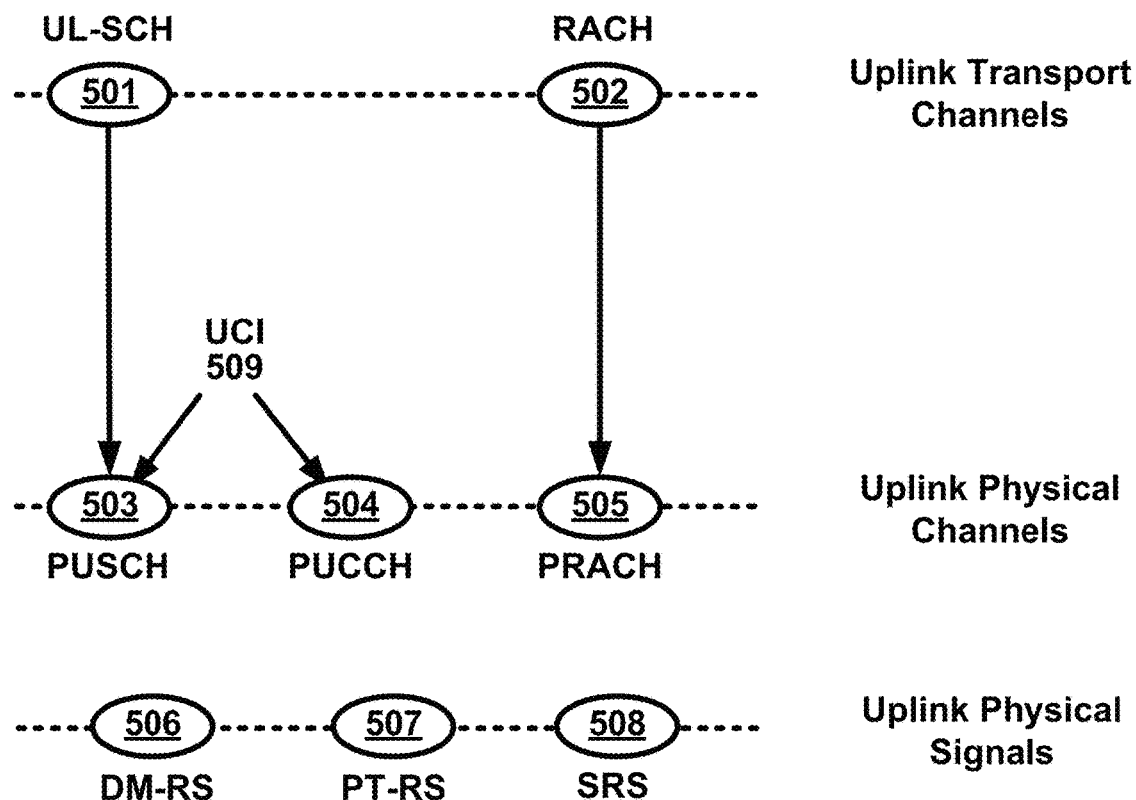
FIG. 5A shows an example uplink channel mapping and example uplink physical signals.

FIG. 5A shows example uplink channel mapping and example uplink physical signals. A physical layer may provide one or more information transfer services to a MAC and/or one or more higher layers. The physical layer may provide the one or more information transfer services to the MAC via one or more transport channels. An information transfer service may indicate how and/or with what characteristics data is transferred over the radio interface.

Uplink transport channels may comprise an Uplink-Shared CHannel (UL-SCH) 501 and/or a Random Access CHannel (RACH) 502. A wireless device may send (e.g., transmit) one or more uplink DM-RSs 506 to a base station for channel estimation, for example, for coherent demodulation of one or more uplink physical channels (e.g., PUSCH 503 and/or PUCCH 504). The wireless device may send (e.g., transmit) to a base station at least one uplink DM-RS 506 with PUSCH 503 and/or PUCCH 504, wherein the at least one uplink DM-RS 506 may be spanning a same frequency range as a corresponding physical channel. The base station may configure the wireless device with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to send (e.g., transmit) at one or more symbols of a PUSCH and/or PUCCH. The base station may semi-statically configure the wireless device with a maximum quantity/number of front-loaded DM-RS symbols for PUSCH and/or PUCCH. The wireless device may schedule a single-symbol DM-RS and/or double symbol DM-RS based on a maximum quantity/number of front-loaded DM-RS symbols, wherein the base station may configure the wireless device with one or more additional uplink DM-RS for PUSCH and/or PUCCH. A new radio network may support, for example, at least for CP-OFDM, a common DM-RS structure for DL and UL, wherein a DM-RS location, DM-RS pattern, and/or scrambling sequence may be same or different.

Whether or not an uplink PT-RS 507 is present may depend on an RRC configuration. A presence of the uplink PT-RS may be wireless device-specifically configured. A presence and/or a pattern of the uplink PT-RS 507 in a scheduled resource may be wireless device-specifically configured by a combination of RRC signaling and/or association with one or more parameters used for other purposes (e.g., Modulation and Coding Scheme (MCS)) which may be indicated by DCI. If configured, a dynamic presence of uplink PT-RS 507 may be associated with one or more DCI parameters comprising at least a MCS. A radio network may support a plurality of uplink PT-RS densities defined in time/frequency domain. If present, a frequency domain density may be associated with at least one configuration of a scheduled bandwidth. A wireless device may assume a same precoding for a DM-RS port and a PT-RS port. A quantity/number of PT-RS ports may be less than a quantity/number of DM-RS ports in a scheduled resource. The uplink PT-RS 507 may be confined in the scheduled time/frequency duration for a wireless device.

A wireless device may send (e.g., transmit) an SRS 508 to a base station for channel state estimation, for example, to support uplink channel dependent scheduling and/or link adaptation. The SRS 508 sent (e.g., transmitted) by the wireless device may allow for the base station to estimate an uplink channel state at one or more different frequencies. A base station scheduler may use an uplink channel state to assign one or more resource blocks of a certain quality (e.g., above a quality threshold) for an uplink PUSCH transmission from the wireless device. The base station may semi-statically configure the wireless device with one or more SRS resource sets. For an SRS resource set, the base station may configure the wireless device with one or more SRS resources. An SRS resource set applicability may be configured by a higher layer (e.g., RRC) parameter. An SRS resource in each of one or more SRS resource sets may be sent (e.g., transmitted) at a time instant, for example, if a higher layer parameter indicates beam management. The wireless device may send (e.g., transmit) one or more SRS resources in different SRS resource sets simultaneously. A new radio network may support aperiodic, periodic, and/or semi-persistent SRS transmissions. The wireless device may send (e.g., transmit) SRS resources, for example, based on one or more trigger types. The one or more trigger types may comprise higher layer signaling (e.g., RRC) and/or one or more DCI formats (e.g., at least one DCI format may be used for a wireless device to select at least one of one or more configured SRS resource sets). An SRS trigger type 0 may refer to an SRS triggered based on a higher layer signaling. An SRS trigger type 1 may refer to an SRS triggered based on one or more DCI formats. The wireless device may be configured to send (e.g., transmit) the SRS 508 after a transmission of PUSCH 503 and corresponding uplink DM-RS 506, for example, if PUSCH 503 and the SRS 508 are transmitted in a same slot.

A base station may semi-statically configure a wireless device with one or more SRS configuration parameters indicating at least one of following: an SRS resource configuration identifier, a quantity/number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a quantity/number of OFDM symbols in a SRS resource, starting OFDM symbol of a SRS resource, an SRS bandwidth, a frequency hopping bandwidth, a cyclic shift, and/or an SRS sequence ID.

Figure 5B:
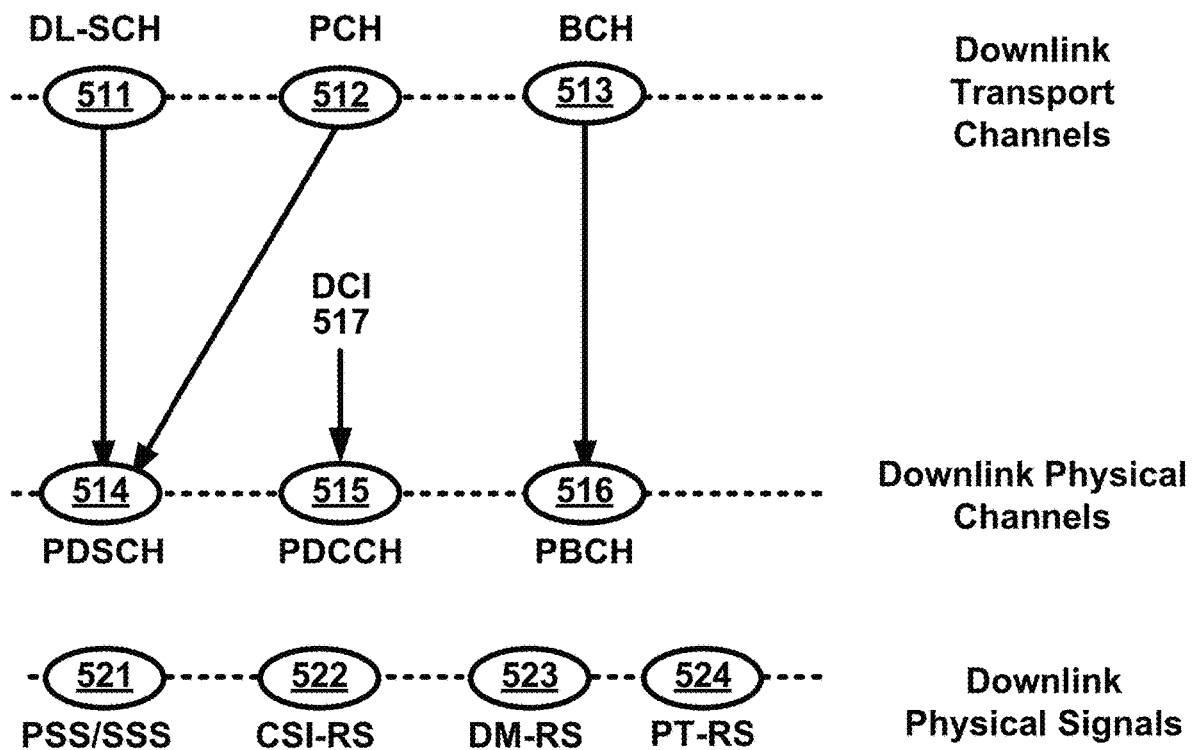
FIG. 5B shows an example downlink channel mapping and example downlink physical signals.

FIG. 5B shows an example downlink channel mapping and downlink physical signals. Downlink transport channels may comprise a Downlink-Shared CHannel (DL-SCH) 511, a Paging CHannel (PCH) 512, and/or a Broadcast CHannel (BCH) 513. A transport channel may be mapped to one or more corresponding physical channels. A UL-SCH 501 may be mapped to a Physical Uplink Shared CHannel (PUSCH) 503. A RACH 502 may be mapped to a PRACH 505. A DL-SCH 511 and a PCH 512 may be mapped to a Physical Downlink Shared CHannel (PDSCH) 514. A BCH 513 may be mapped to a Physical Broadcast CHannel (PBCH) 516.

A radio network may comprise one or more downlink and/or uplink transport channels. The radio network may comprise one or more physical channels without a corresponding transport channel. The one or more physical channels may be used for an Uplink Control Information (UCI) 509 and/or a Downlink Control Information (DCI) 517. A Physical Uplink Control CHannel (PUCCH) 504 may transmit UCI 509 from a wireless device to a base station. A Physical Downlink Control CHannel (PDCCH) 515 may carry the DCI 517 from a base station to a wireless device. The radio network (e.g., NR) may support the UCI 509 multiplexing in the PUSCH 503, for example, if the UCI 509 and the PUSCH 503 transmissions may coincide in a slot (e.g., at least in part). The UCI 509 may comprise at least one of a CSI, an Acknowledgement (ACK)/Negative Acknowledgement (NACK), and/or a scheduling request. The DCI 517 via the PDCCH 515 may indicate at least one of following: one or more downlink assignments and/or one or more uplink scheduling grants.

In uplink, a wireless device may send (e.g., transmit) one or more Reference Signals (RSs) to a base station. The one or more RSs may comprise at least one of a Demodulation-RS (DM-RS) 506, a Phase Tracking-RS (PT-RS) 507, and/or a Sounding RS (SRS) 508. In downlink, a base station may send (e.g., transmit, unicast, multicast, and/or broadcast) one or more RSs to a wireless device. The one or more RSs may comprise at least one of a Primary Synchronization Signal (PSS)/Secondary Synchronization Signal (SSS) 521, a CSI-RS 522, a DM-RS 523, and/or a PT-RS 524.

In a time domain, an SSB/PBCH may comprise one or more OFDM symbols (e.g., 4 OFDM symbols numbered in increasing order from 0 to 3) within the SSB/PBCH. An SSB/PBCH may comprise the PSS/SSS 521 and/or the PBCH 516. In the frequency domain, an SSB/PBCH may comprise one or more contiguous subcarriers (e.g., 240 contiguous subcarriers with the subcarriers numbered in increasing order from 0 to 239) within the SSB/PBCH. The PSS/SSS 521 may occupy, for example, 1 OFDM symbol and 127 subcarriers. The PBCH 516 may span across, for example, 3 OFDM symbols and 240 subcarriers. A wireless device may assume that one or more SSB/PBCH transmitted with a same block index may be quasi co-located, for example, with respect to Doppler spread, Doppler shift, average gain, average delay, and/or spatial Rx parameters. A wireless device may not assume quasi co-location for other SSB/PBCH transmissions. A periodicity of an SSB/PBCH may be configured by a radio network (e.g., by an RRC signaling). One or more time locations in which the SS/PBCH block may be sent may be determined by sub-carrier spacing. A wireless device may assume a band-specific sub-carrier spacing for an SSB/PBCH, for example, unless a radio network has configured the wireless device to assume a different sub-carrier spacing.

The downlink CSI-RS 522 may be used for a wireless device to acquire channel state information. A radio network may support periodic, aperiodic, and/or semi-persistent transmission of the downlink CSI-RS 522. A base station may semi-statically configure and/or reconfigure a wireless device with periodic transmission of the downlink CSI-RS 522. A configured CSI-RS resources may be activated and/or deactivated. For semi-persistent transmission, an activation and/or deactivation of a CSI-RS resource may be triggered dynamically. A CSI-RS configuration may comprise one or more parameters indicating at least a quantity/number of antenna ports. A base station may configure a wireless device with 32 ports, or any other quantity/number of ports. A base station may semi-statically configure a wireless device with one or more CSI-RS resource sets. One or more CSI-RS resources may be allocated from one or more CSI-RS resource sets to one or more wireless devices. A base station may semi-statically configure one or more parameters indicating CSI RS resource mapping, for example, time-domain location of one or more CSI-RS resources, a bandwidth of a CSI-RS resource, and/or a periodicity. A wireless device may be configured to use the same OFDM symbols for the downlink CSI-RS 522 and the Control Resource Set (CORESET), for example, if the downlink CSI-RS 522 and the CORESET are spatially quasi co-located and resource elements associated with the downlink CSI-RS 522 are the outside of PRBs configured for the CORESET. A wireless device may be configured to use the same OFDM symbols for downlink CSI-RS 522 and SSB/PBCH, for example, if the downlink CSI-RS 522 and SSB/PBCH are spatially quasi co-located and resource elements associated with the downlink CSI-RS 522 are outside of the PRBs configured for the SSB/PBCH.

A wireless device may send (e.g., transmit) one or more downlink DM-RSs 523 to a base station for channel estimation, for example, for coherent demodulation of one or more downlink physical channels (e.g., PDSCH 514). A radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statically configure a wireless device with a maximum quantity/number of front-loaded DM-RS symbols for PDSCH 514. A DM-RS configuration may support one or more DM-RS ports. A DM-RS configuration may support at least 8 orthogonal downlink DM-RS ports, for example, for single user-MIMO. ADM-RS configuration may support 12 orthogonal downlink DM-RS ports, for example, for multiuser-MIMO. A radio network may support, for example, at least for CP-OFDM, a common DM-RS structure for DL and UL, wherein a DM-RS location, DM-RS pattern, and/or scrambling sequence may be the same or different.

Whether or not the downlink PT-RS 524 is present may depend on an RRC configuration. A presence of the downlink PT-RS 524 may be wireless device-specifically configured. A presence and/or a pattern of the downlink PT-RS 524 in a scheduled resource may be wireless device-specifically configured, for example, by a combination of RRC signaling and/or an association with one or more parameters used for other purposes (e.g., MCS) which may be indicated by the DCI. If configured, a dynamic presence of the downlink PT-RS 524 may be associated with one or more DCI parameters comprising at least MCS. A radio network may support a plurality of PT-RS densities in a time/frequency domain. If present, a frequency domain density may be associated with at least one configuration of a scheduled bandwidth. A wireless device may assume the same precoding for a DM-RS port and a PT-RS port. A quantity/number of PT-RS ports may be less than a quantity/number of DM-RS ports in a scheduled resource. The downlink PT-RS 524 may be confined in the scheduled time/frequency duration for a wireless device.

Figure 6:
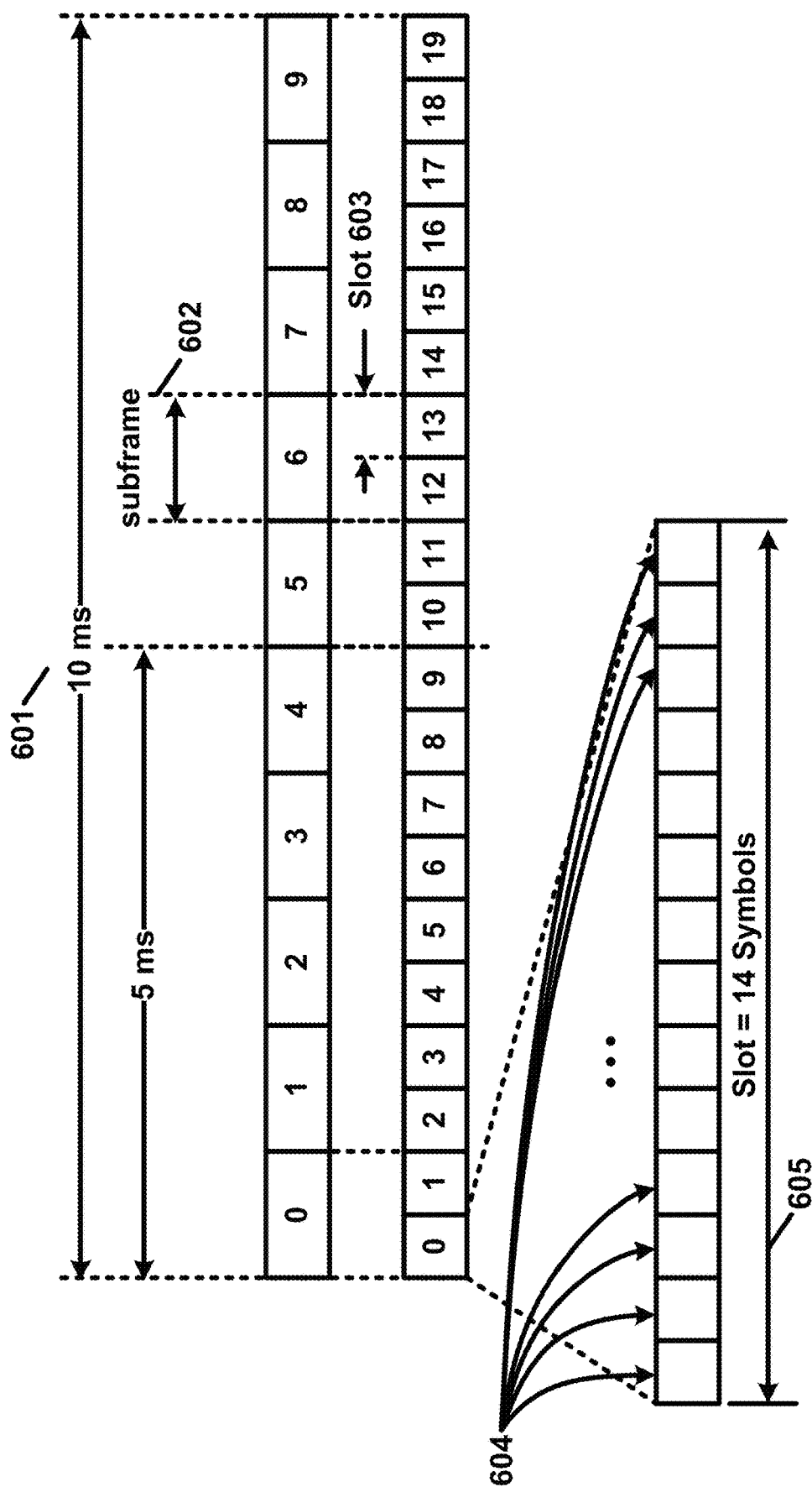
FIG. 6 shows an example frame structure for a carrier.

FIG. 6 shows an example frame structure for a carrier. A multicarrier OFDM communication system may include one or more carriers, for example, ranging from 1 to 32 carriers (such as for carrier aggregation) or ranging from 1 to 64 carriers (such as for dual connectivity). Different radio frame structures may be supported (e.g., for FDD and/or for TDD duplex mechanisms). FIG. 6 shows an example frame structure. Downlink and uplink transmissions may be organized into radio frames 601. Radio frame duration may be 10 milliseconds (ms). A 10 ms radio frame 601 may be divided into ten equally sized subframes 602, each with a 1 ms duration. Subframe(s) may comprise one or more slots (e.g., slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Other subframe durations such as, for example, 0.5 ms, 1 ms, 2 ms, and 5 ms may be supported. Uplink and downlink transmissions may be separated in the frequency domain. Slot(s) may include a plurality of OFDM symbols 604. The quantity/number of OFDM symbols 604 in a slot 605 may depend on the cyclic prefix length. A slot may be 14 OFDM symbols for the same subcarrier spacing of up to 480 kHz with normal CP. A slot may be 12 OFDM symbols for the same subcarrier spacing of 60 kHz with extended CP. A slot may comprise downlink, uplink, and/or a downlink part and an uplink part, and/or alike.

Figure 7A:
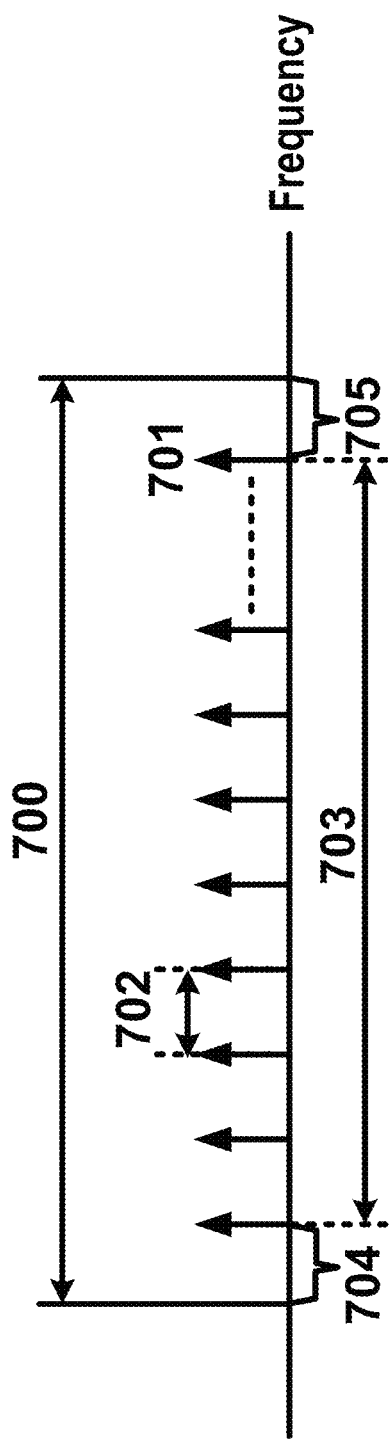
FIG. 7A and FIG. 7B show example sets of orthogonal frequency division multiplexing (OFDM) subcarriers.

FIG. 7A shows example sets of OFDM subcarriers. A base station may communicate with a wireless device using a carrier having an example channel bandwidth 700. Arrow(s) in the example may depict a subcarrier in a multicarrier OFDM system. The OFDM system may use technology such as OFDM technology, SC-FDMA technology, and/or the like. An arrow 701 shows a subcarrier transmitting information symbols. A subcarrier spacing 702, between two contiguous subcarriers in a carrier, may be any one of 15 kHz, 30 kHz, 60 kHz, 120 kHz, 240 kHz, or any other frequency. Different subcarrier spacing may correspond to different transmission numerologies. A transmission numerology may comprise at least: a numerology index; a value of subcarrier spacing; and/or a type of cyclic prefix (CP). A base station may send (e.g., transmit) to and/or receive from a wireless device via a quantity/number of subcarriers 703 in a carrier. A bandwidth occupied by a quantity/number of subcarriers 703 (e.g., transmission bandwidth) may be smaller than the channel bandwidth 700 of a carrier, for example, due to guard bands 704 and 705. Guard bands 704 and 705 may be used to reduce interference to and from one or more neighbor carriers. A quantity/number of subcarriers (e.g., transmission bandwidth) in a carrier may depend on the channel bandwidth of the carrier and/or the subcarrier spacing. A transmission bandwidth, for a carrier with a 20 MHz channel bandwidth and a 15 kHz subcarrier spacing, may be in quantity/number of 1024 subcarriers.

A base station and a wireless device may communicate with multiple component carriers (CCs), for example, if configured with CA. Different component carriers may have different bandwidth and/or different subcarrier spacing, for example, if CA is supported. A base station may send (e.g., transmit) a first type of service to a wireless device via a first component carrier. The base station may send (e.g., transmit) a second type of service to the wireless device via a second component carrier. Different types of services may have different service requirements (e.g., data rate, latency, reliability), which may be suitable for transmission via different component carriers having different subcarrier spacing and/or different bandwidth.

Figure 7B:
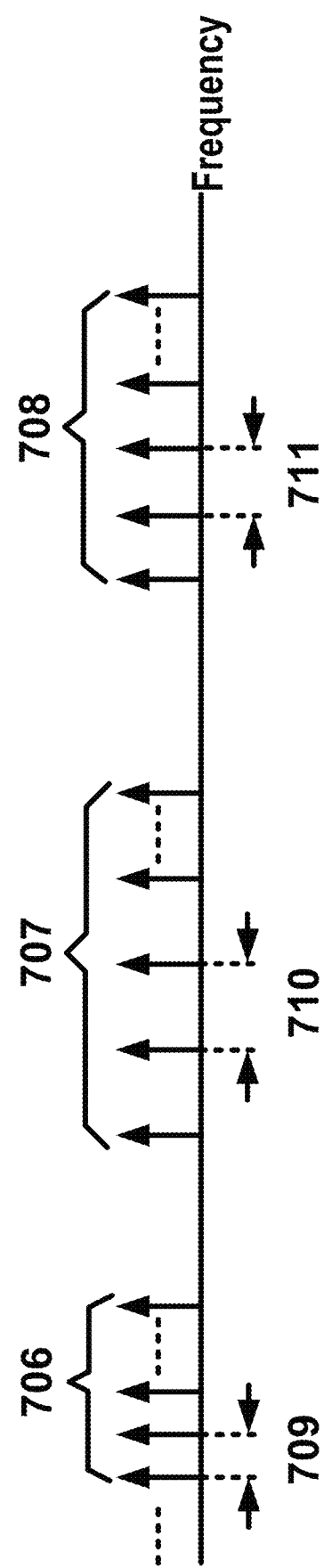

FIG. 7B shows examples of component carriers. A first component carrier may comprise a first quantity/number of subcarriers 706 having a first subcarrier spacing 709. A second component carrier may comprise a second quantity/number of subcarriers 707 having a second subcarrier spacing 710. A third component carrier may comprise a third quantity/number of subcarriers 708 having a third subcarrier spacing 711. Carriers in a multicarrier OFDM communication system may be contiguous carriers, non-contiguous carriers, or a combination of both contiguous and non-contiguous carriers.

Figure 8:
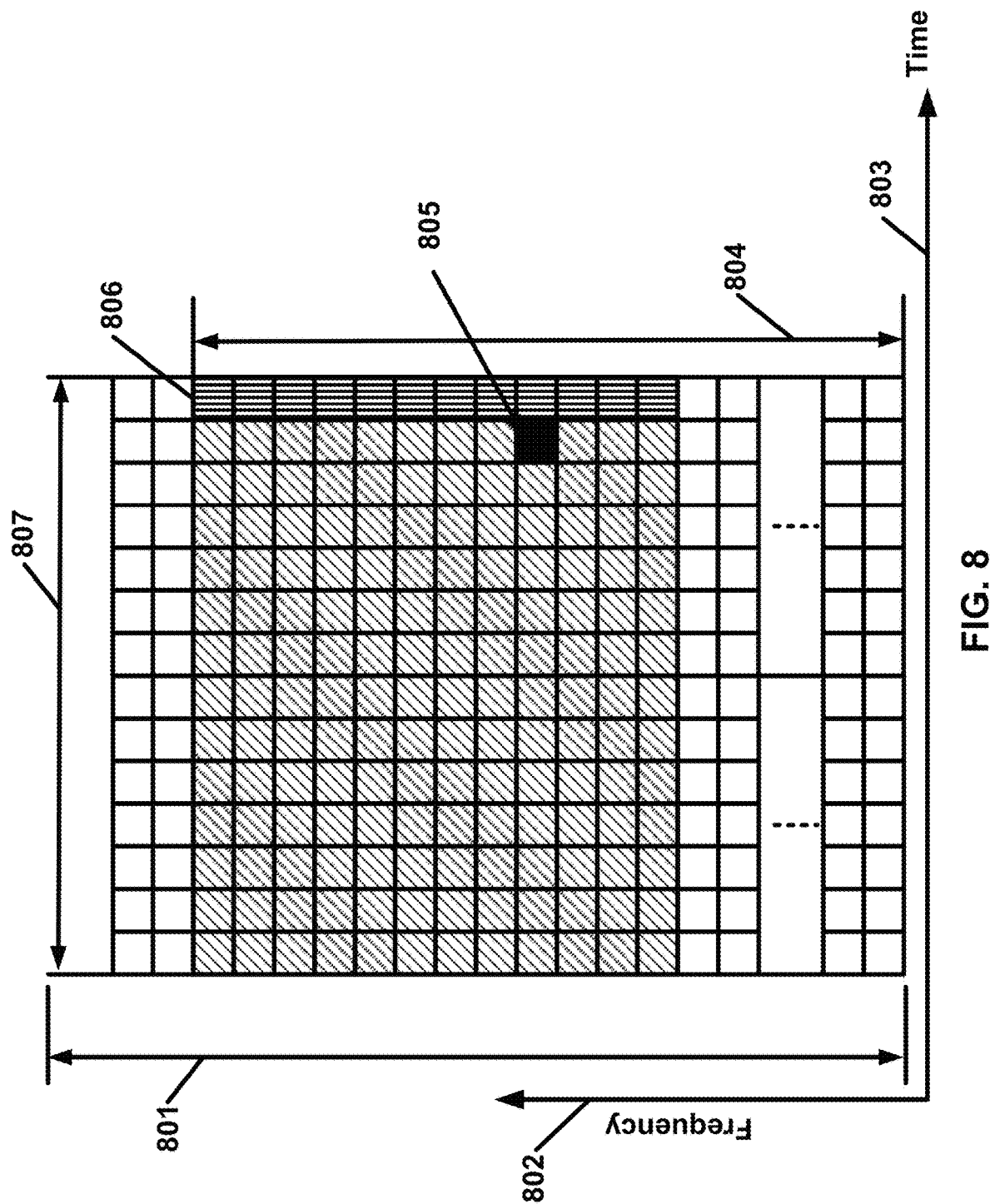
FIG. 8 shows example OFDM radio resources.

FIG. 8 shows an example of OFDM radio resources. A carrier may have a transmission bandwidth 801. A resource grid may be in a structure of frequency domain 802 and time domain 803. A resource grid may comprise a first quantity/number of OFDM symbols in a subframe and a second quantity/number of resource blocks, starting from a common resource block indicated by higher-layer signaling (e.g., RRC signaling), for a transmission numerology and a carrier. In a resource grid, a resource element 805 may comprise a resource unit that may be identified by a subcarrier index and a symbol index. A subframe may comprise a first quantity/number of OFDM symbols 807 that may depend on a numerology associated with a carrier. A subframe may have 14 OFDM symbols for a carrier, for example, if a subcarrier spacing of a numerology of a carrier is 15 kHz. A subframe may have 28 OFDM symbols, for example, if a subcarrier spacing of a numerology is 30 kHz. A subframe may have 56 OFDM symbols, for example, if a subcarrier spacing of a numerology is 60 kHz. A subcarrier spacing of a numerology may comprise any other frequency. A second quantity/number of resource blocks comprised in a resource grid of a carrier may depend on a bandwidth and a numerology of the carrier.

A resource block 806 may comprise 12 subcarriers. Multiple resource blocks may be grouped into a Resource Block Group (RBG) 804. A size of a RBG may depend on at least one of: a RRC message indicating a RBG size configuration; a size of a carrier bandwidth; and/or a size of a bandwidth part of a carrier. A carrier may comprise multiple bandwidth parts. A first bandwidth part of a carrier may have a different frequency location and/or a different bandwidth from a second bandwidth part of the carrier.

A base station may send (e.g., transmit), to a wireless device, a downlink control information comprising a downlink or uplink resource block assignment. A base station may send (e.g., transmit) to and/or receive from, a wireless device, data packets (e.g., transport blocks). The data packets may be scheduled on and transmitted via one or more resource blocks and one or more slots indicated by parameters in downlink control information and/or RRC message(s). A starting symbol relative to a first slot of the one or more slots may be indicated to the wireless device. A base station may send (e.g., transmit) to and/or receive from, a wireless device, data packets. The data packets may be scheduled for transmission on one or more RBGs and in one or more slots.

A base station may send (e.g., transmit), to a wireless device, downlink control information comprising a downlink assignment. The base station may send (e.g., transmit) the DCI via one or more PDCCHs. The downlink assignment may comprise parameters indicating at least one of a modulation and coding format; resource allocation; and/or HARQ information related to the DL-SCH. The resource allocation may comprise parameters of resource block allocation; and/or slot allocation. A base station may allocate (e.g., dynamically) resources to a wireless device, for example, via a Cell-Radio Network Temporary Identifier (C-RNTI) on one or more PDCCHs. The wireless device may monitor the one or more PDCCHs, for example, in order to find possible allocation if its downlink reception is enabled. The wireless device may receive one or more downlink data packets on one or more PDSCH scheduled by the one or more PDCCHs, for example, if the wireless device successfully detects the one or more PDCCHs.

A base station may allocate Configured Scheduling (CS) resources for down link transmission to a wireless device. The base station may send (e.g., transmit) one or more RRC messages indicating a periodicity of the CS grant. The base station may send (e.g., transmit) DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages. The CS grant may be implicitly reused, for example, until deactivated.

A base station may send (e.g., transmit), to a wireless device via one or more PDCCHs, downlink control information comprising an uplink grant. The uplink grant may comprise parameters indicating at least one of a modulation and coding format; a resource allocation; and/or HARQ information related to the UL-SCH. The resource allocation may comprise parameters of resource block allocation; and/or slot allocation. The base station may dynamically allocate resources to the wireless device via a C-RNTI on one or more PDCCHs. The wireless device may monitor the one or more PDCCHs, for example, in order to find possible resource allocation. The wireless device may send (e.g., transmit) one or more uplink data packets via one or more PUSCH scheduled by the one or more PDCCHs, for example, if the wireless device successfully detects the one or more PDCCHs.

The base station may allocate CS resources for uplink data transmission to a wireless device. The base station may transmit one or more RRC messages indicating a periodicity of the CS grant. The base station may send (e.g., transmit) DCI via a PDCCH addressed to a CS-RNTI to activate the CS resources. The DCI may comprise parameters indicating that the uplink grant is a CS grant. The CS grant may be implicitly reused according to the periodicity defined by the one or more RRC message, The CS grant may be implicitly reused, for example, until deactivated.

A base station may send (e.g., transmit) DCI and/or control signaling via a PDCCH. The DCI may comprise a format of a plurality of formats. The DCI may comprise downlink and/or uplink scheduling information (e.g., resource allocation information, HARQ related parameters, MCS), request(s) for CSI (e.g., aperiodic CQI reports), request(s) for an SRS, uplink power control commands for one or more cells, one or more timing information (e.g., TB transmission/reception timing, HARQ feedback timing, etc.), and/or the like. The DCI may indicate an uplink grant comprising transmission parameters for one or more transport blocks. The DCI may indicate a downlink assignment indicating parameters for receiving one or more transport blocks. The DCI may be used by the base station to initiate a contention-free random access at the wireless device. The base station may send (e.g., transmit) DCI comprising a slot format indicator (SFI) indicating a slot format. The base station may send (e.g., transmit) DCI comprising a preemption indication indicating the PRB(s) and/or OFDM symbol(s) in which a wireless device may assume no transmission is intended for the wireless device. The base station may send (e.g., transmit) DCI for group power control of the PUCCH, the PUSCH, and/or an SRS. DCI may correspond to an RNTI. The wireless device may obtain an RNTI after or in response to completing the initial access (e.g., C-RNTI). The base station may configure an RNTI for the wireless (e.g., CS-RNTI, TPC-CS-RNTI, TPC-PUCCH-RNTI, TPC-PUSCH-RNTI, TPC-SRS-RNTI, etc.). The wireless device may determine (e.g., compute) an RNTI (e.g., the wireless device may determine the RA-RNTI based on resources used for transmission of a preamble). An RNTI may have a pre-configured value (e.g., P-RNTI or SI-RNTI). The wireless device may monitor a group common search space which may be used by the base station for sending (e.g., transmitting) DCIs that are intended for a group of wireless devices. A group common DCI may correspond to an RNTI which is commonly configured for a group of wireless devices. The wireless device may monitor a wireless device-specific search space. A wireless device specific DCI may correspond to an RNTI configured for the wireless device.

A communications system (e.g., an NR system) may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources (e.g., which may be associated with a CSI-RS resource index (CRI)), and/or one or more DM-RSs of a PBCH, may be used as an RS for measuring a quality of a beam pair link. The quality of a beam pair link may be based on a reference signal received power (RSRP) value, a reference signal received quality (RSRQ) value, and/or a CSI value measured on RS resources. The base station may indicate whether an RS resource, used for measuring a beam pair link quality, is quasi-co-located (QCLed) with DM-RSs of a control channel. An RS resource and DM-RSs of a control channel may be called QCLed, for example, if channel characteristics from a transmission on an RS to a wireless device, and that from a transmission on a control channel to a wireless device, are similar or the same under a configured criterion. In a multi-beam operation, a wireless device may perform an uplink beam sweeping to access a cell.

A wireless device may be configured to monitor a PDCCH on one or more beam pair links simultaneously, for example, depending on a capability of the wireless device. This monitoring may increase robustness against beam pair link blocking. A base station may send (e.g., transmit) one or more messages to configure the wireless device to monitor the PDCCH on one or more beam pair links in different PDCCH OFDM symbols. A base station may send (e.g., transmit) higher layer signaling (e.g., RRC signaling) and/or a MAC CE comprising parameters related to the Rx beam setting of the wireless device for monitoring the PDCCH on one or more beam pair links. The base station may send (e.g., transmit) an indication of a spatial QCL assumption between an DL RS antenna port(s) (e.g., a cell-specific CSI-RS, a wireless device-specific CSI-RS, an SS block, and/or a PBCH with or without DM-RSs of the PBCH) and/or DL RS antenna port(s) for demodulation of a DL control channel. Signaling for beam indication for a PDCCH may comprise MAC CE signaling, RRC signaling, DCI signaling, and/or specification-transparent and/or implicit method, and/or any combination of signaling methods.

A base station may indicate spatial QCL parameters between DL RS antenna port(s) and DM-RS antenna port(s) of a DL data channel, for example, for reception of a unicast DL data channel. The base station may send (e.g., transmit) DCI (e.g., downlink grants) comprising information indicating the RS antenna port(s). The information may indicate RS antenna port(s) that may be QCL-ed with the DM-RS antenna port(s). A different set of DM-RS antenna port(s) for a DL data channel may be indicated as QCL with a different set of the RS antenna port(s).

Figure 9A:
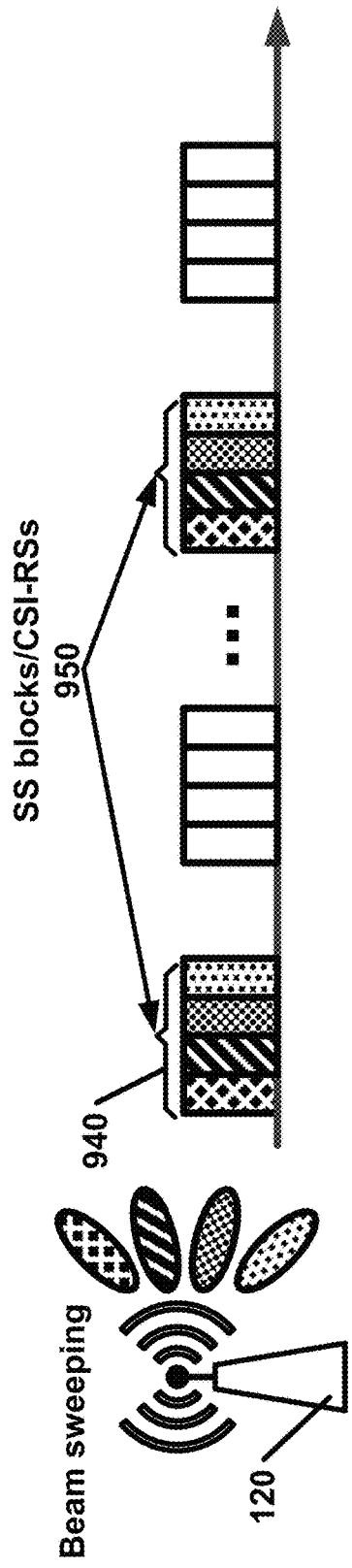
FIG. 9A shows an example channel state information reference signal (CSI-RS) and/or synchronization signal (SS) block transmission in a multi-beam system.

FIG. 9A shows an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. A base station 120 may send (e.g., transmit) SS blocks in multiple beams, together forming a SS burst 940, for example, in a multi-beam operation. One or more SS blocks may be sent (e.g., transmitted) on one beam. If multiple SS bursts 940 are transmitted with multiple beams, SS bursts together may form SS burst set 950.

A wireless device may use CSI-RS for estimating a beam quality of a link between a wireless device and a base station, for example, in the multi beam operation. A beam may be associated with a CSI-RS. A wireless device may (e.g., based on a RSRP measurement on CSI-RS) report a beam index, which may be indicated in a CRI for downlink beam selection and/or associated with an RSRP value of a beam. A CSI-RS may be sent (e.g., transmitted) on a CSI-RS resource, which may comprise at least one of: one or more antenna ports and/or one or more time and/or frequency radio resources. A CSI-RS resource may be configured in a cell-specific way such as by common RRC signaling, or in a wireless device-specific way such as by dedicated RRC signaling and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be sent (e.g., transmitted) periodically, using aperiodic transmission, or using a multi-shot or semi-persistent transmission. In a periodic transmission in FIG. 9A, a base station 120 may send (e.g., transmit) configured CSI-RS resources 940 periodically using a configured periodicity in a time domain. In an aperiodic transmission, a configured CSI-RS resource may be sent (e.g., transmitted) in a dedicated time slot. In a multi-shot and/or semi-persistent transmission, a configured CSI-RS resource may be sent (e.g., transmitted) within a configured period. Beams used for CSI-RS transmission may have a different beam width than beams used for SS-blocks transmission.

Figure 9B:
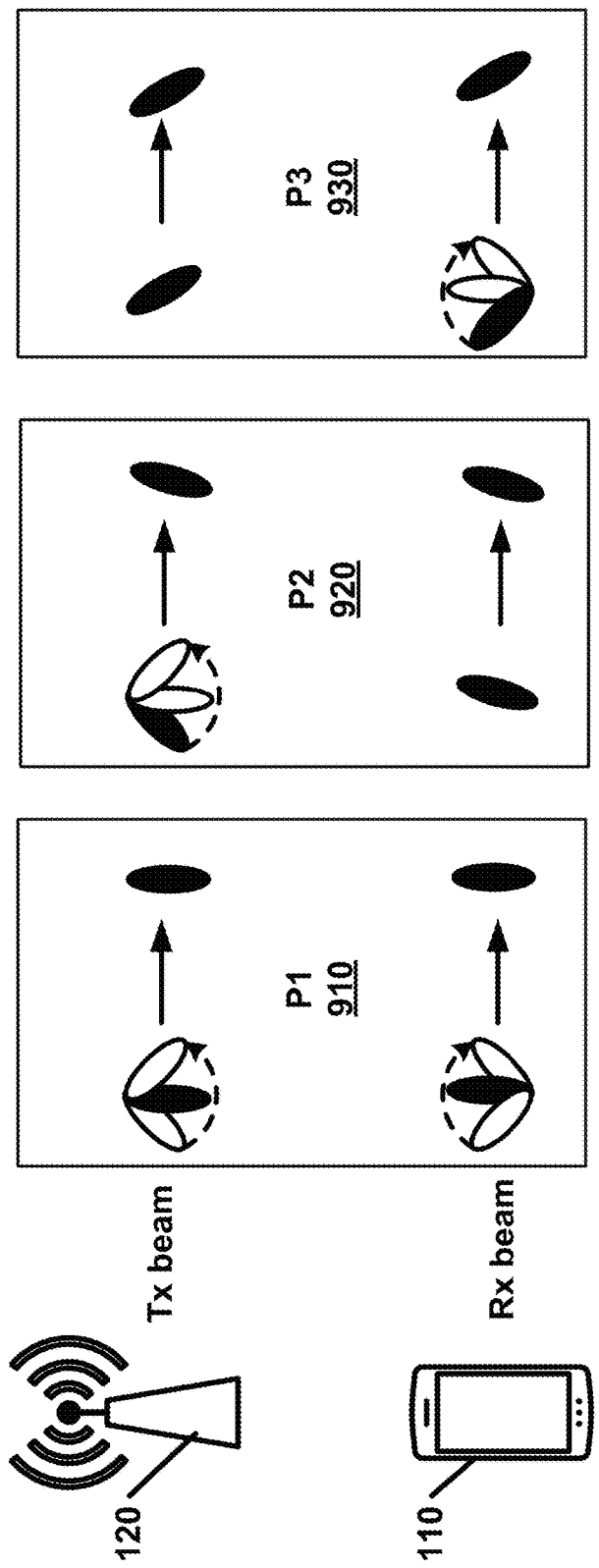
FIG. 9B shows an example downlink beam management procedure.

FIG. 9B shows an example of a beam management procedure, such as in an example new radio network. The base station 120 and/or the wireless device 110 may perform a downlink L1/L2 beam management procedure. One or more of the following downlink L1/L2 beam management procedures may be performed within one or more wireless devices 110 and one or more base stations 120. A P1 procedure 910 may be used to enable the wireless device 110 to measure one or more Transmission (Tx) beams associated with the base station 120, for example, to support a selection of a first set of Tx beams associated with the base station 120 and a first set of Rx beam(s) associated with the wireless device 110. A base station 120 may sweep a set of different Tx beams, for example, for beamforming at a base station 120 (such as shown in the top row, in a counter-clockwise direction). A wireless device 110 may sweep a set of different Rx beams, for example, for beamforming at a wireless device 110 (such as shown in the bottom row, in a clockwise direction). A P2 procedure 920 may be used to enable a wireless device 110 to measure one or more Tx beams associated with a base station 120, for example, to possibly change a first set of Tx beams associated with a base station 120. A P2 procedure 920 may be performed on a possibly smaller set of beams (e.g., for beam refinement) than in the P1 procedure 910. A P2 procedure 920 may be a special example of a P1 procedure 910. A P3 procedure 930 may be used to enable a wireless device 110 to measure at least one Tx beam associated with a base station 120, for example, to change a first set of Rx beams associated with a wireless device 110.

A wireless device 110 may send (e.g., transmit) one or more beam management reports to a base station 120. In one or more beam management reports, a wireless device 110 may indicate one or more beam pair quality parameters comprising one or more of: a beam identification; an RSRP; a Precoding Matrix Indicator (PMI), Channel Quality Indicator (CQI), and/or Rank Indicator (RI) of a subset of configured beams. Based on one or more beam management reports, the base station 120 may send (e.g., transmit) to a wireless device 110 a signal indicating that one or more beam pair links are one or more serving beams. The base station 120 may send (e.g., transmit) the PDCCH and the PDSCH for a wireless device 110 using one or more serving beams.

A communications network (e.g., a new radio network) may support a Bandwidth Adaptation (BA). Receive and/or transmit bandwidths that may be configured for a wireless device using a BA may not be large. Receive and/or transmit bandwidth may not be as large as a bandwidth of a cell. Receive and/or transmit bandwidths may be adjustable. A wireless device may change receive and/or transmit bandwidths, for example, to reduce (e.g., shrink) the bandwidth(s) at (e.g., during) a period of low activity such as to save power. A wireless device may change a location of receive and/or transmit bandwidths in a frequency domain, for example, to increase scheduling flexibility. A wireless device may change a subcarrier spacing, for example, to allow different services.

A Bandwidth Part (BWP) may comprise a subset of a total cell bandwidth of a cell. A base station may configure a wireless device with one or more BWPs, for example, to achieve a BA. A base station may indicate, to a wireless device, which of the one or more (configured) BWPs is an active BWP.

Figure 10:
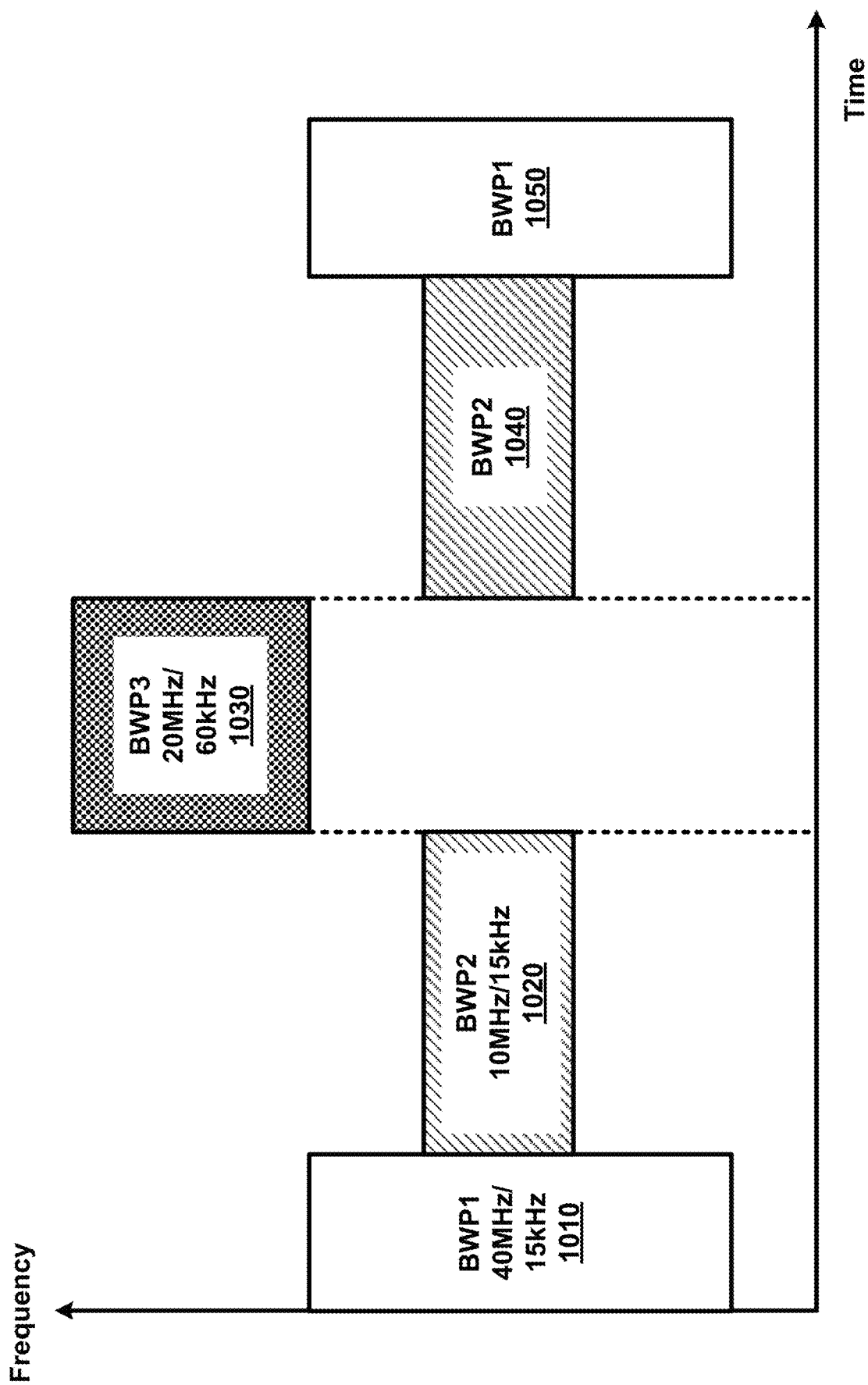
FIG. 10 shows an example of configured bandwidth parts (BWPs).

FIG. 10 shows an example of BWP configurations. BWPs may be configured as follows: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz. Any quantity/number of BWP configurations may comprise any other width and subcarrier spacing combination.

A wireless device, configured for operation in one or more BWPs of a cell, may be configured by one or more higher layers (e.g., RRC layer). The wireless device may be configured for a cell with: a set of one or more BWPs (e.g., at most four BWPs) for reception (e.g., a DL BWP set) in a DL bandwidth by at least one parameter DL-BWP; and a set of one or more BWPs (e.g., at most four BWPs) for transmissions (e.g., UL BWP set) in an UL bandwidth by at least one parameter UL-BWP.

A base station may configure a wireless device with one or more UL and DL BWP pairs, for example, to enable BA on the PCell. To enable BA on SCells (e.g., for CA), a base station may configure a wireless device at least with one or more DL BWPs (e.g., there may be none in an UL).

An initial active DL BWP may comprise at least one of a location and quantity/number of contiguous PRBs, a subcarrier spacing, or a cyclic prefix, for example, for a CORESETs for at least one common search space. For operation on the PCell, one or more higher layer parameters may indicate at least one initial UL BWP for a random access procedure.

If a wireless device is configured with a secondary carrier on a primary cell, the wireless device may be configured with an initial BWP for random access procedure on a secondary carrier.

A wireless device may expect that a center frequency for a DL BWP may be same as a center frequency for a UL BWP, for example, for unpaired spectrum operation. A base station may semi-statically configure a wireless device for a cell with one or more parameters, for example, for a DL BWP or an UL BWP in a set of one or more DL BWPs or one or more UL BWPs, respectively. The one or more parameters may indicate one or more of following: a subcarrier spacing; a cyclic prefix; a quantity/number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; and/or an offset of a first PRB of a DL bandwidth or an UL bandwidth, respectively, relative to a first PRB of a bandwidth.

For a DL BWP in a set of one or more DL BWPs on a PCell, a base station may configure a wireless device with one or more control resource sets for at least one type of common search space and/or one wireless device-specific search space. A base station may not configure a wireless device without a common search space on a PCell, or on a PSCell, in an active DL BWP. For an UL BWP in a set of one or more UL BWPs, a base station may configure a wireless device with one or more resource sets for one or more PUCCH transmissions.

DCI may comprise a BWP indicator field. The BWP indicator field value may indicate an active DL BWP, from a configured DL BWP set, for one or more DL receptions. The BWP indicator field value may indicate an active UL BWP, from a configured UL BWP set, for one or more UL transmissions.

For a PCell, a base station may semi-statically configure a wireless device with a default DL BWP among configured DL BWPs. If a wireless device is not provided a default DL BWP, a default BWP may be an initial active DL BWP.

A base station may configure a wireless device with a timer value for a PCell. A wireless device may start a timer (e.g., a BWP inactivity timer), for example, if a wireless device detects DCI indicating an active DL BWP, other than a default DL BWP, for a paired spectrum operation, and/or if a wireless device detects DCI indicating an active DL BWP or UL BWP, other than a default DL BWP or UL BWP, for an unpaired spectrum operation. The wireless device may increment the timer by an interval of a first value (e.g., the first value may be 1 millisecond, 0.5 milliseconds, or any other time duration), for example, if the wireless device does not detect DCI at (e.g., during) the interval for a paired spectrum operation or for an unpaired spectrum operation. The timer may expire at a time that the timer is equal to the timer value. A wireless device may switch to the default DL BWP from an active DL BWP, for example, if the timer expires.

A base station may semi-statically configure a wireless device with one or more BWPs. A wireless device may switch an active BWP from a first BWP to a second BWP, for example, after or in response to receiving DCI indicating the second BWP as an active BWP, and/or after or in response to an expiry of BWP inactivity timer (e.g., the second BWP may be a default BWP). FIG. 10 shows an example of three BWPs configured, BWP1 (1010 and 1050), BWP2 (1020 and 1040), and BWP3 (1030). BWP2 (1020 and 1040) may be a default BWP. BWP1 (1010) may be an initial active BWP. A wireless device may switch an active BWP from BWP1 1010 to BWP2 1020, for example, after or in response to an expiry of the BWP inactivity timer. A wireless device may switch an active BWP from BWP2 1020 to BWP3 1030, for example, after or in response to receiving DCI indicating BWP3 1030 as an active BWP. Switching an active BWP from BWP3 1030 to BWP2 1040 and/or from BWP2 1040 to BWP1 1050 may be after or in response to receiving DCI indicating an active BWP, and/or after or in response to an expiry of BWP inactivity timer.

Wireless device procedures on a secondary cell may be same as on a primary cell using the timer value for the secondary cell and the default DL BWP for the secondary cell, for example, if a wireless device is configured for a secondary cell with a default DL BWP among configured DL BWPs and a timer value. A wireless device may use an indicated DL BWP and an indicated UL BWP on a secondary cell as a respective first active DL BWP and first active UL BWP on a secondary cell or carrier, for example, if a base station configures a wireless device with a first active DL BWP and a first active UL BWP on a secondary cell or carrier.

Figure 11A:
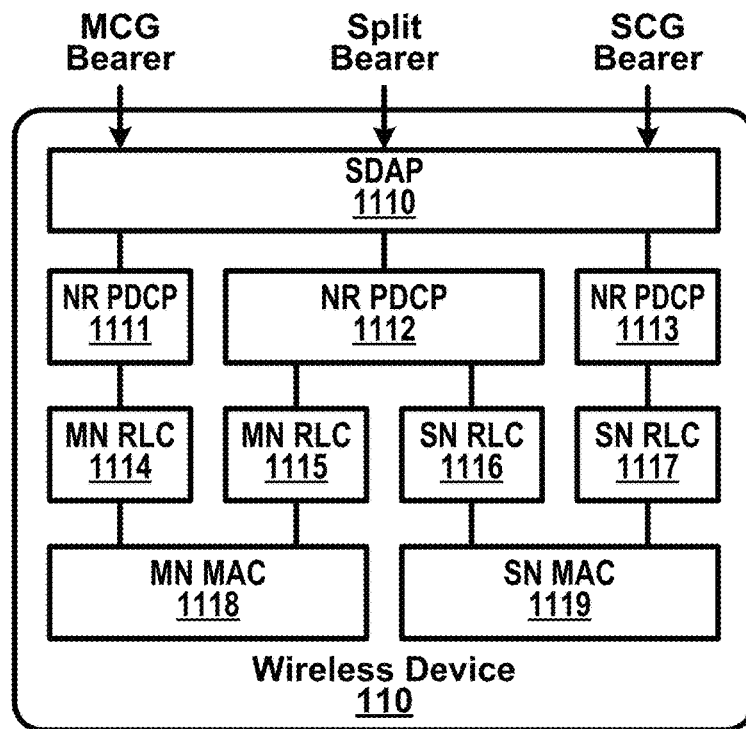
FIG. 11A and FIG. 11B show examples of multi connectivity.
Figure 11B:
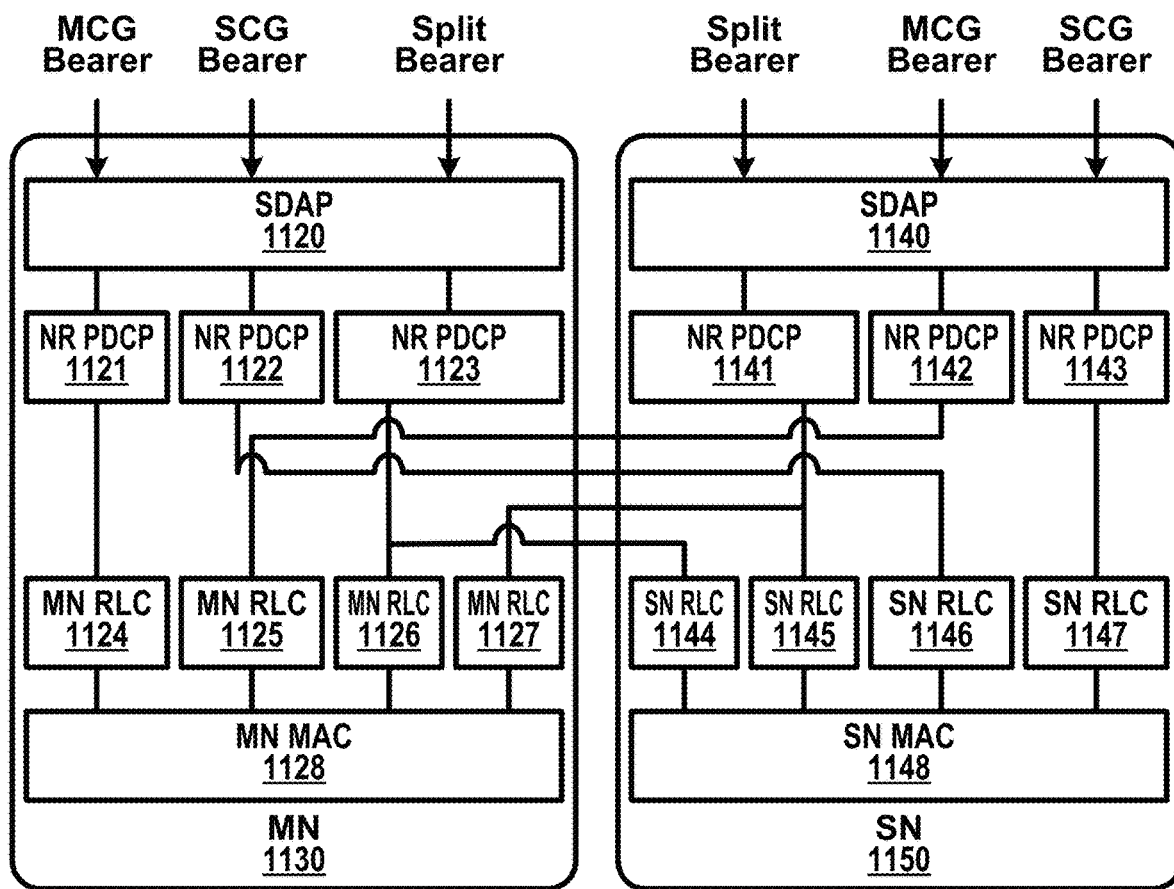

FIG. 11A and FIG. 11B show packet flows using a multi connectivity (e.g., dual connectivity, multi connectivity, tight interworking, and/or the like). FIG. 11A shows an example of a protocol structure of a wireless device 110 (e.g., UE) with CA and/or multi connectivity. FIG. 11B shows an example of a protocol structure of multiple base stations with CA and/or multi connectivity. The multiple base stations may comprise a master node, MN 1130 (e.g., a master node, a master base station, a master gNB, a master eNB, and/or the like) and a secondary node, SN 1150 (e.g., a secondary node, a secondary base station, a secondary gNB, a secondary eNB, and/or the like). A master node 1130 and a secondary node 1150 may co-work to communicate with a wireless device 110.

If multi connectivity is configured for a wireless device 110, the wireless device 110, which may support multiple reception and/or transmission functions in an RRC connected state, may be configured to utilize radio resources provided by multiple schedulers of a multiple base stations. Multiple base stations may be inter-connected via a non-ideal or ideal backhaul (e.g., Xn interface, X2 interface, and/or the like). A base station involved in multi connectivity for a certain wireless device may perform at least one of two different roles: a base station may act as a master base station or act as a secondary base station. In multi connectivity, a wireless device may be connected to one master base station and one or more secondary base stations. A master base station (e.g., the MN 1130) may provide a master cell group (MCG) comprising a primary cell and/or one or more secondary cells for a wireless device (e.g., the wireless device 110). A secondary base station (e.g., the SN 1150) may provide a secondary cell group (SCG) comprising a primary secondary cell (PSCell) and/or one or more secondary cells for a wireless device (e.g., the wireless device 110).

In wireless communications (e.g., in multi connectivity), a radio protocol architecture that a bearer uses may depend on how a bearer is setup. Three different types of bearer setup options may be supported: an MCG bearer, an SCG bearer, and/or a split bearer. A wireless device may receive and/or send (e.g., transmit) packets of an MCG bearer via one or more cells of the MCG. A wireless device may receive and/or send (e.g., transmit) packets of an SCG bearer via one or more cells of an SCG. Multi-connectivity may indicate having at least one bearer configured to use radio resources provided by the secondary base station. Multi-connectivity may or may not be configured and/or implemented.

A wireless device (e.g., wireless device 110) may send (e.g., transmit) and/or receive: packets of an MCG bearer via an SDAP layer (e.g., SDAP 1110), a PDCP layer (e.g., NR PDCP 1111), an RLC layer (e.g., MN RLC 1114), and a MAC layer (e.g., MN MAC 1118); packets of a split bearer via an SDAP layer (e.g., SDAP 1110), a PDCP layer (e.g., NR PDCP 1112), one of a master or secondary RLC layer (e.g., MN RLC 1115, SN RLC 1116), and one of a master or secondary MAC layer (e.g., MN MAC 1118, SN MAC 1119); and/or packets of an SCG bearer via an SDAP layer (e.g., SDAP 1110), a PDCP layer (e.g., NR PDCP 1113), an RLC layer (e.g., SN RLC 1117), and a MAC layer (e.g., MN MAC 1119).

A master base station (e.g., MN 1130) and/or a secondary base station (e.g., SN 1150) may send (e.g., transmit) and/or receive: packets of an MCG bearer via a master or secondary node SDAP layer (e.g., SDAP 1120, SDAP 1140), a master or secondary node PDCP layer (e.g., NR PDCP 1121, NR PDCP 1142), a master node RLC layer (e.g., MN RLC 1124, MN RLC 1125), and a master node MAC layer (e.g., MN MAC 1128); packets of an SCG bearer via a master or secondary node SDAP layer (e.g., SDAP 1120, SDAP 1140), a master or secondary node PDCP layer (e.g., NR PDCP 1122, NR PDCP 1143), a secondary node RLC layer (e.g., SN RLC 1146, SN RLC 1147), and a secondary node MAC layer (e.g., SN MAC 1148); packets of a split bearer via a master or secondary node SDAP layer (e.g., SDAP 1120, SDAP 1140), a master or secondary node PDCP layer (e.g., NR PDCP 1123, NR PDCP 1141), a master or secondary node RLC layer (e.g., MN RLC 1126, SN RLC 1144, SN RLC 1145, MN RLC 1127), and a master or secondary node MAC layer (e.g., MN MAC 1128, SN MAC 1148).

In multi connectivity, a wireless device may configure multiple MAC entities, such as one MAC entity (e.g., MN MAC 1118) for a master base station, and other MAC entities (e.g., SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be used. At least one cell of an SCG may have a configured UL CC and at least one cell of a SCG, named as primary secondary cell (e.g., PSCell, PCell of SCG, PCell), and may be configured with PUCCH resources. If an SCG is configured, there may be at least one SCG bearer or one split bearer. After or upon detection of a physical layer problem or a random access problem on a PSCell, or a quantity/number of NR RLC retransmissions has been reached associated with the SCG, or after or upon detection of an access problem on a PSCell associated with (e.g., during) a SCG addition or an SCG change: an RRC connection re-establishment procedure may not be triggered, UL transmissions towards cells of an SCG may be stopped, a master base station may be informed by a wireless device of a SCG failure type, a DL data transfer over a master base station may be maintained (e.g., for a split bearer). An NR RLC acknowledged mode (AM) bearer may be configured for a split bearer. A PCell and/or a PSCell may not be de-activated. A PSCell may be changed with a SCG change procedure (e.g., with security key change and a RACH procedure). A bearer type change between a split bearer and a SCG bearer, and/or simultaneous configuration of a SCG and a split bearer, may or may not be supported.

With respect to interactions between a master base station and a secondary base stations for multi-connectivity, one or more of the following may be used. A master base station and/or a secondary base station may maintain RRM measurement configurations of a wireless device. A master base station may determine (e.g., based on received measurement reports, traffic conditions, and/or bearer types) to request a secondary base station to provide additional resources (e.g., serving cells) for a wireless device. After or upon receiving a request from a master base station, a secondary base station may create and/or modify a container that may result in a configuration of additional serving cells for a wireless device (or decide that the secondary base station has no resource available to do so). For a wireless device capability coordination, a master base station may provide (e.g., all or a part of) an AS configuration and wireless device capabilities to a secondary base station. A master base station and a secondary base station may exchange information about a wireless device configuration such as by using RRC containers (e.g., inter-node messages) transmitted via Xn messages. A secondary base station may initiate a reconfiguration of the secondary base station existing serving cells (e.g., PUCCH towards the secondary base station). A secondary base station may decide which cell is a PSCell within a SCG. A master base station may or may not change content of RRC configurations provided by a secondary base station. A master base station may provide recent (and/or the latest) measurement results for SCG cell(s), for example, if an SCG addition and/or an SCG SCell addition occurs. A master base station and secondary base stations may receive information of SFN and/or subframe offset of each other from an OAM and/or via an Xn interface (e.g., for a purpose of DRX alignment and/or identification of a measurement gap). Dedicated RRC signaling may be used for sending required system information of a cell as for CA, for example, if adding a new SCG SCell, except for an SFN acquired from an MIB of a PSCell of a SCG.

Figure 12:
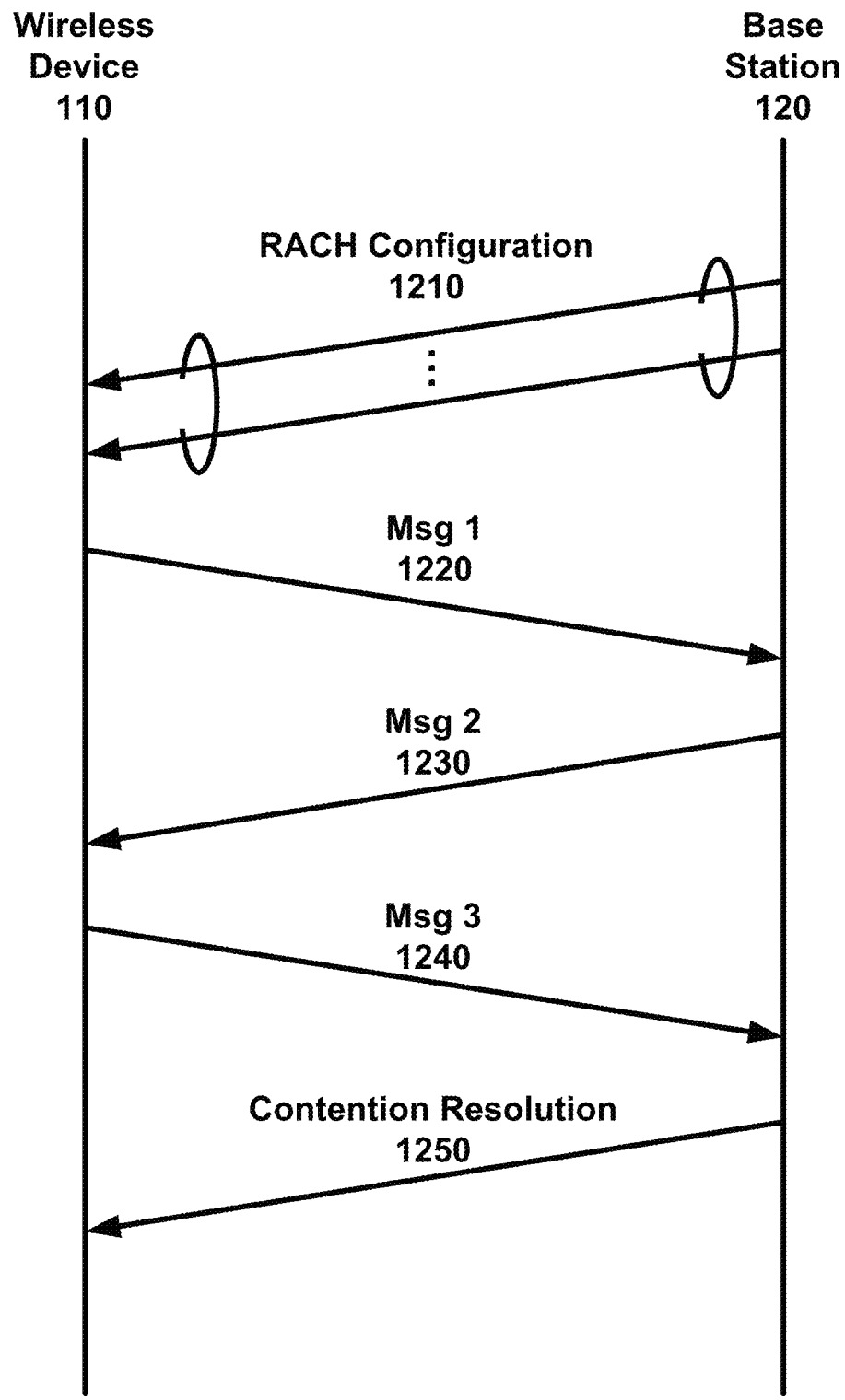
FIG. 12 shows an example of a random access procedure.

FIG. 12 shows an example of a random access procedure. One or more events may trigger a random access procedure. For example, one or more events may be at least one of following: initial access from RRC_IDLE, RRC connection re-establishment procedure, handover, DL or UL data arrival in (e.g., during) a state of RRC_CONNECTED (e.g., if UL synchronization status is non-synchronized), transition from RRC_Inactive, and/or request for other system information. A PDCCH order, a MAC entity, and/or a beam failure indication may initiate a random access procedure.

A random access procedure may comprise or be one of at least a contention based random access procedure and/or a contention free random access procedure. A contention based random access procedure may comprise one or more Msg 1 1220 transmissions, one or more Msg2 1230 transmissions, one or more Msg3 1240 transmissions, and contention resolution 1250. A contention free random access procedure may comprise one or more Msg 1 1220 transmissions and one or more Msg2 1230 transmissions. One or more of Msg 1 1220, Msg 2 1230, Msg 3 1240, and/or contention resolution 1250 may be transmitted in the same step. A two-step random access procedure, for example, may comprise a first transmission (e.g., Msg A) and a second transmission (e.g., Msg B). The first transmission (e.g., Msg A) may comprise transmitting, by a wireless device (e.g., wireless device 110) to a base station (e.g., base station 120), one or more messages indicating an equivalent and/or similar contents of Msg1 1220 and Msg3 1240 of a four-step random access procedure. The second transmission (e.g., Msg B) may comprise transmitting, by the base station (e.g., base station 120) to a wireless device (e.g., wireless device 110) after or in response to the first message, one or more messages indicating an equivalent and/or similar content of Msg2 1230 and contention resolution 1250 of a four-step random access procedure.

A base station may send (e.g., transmit, unicast, multicast, broadcast, etc.), to a wireless device, a RACH configuration 1210 via one or more beams. The RACH configuration 1210 may comprise one or more parameters indicating at least one of following: an available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), a random access preamble index, a maximum quantity/number of preamble transmissions, preamble group A and group B, a threshold (e.g., message size) to determine the groups of random access preambles, a set of one or more random access preambles for a system information request and corresponding PRACH resource(s) (e.g., if any), a set of one or more random access preambles for a beam failure recovery request and corresponding PRACH resource(s) (e.g., if any), a time window to monitor RA response(s), a time window to monitor response(s) on a beam failure recovery request, and/or a contention resolution timer.

The Msg1 1220 may comprise one or more transmissions of a random access preamble. For a contention based random access procedure, a wireless device may select an SS block with an RSRP above the RSRP threshold. If random access preambles group B exists, a wireless device may select one or more random access preambles from a group A or a group B, for example, depending on a potential Msg3 1240 size. If a random access preambles group B does not exist, a wireless device may select the one or more random access preambles from a group A. A wireless device may select a random access preamble index randomly (e.g., with equal probability or a normal distribution) from one or more random access preambles associated with a selected group. If a base station semi-statically configures a wireless device with an association between random access preambles and SS blocks, the wireless device may select a random access preamble index randomly with equal probability from one or more random access preambles associated with a selected SS block and a selected group.

A wireless device may initiate a contention free random access procedure, for example, based on a beam failure indication from a lower layer. A base station may semi-statically configure a wireless device with one or more contention free PRACH resources for a beam failure recovery request associated with at least one of SS blocks and/or CSI-RSs. A wireless device may select a random access preamble index corresponding to a selected SS block or a CSI-RS from a set of one or more random access preambles for a beam failure recovery request, for example, if at least one of the SS blocks with an RSRP above a first RSRP threshold amongst associated SS blocks is available, and/or if at least one of CSI-RSs with a RSRP above a second RSRP threshold amongst associated CSI-RSs is available.

A wireless device may receive, from a base station, a random access preamble index via PDCCH or RRC for a contention free random access procedure. The wireless device may select a random access preamble index, for example, if a base station does not configure a wireless device with at least one contention free PRACH resource associated with SS blocks or CSI-RS. The wireless device may select the at least one SS block and/or select a random access preamble corresponding to the at least one SS block, for example, if a base station configures the wireless device with one or more contention free PRACH resources associated with SS blocks and/or if at least one SS block with a RSRP above a first RSRP threshold amongst associated SS blocks is available. The wireless device may select the at least one CSI-RS and/or select a random access preamble corresponding to the at least one CSI-RS, for example, if a base station configures a wireless device with one or more contention free PRACH resources associated with CSI-RSs and/or if at least one CSI-RS with a RSRP above a second RSPR threshold amongst the associated CSI-RSs is available.

A wireless device may perform one or more Msg1 1220 transmissions, for example, by sending (e.g., transmitting) the selected random access preamble. The wireless device may determine a PRACH occasion from one or more PRACH occasions corresponding to a selected SS block, for example, if the wireless device selects an SS block and is configured with an association between one or more PRACH occasions and/or one or more SS blocks. The wireless device may determine a PRACH occasion from one or more PRACH occasions corresponding to a selected CSI-RS, for example, if the wireless device selects a CSI-RS and is configured with an association between one or more PRACH occasions and one or more CSI-RSs. The wireless device may send (e.g., transmit), to a base station, a selected random access preamble via a selected PRACH occasions. The wireless device may determine a transmit power for a transmission of a selected random access preamble at least based on an initial preamble power and a power-ramping factor. The wireless device may determine an RA-RNTI associated with a selected PRACH occasion in which a selected random access preamble is sent (e.g., transmitted). The wireless device may not determine an RA-RNTI for a beam failure recovery request. The wireless device may determine an RA-RNTI at least based on an index of a first OFDM symbol, an index of a first slot of a selected PRACH occasions, and/or an uplink carrier index for a transmission of Msg1 1220.

A wireless device may receive, from a base station, a random access response, Msg 2 1230. The wireless device may start a time window (e.g., ra-ResponseWindow) to monitor a random access response. For a beam failure recovery procedure, the base station may configure the wireless device with a different time window (e.g., bfr-ResponseWindow) to monitor response to on a beam failure recovery request. The wireless device may start a time window (e.g., ra-ResponseWindow or bfr-ResponseWindow) at a start of a first PDCCH occasion, for example, after a fixed duration of one or more symbols from an end of a preamble transmission. If the wireless device sends (e.g., transmits) multiple preambles, the wireless device may start a time window at a start of a first PDCCH occasion after a fixed duration of one or more symbols from an end of a first preamble transmission. The wireless device may monitor a PDCCH of a cell for at least one random access response identified by a RA-RNTI, or for at least one response to a beam failure recovery request identified by a C-RNTI, at a time that a timer for a time window is running.

A wireless device may determine that a reception of random access response is successful, for example, if at least one random access response comprises a random access preamble identifier corresponding to a random access preamble sent (e.g., transmitted) by the wireless device. The wireless device may determine that the contention free random access procedure is successfully completed, for example, if a reception of a random access response is successful. The wireless device may determine that a contention free random access procedure is successfully complete, for example, if a contention-free random access procedure is triggered for a beam failure recovery request and if a PDCCH transmission is addressed to a C-RNTI. The wireless device may determine that the random access procedure is successfully completed, and may indicate a reception of an acknowledgement for a system information request to upper layers, for example, if at least one random access response comprises a random access preamble identifier. The wireless device may stop sending (e.g., transmitting) remaining preambles (if any) after or in response to a successful reception of a corresponding random access response, for example, if the wireless device has signaled multiple preamble transmissions.

The wireless device may perform one or more Msg 3 1240 transmissions, for example, after or in response to a successful reception of random access response (e.g., for a contention based random access procedure). The wireless device may adjust an uplink transmission timing, for example, based on a timing advanced command indicated by a random access response. The wireless device may send (e.g., transmit) one or more transport blocks, for example, based on an uplink grant indicated by a random access response. Subcarrier spacing for PUSCH transmission for Msg3 1240 may be provided by at least one higher layer (e.g., RRC) parameter. The wireless device may send (e.g., transmit) a random access preamble via a PRACH, and Msg3 1240 via PUSCH, on the same cell. A base station may indicate an UL BWP for a PUSCH transmission of Msg3 1240 via system information block. The wireless device may use HARQ for a retransmission of Msg 3 1240.

Multiple wireless devices may perform Msg 1 1220, for example, by sending (e.g., transmitting) the same preamble to a base station. The multiple wireless devices may receive, from the base station, the same random access response comprising an identity (e.g., TC-RNTI). Contention resolution (e.g., comprising the wireless device 110 receiving contention resolution 1250) may be used to increase the likelihood that a wireless device does not incorrectly use an identity of another wireless device. The contention resolution 1250 may be based on, for example, a C-RNTI on a PDCCH, and/or a wireless device contention resolution identity on a DL-SCH. If a base station assigns a C-RNTI to a wireless device, the wireless device may perform contention resolution (e.g., comprising receiving contention resolution 1250), for example, based on a reception of a PDCCH transmission that is addressed to the C-RNTI. The wireless device may determine that contention resolution is successful, and/or that a random access procedure is successfully completed, for example, after or in response to detecting a C-RNTI on a PDCCH. If a wireless device has no valid C-RNTI, a contention resolution may be addressed by using a TC-RNTI. If a MAC PDU is successfully decoded and a MAC PDU comprises a wireless device contention resolution identity MAC CE that matches or otherwise corresponds with the CCCH SDU sent (e.g., transmitted) in Msg3 1250, the wireless device may determine that the contention resolution (e.g., comprising contention resolution 1250) is successful and/or the wireless device may determine that the random access procedure is successfully completed.

Figure 13:
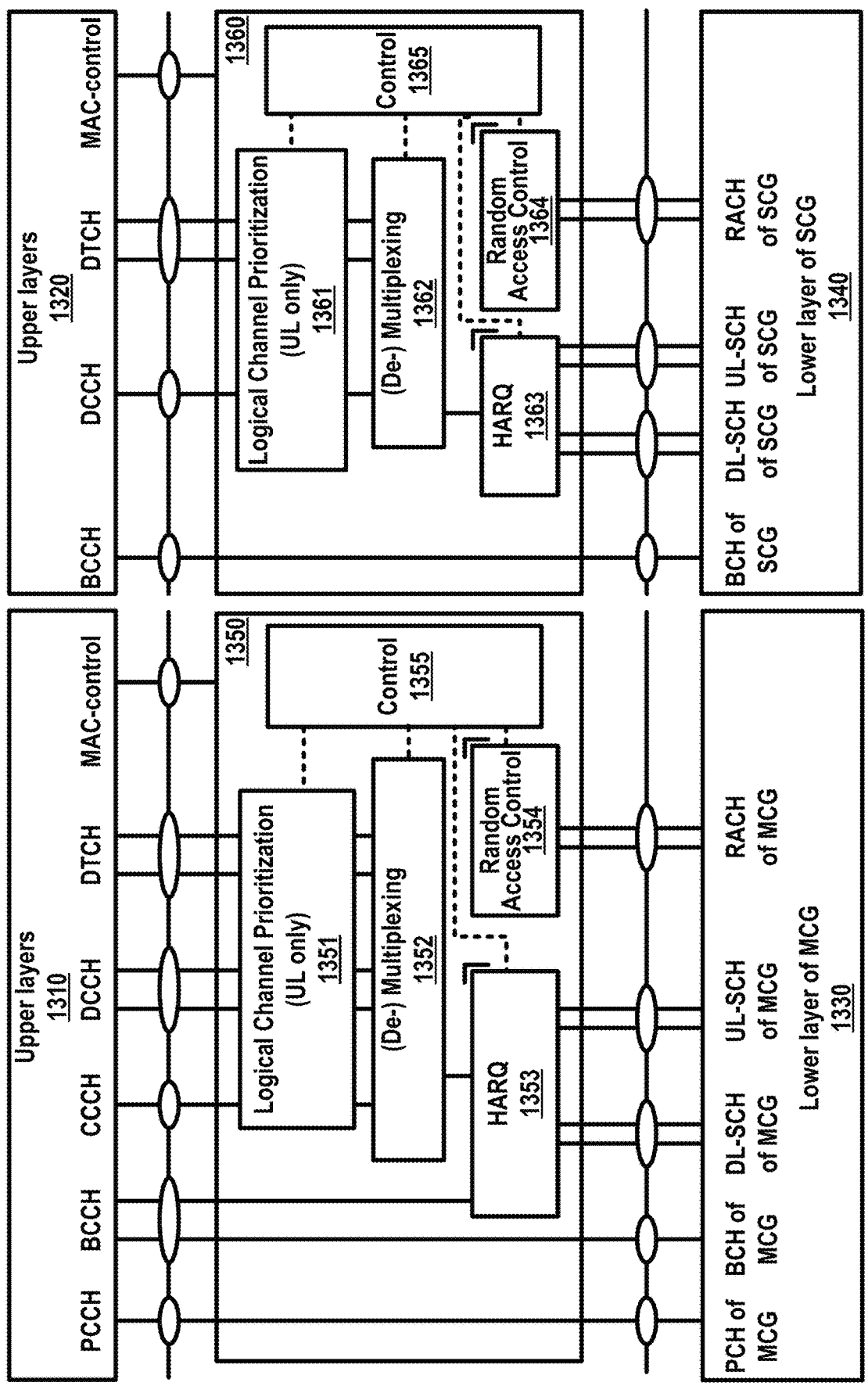
FIG. 13 shows example medium access control (MAC) entities.

FIG. 13 shows an example structure for MAC entities. A wireless device may be configured to operate in a multi-connectivity mode. A wireless device in RRC_CON-NECTED with multiple Rx/Tx may be configured to utilize radio resources provided by multiple schedulers that may be located in a plurality of base stations. The plurality of base stations may be connected via a non-ideal or ideal backhaul over the Xn interface. A base station in a plurality of base stations may act as a master base station or as a secondary base station. A wireless device may be connected to and/or in communication with, for example, one master base station and one or more secondary base stations. A wireless device may be configured with multiple MAC entities, for example, one MAC entity for a master base station, and one or more other MAC entities for secondary base station(s). A configured set of serving cells for a wireless device may comprise two subsets: an MCG comprising serving cells of a master base station, and one or more SCGs comprising serving cells of a secondary base station(s). FIG. 13 shows an example structure for MAC entities in which a MCG and a SCG are configured for a wireless device.

At least one cell in a SCG may have a configured UL CC. A cell of the at least one cell may comprise a PSCell or a PCell of a SCG, or a PCell. A PSCell may be configured with PUCCH resources. There may be at least one SCG bearer, or one split bearer, for a SCG that is configured. After or upon detection of a physical layer problem or a random access problem on a PSCell, after or upon reaching a quantity/number of RLC retransmissions associated with the SCG, and/or after or upon detection of an access problem on a PSCell associated with (e.g., during) a SCG addition or a SCG change: an RRC connection re-establishment procedure may not be triggered, UL transmissions towards cells of a SCG may be stopped, and/or a master base station may be informed by a wireless device of a SCG failure type and DL data transfer over a master base station may be maintained.

A MAC sublayer may provide services such as data transfer and radio resource allocation to upper layers (e.g., 1310 or 1320). A MAC sublayer may comprise a plurality of MAC entities (e.g., 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. BCCH, PCCH, CCCH and/or DCCH may be control channels, and DTCH may be a traffic channel. A first MAC entity (e.g., 1310) may provide services on PCCH, BCCH, CCCH, DCCH, DTCH, and/or MAC control elements. A second MAC entity (e.g., 1320) may provide services on BCCH, DCCH, DTCH, and/or MAC control elements.

A MAC sublayer may expect from a physical layer (e.g., 1330 or 1340) services such as data transfer services, signaling of HARQ feedback, and/or signaling of scheduling request or measurements (e.g., CQI). In dual connectivity, two MAC entities may be configured for a wireless device: one for a MCG and one for a SCG. A MAC entity of a wireless device may handle a plurality of transport channels. A first MAC entity may handle first transport channels comprising a PCCH of a MCG, a first BCH of the MCG, one or more first DL-SCHs of the MCG, one or more first UL-SCHs of the MCG, and/or one or more first RACHs of the MCG. A second MAC entity may handle second transport channels comprising a second BCH of a SCG, one or more second DL-SCHs of the SCG, one or more second UL-SCHs of the SCG, and/or one or more second RACHs of the SCG.

If a MAC entity is configured with one or more SCells, there may be multiple DL-SCHs, multiple UL-SCHs, and/or multiple RACHs per MAC entity. There may be one DL-SCH and/or one UL-SCH on an SpCell. There may be one DL-SCH, zero or one UL-SCH, and/or zero or one RACH for an SCell. A DL-SCH may support receptions using different numerologies and/or TTI duration within a MAC entity. A UL-SCH may support transmissions using different numerologies and/or TTI duration within the MAC entity.

A MAC sublayer may support different functions. The MAC sublayer may control these functions with a control (e.g., Control 1355 and/or Control 1365) element. Functions performed by a MAC entity may comprise one or more of: mapping between logical channels and transport channels (e.g., in uplink or downlink), multiplexing (e.g., (De-) Multiplexing 1352 and/or (De-) Multiplexing 1362) of MAC SDUs from one or different logical channels onto transport blocks (TBs) to be delivered to the physical layer on transport channels (e.g., in uplink), demultiplexing (e.g., (De-) Multiplexing 1352 and/or (De-) Multiplexing 1362) of MAC SDUs to one or different logical channels from transport blocks (TBs) delivered from the physical layer on transport channels (e.g., in downlink), scheduling information reporting (e.g., in uplink), error correction through HARQ in uplink and/or downlink (e.g., 1363), and logical channel prioritization in uplink (e.g., Logical Channel Prioritization 1351 and/or Logical Channel Prioritization 1361). A MAC entity may handle a random access process (e.g., Random Access Control 1354 and/or Random Access Control 1364).

Figure 14:
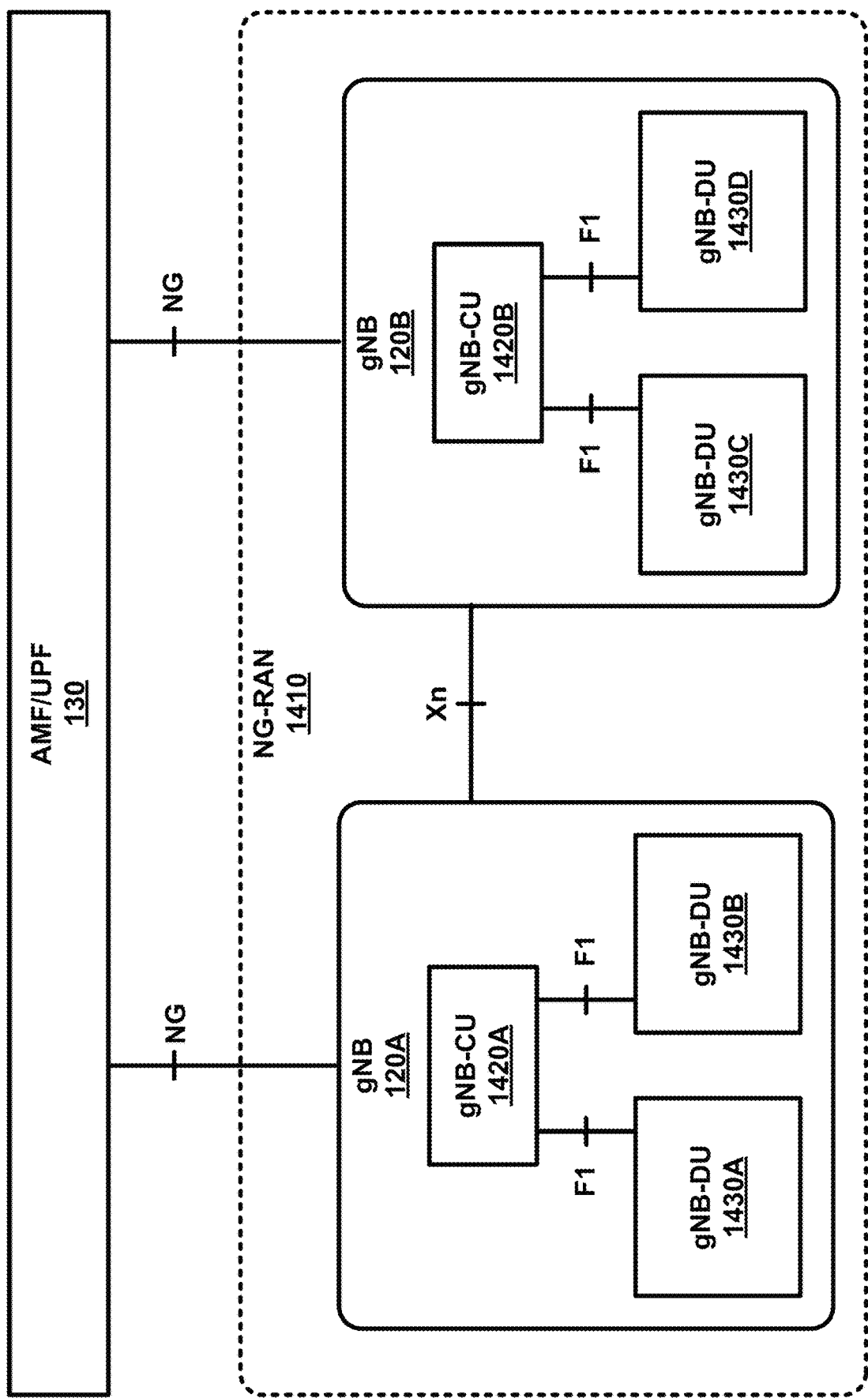
FIG. 14 shows an example RAN architecture.

FIG. 14 shows an example of a RAN architecture comprising one or more base stations. A protocol stack (e.g., RRC, SDAP, PDCP, RLC, MAC, and/or PHY) may be supported at a node. A base station (e.g., 120A and/or 120B) may comprise a base station central unit (CU) (e.g., gNB-CU 1420A or 1420B) and at least one base station distributed unit (DU) (e.g., gNB-DU 1430A, 1430B, 1430C, and/or 1430D), for example, if a functional split is configured. Upper protocol layers of a base station may be located in a base station CU, and lower layers of the base station may be located in the base station DUs. An F1 interface (e.g., CU-DU interface) connecting a base station CU and base station DUs may be an ideal or non-ideal backhaul. F1-C may provide a control plane connection over an F1 interface, and F1-U may provide a user plane connection over the F1 interface. An Xn interface may be configured between base station CUs.

A base station CU may comprise an RRC function, an SDAP layer, and/or a PDCP layer. Base station DUs may comprise an RLC layer, a MAC layer, and/or a PHY layer. Various functional split options between a base station CU and base station DUs may be possible, for example, by locating different combinations of upper protocol layers (e.g., RAN functions) in a base station CU and different combinations of lower protocol layers (e.g., RAN functions) in base station DUs. A functional split may support flexibility to move protocol layers between a base station CU and base station DUs, for example, depending on service requirements and/or network environments.

Functional split options may be configured per base station, per base station CU, per base station DU, per wireless device, per bearer, per slice, and/or with other granularities. In a per base station CU split, a base station CU may have a fixed split option, and base station DUs may be configured to match a split option of a base station CU. In a per base station DU split, a base station DU may be configured with a different split option, and a base station CU may provide different split options for different base station DUs. In a per wireless device split, a base station (e.g., a base station CU and at least one base station DUs) may provide different split options for different wireless devices. In a per bearer split, different split options may be utilized for different bearers. In a per slice splice, different split options may be used for different slices.

Figure 15:
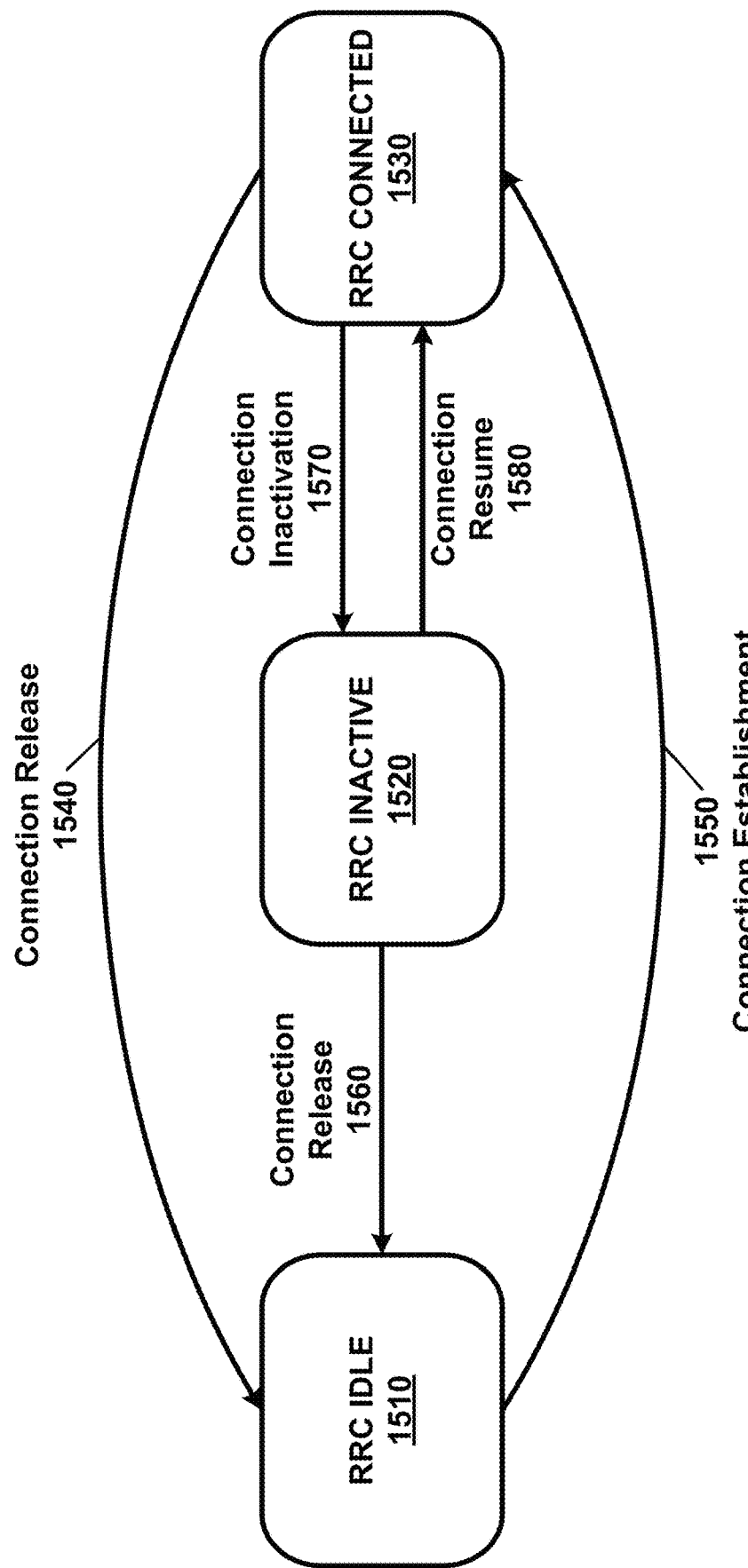
FIG. 15 shows example radio resource control (RRC) states.

FIG. 15 shows example RRC state transitions of a wireless device. A wireless device may be in at least one RRC state among an RRC connected state (e.g., RRC Connected 1530, RRC_Connected, etc.), an RRC idle state (e.g., RRC Idle 1510, RRC_Idle, etc.), and/or an RRC inactive state (e.g., RRC Inactive 1520, RRC_Inactive, etc.). In an RRC connected state, a wireless device may have at least one RRC connection with at least one base station (e.g., gNB and/or eNB), which may have a context of the wireless device (e.g., UE context). A wireless device context (e.g., UE context) may comprise at least one of an access stratum context, one or more radio link configuration parameters, bearer (e.g., data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an RRC idle state, a wireless device may not have an RRC connection with a base station, and a context of the wireless device may not be stored in a base station. In an RRC inactive state, a wireless device may not have an RRC connection with a base station. A context of a wireless device may be stored in a base station, which may comprise an anchor base station (e.g., a last serving base station).

A wireless device may transition an RRC state (e.g., UE RRC state) between an RRC idle state and an RRC connected state in both ways (e.g., connection release 1540 or connection establishment 1550; and/or connection reestablishment) and/or between an RRC inactive state and an RRC connected state in both ways (e.g., connection inactivation 1570 or connection resume 1580). A wireless device may transition its RRC state from an RRC inactive state to an RRC idle state (e.g., connection release 1560).

An anchor base station may be a base station that may keep a context of a wireless device (e.g., UE context) at least at (e.g., during) a time period that the wireless device stays in a RAN notification area (RNA) of an anchor base station, and/or at (e.g., during) a time period that the wireless device stays in an RRC inactive state. An anchor base station may comprise a base station that a wireless device in an RRC inactive state was most recently connected to in a latest RRC connected state, and/or a base station in which a wireless device most recently performed an RNA update procedure. An RNA may comprise one or more cells operated by one or more base stations. A base station may belong to one or more RNAs. A cell may belong to one or more RNAs.

A wireless device may transition, in a base station, an RRC state (e.g., UE RRC state) from an RRC connected state to an RRC inactive state. The wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

An anchor base station may broadcast a message (e.g., RAN paging message) to base stations of an RNA to reach to a wireless device in an RRC inactive state. The base stations receiving the message from the anchor base station may broadcast and/or multicast another message (e.g., paging message) to wireless devices in their coverage area, cell coverage area, and/or beam coverage area associated with the RNA via an air interface.

A wireless device may perform an RNA update (RNAU) procedure, for example, if the wireless device is in an RRC inactive state and moves into a new RNA. The RNAU procedure may comprise a random access procedure by the wireless device and/or a context retrieve procedure (e.g., UE context retrieve). A context retrieve procedure may comprise: receiving, by a base station from a wireless device, a random access preamble; and requesting and/or receiving (e.g., fetching), by a base station, a context of the wireless device (e.g., UE context) from an old anchor base station. The requesting and/or receiving (e.g., fetching) may comprise: sending a retrieve context request message (e.g., UE context request message) comprising a resume identifier to the old anchor base station and receiving a retrieve context response message comprising the context of the wireless device from the old anchor base station.

A wireless device in an RRC inactive state may select a cell to camp on based on at least a measurement result for one or more cells, a cell in which a wireless device may monitor an RNA paging message, and/or a core network paging message from a base station. A wireless device in an RRC inactive state may select a cell to perform a random access procedure to resume an RRC connection and/or to send (e.g., transmit) one or more packets to a base station (e.g., to a network). The wireless device may initiate a random access procedure to perform an RNA update procedure, for example, if a cell selected belongs to a different RNA from an RNA for the wireless device in an RRC inactive state. The wireless device may initiate a random access procedure to send (e.g., transmit) one or more packets to a base station of a cell that the wireless device selects, for example, if the wireless device is in an RRC inactive state and has one or more packets (e.g., in a buffer) to send (e.g., transmit) to a network. A random access procedure may be performed with two messages (e.g., 2-stage or 2-step random access) and/or four messages (e.g., 4-stage or 4-step random access) between the wireless device and the base station.

A base station receiving one or more uplink packets from a wireless device in an RRC inactive state may request and/or receive (e.g., fetch) a context of a wireless device (e.g., UE context), for example, by sending (e.g., transmitting) a retrieve context request message for the wireless device to an anchor base station of the wireless device based on at least one of an AS context identifier, an RNA identifier, a base station identifier, a resume identifier, and/or a cell identifier received from the wireless device. A base station may send (e.g., transmit) a path switch request for a wireless device to a core network entity (e.g., AMF, MME, and/or the like), for example, after or in response to requesting and/or receiving (e.g., fetching) a context. A core network entity may update a downlink tunnel endpoint identifier for one or more bearers established for the wireless device between a user plane core network entity (e.g., UPF, S-GW, and/or the like) and a RAN node (e.g., the base station), such as by changing a downlink tunnel endpoint identifier from an address of the anchor base station to an address of the base station).

A base station may communicate with a wireless device, via a wireless network, using one or more radio technologies. The one or more radio technologies may comprise at least one of: technologies related to a PHY layer, technologies related to a MAC layer, technologies related to an RRC layer, and/or other layers. Various examples described herein may enhance one or more radio technologies to improve performance of a wireless network. Improvements may comprise, for example, increased system throughput, increased data rate reduced battery consumption, improved (e.g., reduced) latency of data transmission, improved network coverage of a wireless network, improved transmission efficiency in the wireless network, among other benefits.

A wireless device may be configured for communication (e.g., by a base station) using one or more messages (e.g., sent by a base station). The one or more messages may be RRC messages, MAC CE messages, DCI, and/or any other message or information. The wireless device may receive, from the base station, one or more messages for configuring one or more parameters and/or settings.

A base station may send (e.g., transmit) one or more messages (e.g., RRC messages) comprising one or more indicators of DCI formats. A wireless device may determine the one or more DCI formats based on the one or more indicators. The one or more messages may comprise indications of one or more sizes of DCI fields of a DCI format.

A wireless device may monitor at least one DCI format. The wireless device may monitor a first DCI format for scheduling resource(s) for an UL transmission (e.g., DCI format 0_0) and/or a second DCI format for scheduling resource(s) for a DL transmission (e.g., DCI format 1_0). The first DCI format and/or the second DCI format may have a fixed size. The wireless device may determine the size of the first DCI format and/or the second DCI format, for example, based on information sent (e.g., broadcasted/transmitted) by the base station via system information messaging (e.g., an SIB), and/or based on being preconfigured with field sizes corresponding to the first DCI format. A wireless device may determine a first DCI size of the first DCI format and/or the second DCI format monitored in a common search space (CSS). The wireless device may determine a second DCI size of the first DCI format and/or the second DCI format monitored in a wireless device-specific search space (e.g., UE-specific search space (USS)). The first DCI size and the second DCI size may be same or may be different, for example, depending on one or more criteria. The second DCI size of the first DCI format may be determined based on one or more wireless device-specific parameters, such as a bandwidth of a BWP (e.g., a DL BWP or a UL BWP). The wireless device may monitor a third DCI format for scheduling resource(s) for UL transmission(s) (e.g., DCI format 0_1) and a fourth DCI format for scheduling resource(s) for DL transmissions (e.g., DCI format 1_1). A third size of the third DCI format and/or a fourth size of the fourth DCI format may be variable. The wireless device may determine the third size of the third DCI format and/or the fourth size of the fourth DCI format based on: information sent (e.g., broadcasted/transmitted) by the base station via SIBs, being preconfigured with field sizes corresponding to second DCI format, and/or RRC configuration.

A base station and a wireless device may use a first DCI format (e.g., DCI format 0_0) to schedule a message (e.g., a UL grant etc.). A size of the first DCI format may be determined based on one or more parameters indicated in SIBs (e.g., carrier bandwidth, a bandwidth of an active DL/UL BWP) and/or one or more prefixed DCI field sizes. A field indicating transmit power control (TPC) for PUSCH, for example, may correspond to a predefined size (e.g., 2 bits, or any other quantity of bits). A wireless device may attempt to decode DCI based on the first DCI format, for example, based on a wireless device-specific scheduling RNTI (e.g., C-RNTI, CS-RNTI, or MCS-C-RNTI in a CSS).

DCI (e.g., corresponding to the first DCI format), for example, for scheduling uplink resource(s), may comprise one or more DCI fields. The one or more DCI fields may comprise one or more of: a DCI format indicator field, a frequency domain resource assignment field, a time domain resource assignment field, a frequency hopping field, an MCS field, a new data indicator (NDI) field, a redundancy version field, a HARQ process number field, a TPC command field, padding bits, and/or a UL/supplemental UL (SUL) field.

The DCI format indicator (e.g., identifier) field may indicate a format of DCI and may be one bit (or any other quantity of bits) in length. A value of 0 (or any other value) may indicate that the DCI is for scheduling UL data.

The frequency domain resource assignment field may indicate allocated resource blocks in frequency domain and may be N bits in length. N may be determined as (ceil (log 2 (bandwidth of an initial UL BWP*(bandwidth of an initial UL BWP+1)/2) or a second size of a second DCI format. Initial UL BWP may be determined based on SIB content (e.g., SIB information delivered by a broadcast or dedicated transmission by the base station to the wireless device).

The time domain resource assignment field may indicate a time gap between the DCI and a scheduled PUSCH. The time gap may be indicated, for example, as a quantity of slots, a quantity of OFDM symbols, a quantity of time units. The time domain resource assignment field may be 4 bits, or any other quantity of bits, in length.

The frequency hopping field may indicate whether frequency hopping applies to the scheduled PUSCH or not. The frequency hopping field may be a 1-bit flag or may be any other quantity of bits in length.

The MCS field may indicate an MCS used for the scheduling. The MCS field may be 5 bits, or any other quantity of bits, in length.

The NDI field may indicate whether the scheduled PUSCH is for an initial transmission of a new transport block or a retransmission of a previously scheduled transport block. The NDI field may be 1 bit, or any other quantity of bits, in length.

The redundancy version field may indicate a redundancy version of an encoded block. The redundancy version field may be 2 bits, or any other quantity of bits, in length.

The HARQ process number field may indicate a hybrid automatic repeat query process number used for the scheduled PUSCH. The HARQ process number field may be 4 bits, or any other quantity of bits, in length.

The TPC command field may indicate a TPC command for the scheduled PUSCH. The TPC command field may be 2 bits, or any other quantity of bits, in length.

Padding bits may be any bits that may be needed to align a UL grant to a downlink scheduling DCI format. The UL/SUL indicator field may indicate an UL carrier corresponding to a DL carrier of a cell, or an SUL carrier of the cell. The field may not be present, for example, if the cell does not support UL/SUL in the cell, if the wireless device does not support SUL in the cell, and/or if a first DCI size corresponding to the first DCI format, without including the padding bits and the UL/SUL indicator, is equal to or larger than a second DCI size of a downlink scheduling DCI based on a second DCI format. The second DCI format may be a DCI format 1_0. The second DCI format may be a DCI format used for scheduling resources for a DL data. A wireless device may decode DCI corresponding to the first DCI format and/or DCI corresponding to the second DCI format, for example, using a single decoding attempt based on a same size between two formats. The UL/SUL indicator field may be 1 bit, or any other quantity of bits, in length.

A wireless device may be configured with a USS to monitor the first DCI format. The wireless device may determine a size of the frequency domain resource assignment indicator, for example, based on an active UL BWP and/or based on a size of the second DCI format monitored in a CSS. The wireless device may determine a quantity of padding bits to align sizes of the first DCI format and the second DCI format monitored in a USS and/or based on the size of the second DCI format monitored in a CSS. A DCI format 0_0 may be the first DCI format monitored in a CSS. A DCI format 0_0 (USS) may be the first DCI format monitored in a USS. A DCI format 1_0 may be the second DCI format monitored in a CSS. A DCI format 1_0 (USS) may be the second DCI format monitored in a USS.

The base station and the wireless device may use the second DCI format (e.g., DCI format 1_0) to schedule a downlink grant. The size of the second DCI format may be determined based on one or more parameters indicated in SIBs (e.g., carrier bandwidth, a bandwidth of an initial DL BWP) and/or one or more prefixed DCI field sizes A field indicating TPC for PUCCH, for example, may correspond to a predefined size (e.g., 2 bits, or any other quantity of bits). The wireless device may attempt to decode DCI based on the second DCI format, for example, based on a wireless device-specific scheduling RNTI (e.g., C-RNTI, CS-RNTI, or MCS-C-RNTI in a CSS).

DCI (e.g., corresponding to the second DCI format) for scheduling a downlink grant may comprise one or more DCI fields. The one or more DCI fields may comprise one or more of: a DCI format indicator field, a frequency domain resource assignment field, a time domain resource assignment field, virtual resource block (VRB)-to-physical resource block (PRB) mapping field, an MCS field, an NDI field, a redundancy version field, a HARQ process number field, a downlink assignment index (DAI) field, a TPC command field, a PUCCH resource field, and/or a PDSCH-to-HARQ feedback timing field.

The DCI format indicator (e.g., identifier) field may indicate a format of DCI and may be one bit (or any other quantity of bits) in length. A value of 1 (or any other value) may indicate that the DCI is for scheduling downlink data;

The frequency domain resource assignment field may indicate allocated resource blocks in frequency domain. N may be determined as (ceil (log 2 (bandwidth*(bandwidth+1)/2), in which the bandwidth may be determined based on MIB content and/or SIB content (e.g., MIB/SIB information delivered by a broadcast transmission or dedicated transmission by the base station to the wireless device). The bandwidth may be determined based on a CORESET (e.g., CORESET #0 if the CORESET #0 is configured). The bandwidth may be determined based on an initial DL BWP if the CORESET (e.g., the CORESET #0) is not configured;

The time domain resource assignment field may indicate a time gap between the DCI and a scheduled PDSCH transmission (e.g., data). The time gap may be indicated, for example, as a quantity of slots, a quantity of OFDM symbols, a quantity of time units. The time domain resource assignment field may be 4 bits, or any other quantity of bits, in length.

The VRB-to-PRB mapping field may indicate whether VRB mapping is used or not. The VRB-to-PRB mapping field may be 1 bit, or any other quantity of bits, in length.

The MCS field may indicate an MCS used for the scheduling. The MCS field may be 5 bits, or any other quantity of bits, in length.

The NDI field may indicate whether the scheduled PDSCH is for an initial transmission of a new transport block or a retransmission of a previously scheduled transport block. The NDI field may be 1 bit, or any other quantity of bits, in length.

The redundancy version field may indicate a redundancy version of an encoded block. The redundancy version field may be 2 bits, or any other quantity of bits, in length.

The HARQ process number field may indicate a hybrid automatic repeat query process number used for the scheduled PDSCH. The HARQ process number field may be 4 bits, or any other quantity of bits, in length The DAI field may indicate a DAI used to determine a HARQ-ACK codebook. The DAI field may be 2 bits, or any other quantity of bits, in length.

The TPC command field may indicate a TPC command for a scheduled PUCCH. The TPC command field may be 2 bits, or any other quantity of bits, in length.

The PUCCH resource indicator field may indicate a resource index to send (e.g., transmit) a HARQ-ACK via PUCCH. The PUCCH resource indicator field may be 3 bits, or any other quantity of bits, in length.

The PDSCH-to-HARQ feedback timing indicator field may indicate a timing gap between the scheduled PDSCH and a HARQ-ACK feedback transmission (e.g., via PUCCH). The PDSCH-to-HARQ feedback timing indicator field may be 3 bits, or any other quantity of bits, in length.

A wireless device may be configured, by a base station, to monitor a third DCI format in one or more USSs to schedule a UL transmission. The wireless device may determine sizes of one or more DCI fields of the third DCI format based on one or more RRC messages/configurations. The third DCI format (e.g., DCI format 0_1) may be used for scheduling a PUSCH transmission in a cell. The wireless device may attempt to decode DCI based on the third DCI format, for example, based on a wireless device-specific scheduling RNTI (e.g., C-RNTI, CS-RNTI, SP-CSI-RNTI or MCS-C-RNTI).

DCI (e.g., corresponding to the third DCI format) for scheduling resource(s) for UL transmission(s)/data (e.g., a DCI format 0_1) may comprise one or more DCI fields. The one or more DCI fields may comprise one or more of: a DCI format indicator field, a carrier indicator field, a UL/SUL indicator field, a BWP indicator field, a frequency domain resource assignment field, a time domain resource assignment field, a frequency hopping field, an MCS field, an NDI field, a redundancy version field, a HARQ process number field, one or more DAI fields, a TPC command field, an SRS resource indicator field, a precoding information and number of layer field, an antenna ports field, a CSI request field, an SRS request field, a code block group (CBG) transmission information (CBGI) field, a phase tracking reference signals (PTRS)-demodulation reference signals (DMRS) association field, a beta-offset field, and/or a UL-SCH indicator field.

The DCI format indicator (e.g., identifier) field may indicate a format of DCI and may be one bit (or any other quantity of bits) in length. A value of 0 (or any other value) may indicate that the DCI is scheduling a UL grant.

The carrier indicator field may be present if cross-carrier scheduling is configured for a cell transmitting DCI corresponding to the third DCI format (e.g., the DCI format 0_1). The carrier indicator field may be 0 bits, 3 bits, or any other quantity of bits in length.

The UL/SUL indicator field may indicate a UL carrier corresponding to a DL carrier of a cell or may indicate an SUL carrier of the cell. The UL/SUL indicator field may be 1 bit, or any other quantity of bits in length.

The BWP indicator field may indicate whether dynamic BWP switching is supported based on DCI. The BWP indicator field may be 0 bits, 1 bit, 2 bits, or any other quantity of bits in length. The length may be determined based on a number/quantity of UL BWPs configured, for the wireless device, by RRC signaling.

The frequency domain resource assignment field may indicate allocated resource blocks in frequency domain. The frequency domain resource assignment field may be M bits in length. M may be determined based on an active UL BWP.

The time domain resource assignment field may indicate a time gap between the DCI and a scheduled PUSCH. The time gap may be indicated, for example, as a quantity of slots, a quantity of OFDM symbols, a quantity of time units. The time domain resource assignment field may be 0-4 bits, or any other quantity of bits in length. The length may be determined based on a number/quantity of entries of a higher layer parameter (e.g., pusch-TimeDomainAllocationList).

The frequency hopping field may indicate whether to use frequency hopping. The frequency hopping field may be 0 or 1 bit in length, or any other quantity of bits in length.

The MCS field may indicate an MCS used for the scheduling. The MCS field may be 5 bits, or any other quantity of bits in length.

The NDI field may indicate whether the scheduled PUSCH is for an initial transmission of a new transport block or a retransmission of a previously scheduled transport block. The NDI field may be 1 bit, or any other quantity of bits in length.

The redundancy version field may indicate a redundancy version of an encoded block. The redundancy version field may be 2 bits, or any other quantity of bits in length.

The HARQ process number field may indicate a hybrid automatic repeat query process number used for the scheduled PUSCH. The HARQ process number field may be 4 bits, or any other quantity of bits in length.

The third DCI format may comprise two DAI fields. A first DAI field may be 1 bit (or any other quantity of bits) in length for semi-static HARQ-ACK codebook or 2 bits (or any other quantity of bits) in length for dynamic HARQ-ACK codebook. The second DAI field may be 2 bits (or any other quantity of bits) in length for dynamic HARQ-ACK codebook with two HARQ-ACK sub-codebooks (or any other quantity of HARQ-ACK sub-codebooks). The second DAI field may otherwise be 0 bits in length.

The TPC command field may indicate a TPC command for the scheduled PUSCH. The TPC command field may be 2 bits, or any other quantity of bits in length.

The SRS resource indicator field may indicate an SRS resource index. The SRS resource indicator field may be K bits in length;

The precoding information and number of layers field may indicate precoding information and a number of layers used in a PUSCH. The precoding information and number of layers field may be P bits in length.

The antenna ports field may indicate a configuration of antenna ports. The SRS request field may indicate triggering of an SRS transmission. The SRS request field may be 2 bits, 3 bits, or any other quantity of bits in length.

The CSI request field may indicate a CSI feedback trigger. The CSI request field may be 0-6 bits, or any other quantity of bits, in length. The length may be determined based on a higher layer parameter (e.g., reportTriggerSize).

The CBGI field may indicate a CBG transmission. The CBGI field may be 0 bits, 2 bits, 3 bits, 6 bits, 8 bits, or any other quantity of bits, in length. is the length may be determined based on a parameter (e.g., maxCodeBlock-GroupsPerTransportBlock) for PUSCH.

The PTRS-DMRS association field may indicate an association between a PTRS and a DMRS. The PTRS-DMRS association field may be 0 bits, 2 bits, or any other quantity of bits in length.

The beta-offset field may indicate a beta-offset value. The beta-offset field may be 0 bits, 2 bits, or any other quantity of bits in length.

The UL-SCH indicator field may indicate whether a UL-SCH transmission may be transmitted on a scheduled PUSCH or not. The UL-SCH indicator field may be 1 bit, or any other quantity of bits in length.

A wireless device may be configured (e.g., by a base station) to monitor a fourth DCI format in one or more USSs to schedule a downlink transmission. The wireless device may determine sizes of one or more DCI fields of the fourth DCI format based on one or more RRC messages/configurations. The fourth DCI format (e.g., DCI format 1_1) may be used for scheduling a PDSCH transmission in a cell. The wireless device may attempt to decode a DCI based on the fourth DCI format, for example, based on a wireless device-specific scheduling RNTI (e.g., C-RNTI, CS-RNTI, SP-CSI-RNTI or MCS-C-RNTI).

DCI (e.g., corresponding to the fourth DCI format) for scheduling resources for a downlink transmission may comprise one or more DCI fields. The one or more DCI fields may comprise one or more of: a DCI format indicator field, a carrier indicator field, a BWP indicator field, a frequency domain resource assignment field, a time domain resource assignment field, a VRB-to-PRB field, a PRB bundling size indicator field, a rate matching indicator field, a zero power (ZP) CSI-RS trigger field, one or more TB MCS field, one or more TB NDI fields, one or more TB redundancy version fields, a HARQ process number field, a DAI field, a TPC command field, a PUCCH resource indicator field, a PDSCH-to-HARQ feedback timing indicator field, an antenna ports field, a transmission configuration indication (TCI) field, an SRS request field, a CBGI field, a CBG flushing out information field, and/or a DMRS sequence initialization field.

The DCI format indicator (e.g., idenitifer) field may indicate a format of DCI and may be one bit (or any other quantity of bits) in length. A value of 1 (or any other value) may indicate that the DCI is scheduling a DL grant.

The carrier indicator field may be present if cross-carrier scheduling is configured for a cell transmitting DCI corresponding to the fourth DCI format (e.g., DCI format 1_1). The carrier indicator field may be 0 bits, 3 bits, or any other quantity of bits in length.

The BWP indicator field may indicate whether dynamic BWP switching is supported based on DCI. The BWP indicator field may be 0 bits, 1 bit, 2 bits, or any other quantity of bits in length. The length may be determined based on a quantity/number of DL BWPs configured, for a wireless device, by RRC signaling.

The frequency domain resource assignment field may indicate allocated resource blocks in frequency domain. A quantity of bits M corresponding to the frequency domain resource assignment field may be determined based on an active DL BWP.

The time domain resource assignment field may indicate time gap between the DCI and a scheduled PDSCH. The time gap may be indicated, for example, as a quantity of slots, a quantity of OFDM symbols, or a quantity of time units. The time domain resource assignment field may be 0-4 bits, or any other quantity of bits in length. The length may be determined based on a quantity/number of entries of a higher layer parameter (e.g., pusch-TimeDomainAllocation-List).

The VRB-to-PRB field may indicate whether or not to use a VRB-to-PRB mapping. The VRB-to-PRB field may be 0 bits, 1 bit, or any other quantity of bits in length.

The PRB bundling size indicator field may indicate a size of PRB bundling, for example, if dynamic bundling is enabled. The PRB bundling size indicator field may be 0 bits, 1 bit, or any other quantity of bits in length.

The rate matching indicator field may indicate one or more rate matching resources for rate matching. The rate matching indicator field may be 0 bits, 1 bit, 2 bits, or any other quantity of bits in length.

The ZP CSI-RS trigger field may indicate one or more ZP CSI-RS resources for rate matching. The ZP CSI-RS trigger field may be 0 bits, 1 bit, 2 bits, or any other quantity of bits in length.

A first TB MCS field may indicate an MCS used for the scheduling. The first TB MCS field may be 5 bits, or any other quantity of bits in length.

A first TB NDI field may indicate whether the scheduled PUSCH is for an initial transmission of a new transport block or a retransmission of a previously scheduled transport block. The first TB NDI field may be 1 bit, or any other quantity of bits in length.

A first TB redundancy version field may indicate a redundancy version of an encoded block. The first TB redundancy version field may be 2 bits, or any other quantity of bits in length.

A second TB MCS field may indicate an MCS used for the scheduling. The second TB MCS field may be 5 bits, or any other quantity of bits in length.

A second TB NDI field may indicate whether the scheduled PUSCH is for an initial transmission of a new transport block or a retransmission of a previously scheduled transport block. The second TB NDI field may be 1 bit, or any other quantity of bits in length.

A second TB redundancy version field may indicate a redundancy version of an encoded block. The second TB redundancy version field may be 2 bits, or any other quantity of bits in length.

The HARQ process number field may indicate a hybrid automatic repeat query process number used for the scheduled PUSCH. The HARQ process number field may be 4 bits, or any other quantity of bits in length.

The DAI field may be 2 bits (or any other quantity of bits) for a single cell and 4 bits (or any other quantity of bits) for a CA case. The TPC command field may indicate a TPC command for the scheduled PUCCH. The TPC command field may be 2 bits, or any other quantity of bits in length.

The PUCCH resource indicator field may indicate a PUCCH resource index. The PUCCH resource indicator field may be 3 bits, or any other quantity of bits in length.

The PDSCH-to-HARQ feedback timing indicator field may indicate a timing gap between a PDSCH transmission and a HARQ feedback. The PDSCH-to-HARQ feedback timing indicator field may be 0-3 bits, or any other quantity of bits in length.

The antenna portsfield may indicate a configuration of antenna ports. The TCI field may indicate a TCI state for a scheduled PDSCH. The TCI field may be 0 bits, 3 bits, or any other quantity of bits in length.

The SRS request field may indicate triggering of an SRS transmission. The SRS request field may be 2 bits, 3 bits, or any other quantity of bits in length.

The CBGI field may indicate a CBG transmission. The CBGI field may be 0 bits, 2 bits, 3 bits, 6 bits, 8 bits, or any other quantity of bits in length. The length may be determined based on a parameter (e.g., maxCodeBlockGroupsPerTransportBlock) for PDSCH.

The CBG flushing out information field may indicate flushing a HARQ buffer. The CBG flushing out information field may be 0 bits, 1 bit, or any other quantity of bits in length.

The DM-RS sequence initialization field may indicate initialization of a DM-RS sequence. The DM-RS initialization field may be 1 bit, or any other quantity of bits in length.

Wireless communications may comprise transmission/reception of control information. Control information may be communicated between nodes (e.g., base station, wireless device, and/or any other node). For example, a base station may send (e.g., transmit) one or more DCI messages for one or more operations. The base station may send (e.g., transmit) one or more DCI messages, for example, to: schedule a DL transmission (e.g., a PDSCH transmission), request an uplink transmission (e.g., a PUCCH transmission such as HARQ-ACK feedback, an SRS(s) transmission, etc.), and/or to indicate other control information (e.g., CBG transmission information, CBG flushing out information, and/or a request for a DM-RS sequence initialization). Control information may be associated with high-reliability requirements for at least some types of communications and/or communication networks (e.g., satellite-based communication, URLLC communication).

The base station may send (e.g., transmit) one or more DCI messages using single-stage DCI transmission or multiple-stage DCI (e.g., multi-stage) transmission. A wireless device may determine that DCI is successfully decoded, for example, if the wireless device has successfully received and decoded each one the multiple DCI stages corresponding to the DCI. A wireless device may not consider DCI (e.g., may ignore DCI) corresponding to a multiple-stage DCI transmission, for example, if the wireless device fails to decode one or more of the DCI stages. DCI reception may fail if the wireless device does not receive or decode successfully one or more of the multiple DCI stages. Scheduling information (e.g., corresponding to all DCI stages) may be invalidated if at least one DCI stage of the multiple DCI stages is not received. Requiring all DCI stages to be received and successfully decoded may be inefficient and/or a reliability corresponding to successful reception of all DCI stages may be lower than a reliability corresponding to successful reception of only one DCI stage. Multiple-stage DCI transmission may increase failure rate of DCI reception, increase latencies, and/or reduce data rates. Various examples described herein may improve reliability of multiple-stage DCI transmission by skipping transmission of a portion of DCI, pre-configuring at least some information corresponding to DCI using configuration messages, enabling use of previously transmitted DCI at a wireless device, enabling use of default settings and/or operations if a portion of DCI is not received at a wireless device, etc.

As described herein, DCI fields may be partitioned between first-stage DCI and second-stage DCI (or any other quantity of stages). Using multiple-stage DCI may improve communication performance. One or more first DCI fields (e.g., corresponding to downlink transmission) of a multiple-stage DCI may be transmitted via the first-stage DCI. One or more second DCI fields (e.g., corresponding to uplink transmission, such as HARQ-ACK feedback, an SRS transmission, and/or a CSI feedback) may be transmitted via the second stage DCI of the multiple-stage DCI. A base station may not send (e.g., transmit) the second stage DCI of the multiple-stage DCI, for example, if the base station does not schedule uplink transmission (e.g., HARQ-ACK feedback, SRS transmission, CSI feedback) based on the multiple-stage DCI. A wireless device may receive scheduled downlink data based on receiving the first stage DCI of the multiple-stage DCI. The wireless device may receive and decode scheduled downlink data based on receiving the first stage DCI, for example, even if the wireless device fails to receive or decode the second-stage DCI of the multiple-stage DCI. The wireless device may not send (e.g., transmit) the uplink transmission (e.g., skip scheduled uplink transmission), for example, if the wireless device determines that the second-stage DCI is absent and/or if the wireless device fails to decode the second stage DCI.

At least some types of communications and/or communication networks (e.g., satellite-based communication networks) may have high latencies. A return-to-trip delay (RTT) may be approximately 20 ms (or other first time duration) for low earth orbit (LEO) satellite-based communications and approximately 250 ms (or other second time duration) for a geosynchronous equatorial orbit (GEO) satellite-based communications. RTT may comprise different time durations for communications between different communication systems (e.g., satellite, LTE, 5G, any 3GPP access technology, any non-3GPP access technology, etc.) High latencies may be particularly disadvantageous for certain transmissions (e.g., HARQ-ACK based retransmissions, URLLC, etc.). For example, for two HARQ-ACK based retransmissions, a LEO satellite transmission may have an end-to-end latency of approximately 40 ms, and GEO satellite transmission may have an end-to-end latency of 500 ms. Additional HARQ-ACK based retransmissions may result in greater end-to-end latencies. Blind repetition of data transmissions, instead of acknowledgment-based (e.g., HARQ-ACK based) retransmissions may be beneficial in at least some such high-latency scenarios.

A base station (e.g., satellite, gNB, or any other base station) may dynamically enable/disable acknowledgment feedback (e.g., HARQ-ACK feedback) from a wireless device. The base station may attempt blind repetition in which acknowledgment feedback for each repetition may not be needed, for example, to offset the high latencies. The base station may use an acknowledgment feedback for a last repetition, for example, to confirm packet delivery. DCI may be used to enable/disable acknowledgment feedback. A DCI field may indicate whether acknowledgment feedback (e.g., HARQ-ACK) is enabled/disabled. Other DCI fields related to the acknowledgment operation may comprise a HARQ-ACK resource indicator, a PDSCH-to-HARQ timing indicator, a DAI indicator, and/or any other indicator. Fields related to acknowledgment feedback may not be needed if acknowledgment feedback is disabled. Transmission of DCI fields related to acknowledgment feedback (e.g., even if acknowledgment feedback is disabled) may result in transmission inefficiencies. Disabling acknowledgment feedback for a wireless device may disable acknowledgment feedback based retransmissions as well, in at least some scenarios.

Transmission of DCI fields (e.g., related to HARQ-ACK feedback or other messages) may be improved using multi-stage DCI. For example, first-stage DCI may comprise DCI fields that may be commonly used between enabled and disabled acknowledgment feedback (e.g., HARQ-ACK feedback) operation. Second-stage DCI may include one or more DCI fields related to the acknowledgment feedback operation, for example, if acknowledgment feedback operation is enabled. The first stage DCI may indicate a presence or absence of the second stage DCI to enable/disable acknowledgment feedback operation. The first-stage DCI may comprise DCI fields that may be used by a wireless device to decode data from a base station. The wireless device may successfully receive and decode data, for example, even if the wireless device fails to receive or decode the second-stage DCI. The wireless device may disable acknowledgment feedback operation (e.g., the wireless device is not to send (e.g., transmit) a HARQ-ACK feedback), for example, if the wireless device fails to receive or decode the second-stage DCI. The base station may disable acknowledgment feedback operation by not transmitting the second-stage DCI to the wireless device.

Various examples described herein may enable a wireless device to receive scheduled data (e.g., downlink data) based on receiving first-stage DCI without requiring reception of a second-stage DCI (or a subsequent stage DCI). Enabling reception of downlink data based on reception of first-stage DCI may improve reliability of a two-stage (or multi-stage) DCI design. A base station may skip scheduling second-stage DCI (or a subsequent stage DCI), for example, if the base station does not expect to receive an uplink transmission (e.g., a HARQ-ACK feedback corresponding to scheduled downlink data, SRS transmission, and/or CSI feedback). Skipping scheduling the second stage DCI (or subsequent stage DCI), if uplink transmissions are not expected, may allow dynamic disabling of uplink transmission and/or may reduce overhead related to transmission of control information. A wireless device may skip an uplink transmission, for example, based on failing to receive the second stage DCI (e.g., second stage DCI not transmitted by the base station, or decoding failure of the second-stage DCI at the wireless device), but may still be able to receive downlink scheduled data. Various examples described herein may enable better transmission (e.g., downlink transmission) reliability by allowing the wireless device to not rely on successful reception of both first-stage DCI and second-stage DCI to decode the downlink scheduled data. Various examples described herein may enable better reliability of control channel by reducing size of the first stage DCI.

one or more DCI fields of multiple-stage DCI may be partitioned, for example, based on transmission requirements and/or without impacting wireless device complexity. A higher reliability (e.g., BLER of $10^{-5}$ or any other value) for one or more first DCI fields may be achieved, which may be required for decoding a transmission such as a scheduled PDSCH transmission and/or encoding a transmission such as a scheduled PUSCH transmission. One or more second DCI fields may be transmitted with lower reliability requirements (e.g., BLER of $10^{-1}$ or any other value), which may or may not be needed depending on one or more functionalities required at a scheduling instance. First QoS requirements (e.g., reliability, latency) may be applied on the one or more first DCI fields. Second QoS requirements (e.g., reliability, latency) may be applied on the one or more second DCI fields. The first QoS requirements may be different from (e.g., greater than) the second QoS requirements. At least some of the first QoS requirements may be the same as the second QoS requirements.

A transmitter may be a base station, a wireless device, a device supporting sidelink operation, a relay node, a TRP, a satellite, an access point, and/or any node. A node may comprise one or more trasmitters and/or one or more receivers. A transmitter may be a device sending control information (e.g., DCI or control channel information) for another device. Various examples described herein for a base station may be applied to a transmitter. A scheduled device may be a wireless device, a device supporting sidelink operation, a relay node, a TRP, an access point, and/or any node. The scheduled device may be a device receiving the control information (e.g., DCI or the control channel information) from the transmitter. Various examples described herein for a wireless device may be applied to a scheduled device.

DCI corresponding to a multiple-stage DCI design may comprise first-stage DCI and second-stage DCI (or any other quantity of DCI stages). The DCI may comprise a resource allocation, DM-RS sequences, HARQ-ACK feedbacks, CSI requests, and/or the like. The first-stage DCI may be a portion of the DCI comprising one or more first DCI fields of the DCI. The second-stage DCI may be a portion of the DCI comprising one or more second DCI fields of the DCI.

A base station may send (e.g., transmit) multiple-stage DCI comprising resource assignment and/or additional DCI fields for additional functionalities (e.g., CSI feedback, SRS trigger, HARQ-ACK feedback). The base station may send (e.g., transmit) first-stage DCI via a PDCCH, and second-stage DCI via a PDCCH and/or via control information piggybacked on a scheduled PDSCH transmission. Control information piggybacked on a scheduled PDSCH transmission may be referred to as piggybacked DCI (P-DCI), PDSCH-DCI, and/or the like. A P-DCI may be transmitted within one or more resource blocks and one or more OFDM symbols corresponding to the scheduled PDSCH transmission. A P-DCI may be transmitted around or near one or more resource blocks and one or more OFDM symbols corresponding to the scheduled PDSCH transmission.

The base station or a transmitter may send (e.g., transmit) one or more first DCI fields (e.g., DCI fields used for decoding scheduled PDSCH transmission and/or PSSCH transmission) in the first-stage DCI. The PSSCH may be a physical channel used for shared data transmission for side link operation. The base station may send (e.g., transmit) one or more second DCI fields (e.g., auxiliary DCI fields for decoding the scheduled PDSCH transmission and/or PSSCH transmission) in the second-stage DCI. The one or more first DCI fields may comprise a frequency domain resource assignment indicator, a time domain resource assignment indicator, an MCS indicator, a VRB-to-PRB mapping indicator, and/or the like. The one or more second DCI fields may comprise a DAI indicator, TPC commands for PUCCH transmissions, PDSCH-to-HARQ feedback time indicator, a PUCCH resource indicator, and/or the like. The base station may include the one or more first DCI fields in the first-stage DCI using a first encoding process and targeting a first QoS requirement (e.g., $10^{-5}$ BLER). The base station may include the one or more second DCI fields in the second-stage DCI using a second encoding process targeting a second QoS requirement (e.g., $10^{-1}$ BLER). The second encoding process may be the same as the first encoding process. A wireless device or a scheduled device may decode the first-stage DCI.

The wireless device or the scheduled device may attempt receiving a scheduled PDSCH transmission/PSSCH transmission based on the first-stage DCI, for example, based on successfully decoding the first-stage DCI. The wireless device or the scheduled device may attempt to receive the second-stage DCI (e.g., a P-DCI), for example, based on successfully decoding the first-stage DCI. The wireless device or the scheduled device may perform one or more operations requested by the second-stage DCI, for example, based on successfully decoding the second-stage DCI. The wireless device and/or the scheduled device may perform one or more default operations, for example, if the wireless device is unable to decoding the second-stage DCI and/or if the wireless device does not receive the second-stage DCI. The base station or the transmitter may configure the one or more default behaviors of the wireless device, for example, via one or more configuration messages (e.g., RRC messages). The one or more default behaviors may comprise disabling HARQ-ACK feedback, disabling SRS transmission, applying a 0 dB power offset for PUCCH transmission power, and/or the like.

The base station may attempt receiving one or more uplink channel transmissions based on the requests in the second-stage DCI, for example, if the wireless device successfully decodes the second-stage DCI. The base station and/or the wireless device may operate based on the configured default behaviors, for example, if the wireless device does not successfully decode the second-stage DCI and/or if the wireless device does not receive the second-stage DCI. One or more first DCI fields of the first-stage DCI (e.g., used to decode a scheduled PDSCH transmission and/or a scheduled PSSCH transmission) may be transmitted using a more resource-intensive coding process than one or more second fields of the second-stage DCI to enable a reduced failure rate of of the first-stage DCI reception as compared to the second-stage DCI reception. The one or more second DCI fields, which may be used for auxiliary functionalities (e.g., HARQ feedback, CSI feedback and/or SRS transmission), may be transmitted in a resource efficient manner (e.g., based on a consideration of a trade-off between resource utilization and the importance of the auxilliary functionalities). Various examples described herein may improve resource utilization for the multiple-stage DCI transmission.

A wireless device may attempt to receive a downlink channel transmission, for example, if the wireless device receives signals transmitted on an indicated resource allocation. The wireless device may or may not successfully decode the downlink channel transmission. A base station may attempt to receive an uplink channel transmission, for example, if the base station receives signals transmitted on a resource allocation. The base station may or may not successfully decode the uplink channel transmission.

Figure 16:
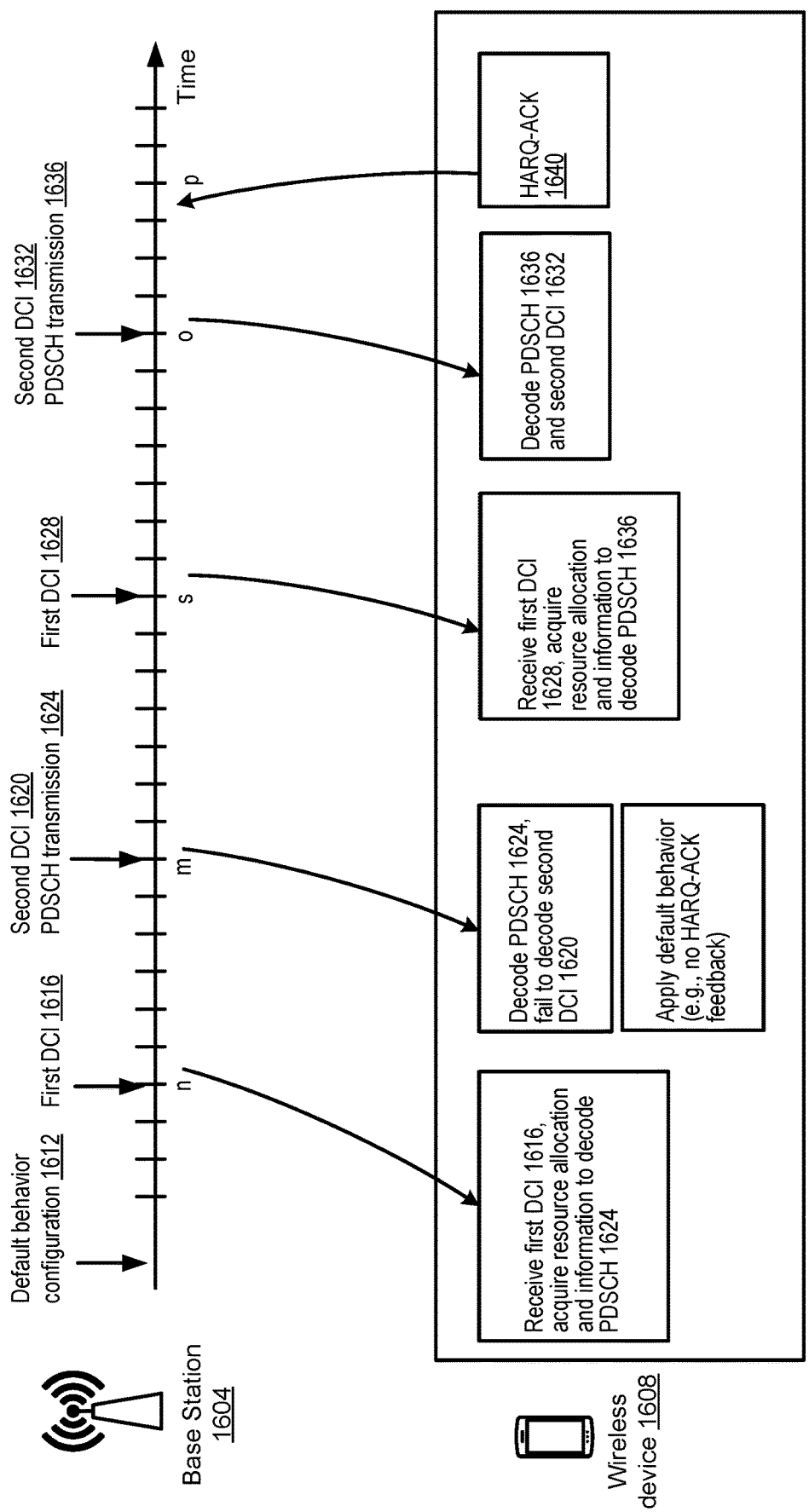
FIG. 16 shows an example of a multiple-stage downlink control information (DCI) transmission.

FIG. 16 shows an example of a multiple-stage DCI transmission. A base station 1604 (e.g., a transmitter, a TRP, a satellite, an access point, and/or any node) may communicate with a wireless device 1608 based on a first-stage DCI (e.g., first DCI) and a second-stage DCI (e.g., second DCI). The base station 1604 may use the first-stage DCI and the second stage DCI to signal resource allocation for downlink data, uplink data, a CSI feedback request, an SRS request, a TPC command, and/or the like. The base station 1604 may send (e.g., transmit) one or more first DCI fields via the first-stage DCI. The one or more first DCI fields may comprise a frequency domain resource allocation field, a time domain resource allocation field, an MCS field, a HARQ process indicator/ID field, and/or the like. The wireless device 1608 may determine information to decode a scheduled PDSCH transmission and/or a scheduled PSSCH transmission, and/or to encode a scheduled PUSCH transmission and/or a scheduled PSSCH transmission based on the first-stage DCI. The base station 1604 may send (e.g., transmit) one or more second DCI fields via the second-stage DCI. The one or more second DCI fields may comprise a CSI feedback request field, a TPC command field, a DAI field, a PUCCH resource indicator field, a PDSCH-to-HARQ feedback timing indicator field, and/or the like.

The base station 1604 may send (e.g., transmit) (e.g., at or after time n) the first-stage DCI (first DCI 1616). The first DCI 1616 may indicate one or more of a resource allocation, an MCS, HARQ information, and/or the like. The first DCI 1616 may indicate that a PDSCH 1624 will be sent (e.g., transmitted) at, or after, time m. The wireless device 1608 may attempt to decode the scheduled PDSCH 1624 at, or after, time m, for example, based on receiving the first DCI 1616. The wireless device 1608 may attempt to decode the second-stage DCI (second DCI 1620) at or after time m, for example, based on receiving the first DCI 1616. The wireless device 1608 may apply a configured set of parameters/values corresponding to a default behavior, for example, if the wireless device 1608 fails to decode the second DCI 1620. The default behavior may be to not send (e.g., transmit) any UL transmission. The wireless device may not send (e.g., transmit) a HARQ-ACK feedback message based on receiving the PDSCH 1624, for example, if the wireless device 1608 fails to decode the second DCI 1620. The wireless device 1608 may skip transmission of a HARQ-ACK feedback message on the scheduled PDSCH and/or may postpone the transmission of a HARQ-ACK feedback message to a next HARQ-ACK transmission opportunity.

The wireless device behavior (e.g., skipping a HARQ-ACK transmission or postponing a HARQ-ACK transmission) may be configured by the base station 1604. The wireless device 1608 may postpone transmission of a HARQ-ACK feedback message of the scheduled PDSCH transmission 1624 to a next HARQ-ACK transmission opportunity. The next HARQ-ACK transmission opportunity may be determined by the wireless device 1608 and may be, for example, determined based on a next HARQ-ACK transmission opportunity indicated by next DCI, an earliest of a PUSCH transmission or a PUCCH transmission, and/or determined based on PUCCH resources (e.g., in terms of frequency and time domain) configured by the base station 1604.

The wireless device 1608 may receive (e.g., at or after time s) first DCI 1628. The wireless device 1608 may attempt to decode a scheduled PDSCH transmission 1636 and second DCI 1632, for example, based on the first DCI 1628. The wireless device 1608 may send (e.g., transmit) (e.g., at or after time p) a HARQ-ACK feedback message 1640. The HARQ-ACK feedback message may correspond to the PDSCH transmission 1624 and the PDSCH transmission 1636, for example, if the wireless device 1608 postpones transmitting a HARQ-ACK feedback message corresponding to the PDSCH transmission 1624.

Figure 17:
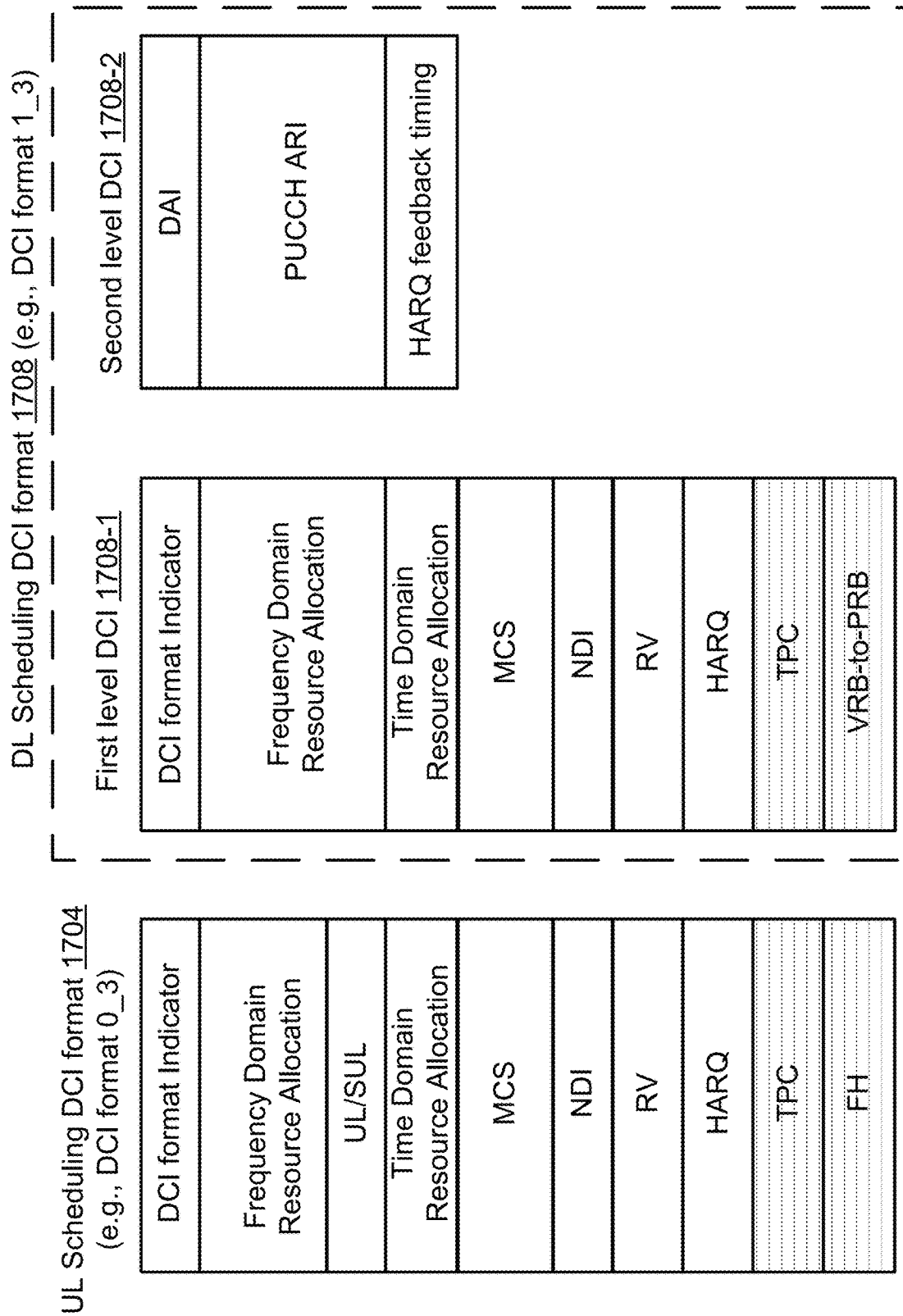
FIG. 17 shows example DCI fields based on one or more multiple-stage DCI formats.

FIG. 17 shows example DCI fields based on one or more multiple-stage DCI formats used for scheduling downlink data and/or uplink data. The one or more multiple-stage DCI formats may comprise a downlink scheduling DCI format 1704 (e.g., DCI format 1_3) and an uplink scheduling DCI format 1708 (e.g., DCI format 0_3). A wireless device may monitor, based on the one or more multiple-stage DCI formats, and in a CSS and/or a USS, at least first-stage DCI of downlink scheduling DCI and/or uplink scheduling DCI. The wireless device may expect that a size of the first-stage DCI of the downlink scheduling DCI and a size of first-stage DCI of the uplink scheduling DCI are same, for example, based on the one or more multiple-stage DCI formats. The wireless device may monitor a PDCCH to receive the first-stage DCI of the downlink scheduling DCI and/or the first-stage DCI of the uplink scheduling DCI. The wireless device may determine the one or more multiple-stage DCI formats, in which a size of first-stage DCI based on each of the one or more multiple-stage DCI formats may be fixed or may be determined based on a bandwidth of a current active downlink or uplink bandwidth part.

The uplink scheduling DCI may only comprise a first-stage DCI. The uplink scheduling DCI may have a zero-sized second-stage DCI. The uplink scheduling DCI format 1704 may comprise one or more DCI fields. The one or more DCI fields may comprise: a DCI format indicator field, a frequency domain resource allocation field, a UL/SUL indicator field, a time domain resource allocation field, an MCS field, an NDI field, a redundancy version (RV) field, HARQ process indicator/ID field, a TPC command field, frequency hopping (e.g., FH) field, and/or the like. The downlink scheduling DCI may comprise a first-stage DCI and a second-stage DCI. The first-stage DCI (e.g., first level DCI 1708-1) may comprise one or more first DCI fields. The one or more first DCI fields may comprise: a DCI format indicator field, a frequency domain resource allocation field, a time domain resource allocation field, an MCS field, an NDI field, an RV field, a HARQ process indicator/ID field, a TPC command field, a VRB-to-PRB mapping field, and/or the like. The second-stage DCI (e.g., second level DCI 1708-2) may comprise one or more second DCI fields. The one or more second DCI fields may comprise: a DAI field, a PUCCH resource indicator (e.g., a PUCCH ARI) field, a HARQ feedback timing field, and/or the like.

DCI fields, corresponding to the uplink scheduling DCI and the downlink scheduling DCI, with same field names may have same field sizes. The MCS field may have K bits (e.g., K=5, or any other quantity), for example, in both the uplink scheduling DCI and the downlink scheduling DCI. A first size of the frequency domain resource allocation field for the uplink scheduling DCI may be determined based on a bandwidth of an active uplink bandwidth part or an initial uplink bandwidth part. A second size of the frequency domain resource allocation field for the downlink scheduling DCI may be determined based on a bandwidth of an active downlink bandwidth part, a bandwidth of an initial downlink bandwidth part, or a bandwidth of a CORESET (e.g., a CORESET #0).

The wireless device may determine the first size and the second size corresponding to the frequency domain resource allocation fields differently for different scenarios. The wireless device may determine the first size based on the second size, for example, if the wireless device monitors the uplink scheduling DCI (e.g., the DCI format 0_3) and the downlink scheduling DCI (e.g., the DCI format 1_3) in a CSS. The second size may be determined based on a bandwidth of a downlink bandwidth part (e.g., an initial downlink bandwidth part). The wireless device may truncate the frequency domain resource allocation field for the uplink scheduling DCI to align the first size to the second size, for example, if an initial size of the first size (e.g., determined based on a bandwidth of an uplink BWP) is larger than the second size. The wireless device may add an UL/SUL field (if needed, 1 bit) to the uplink scheduling DCI and/or may add zero bits (e.g., bits with value 0), for example, if an initial size of the first size (e.g., determined based on bandwidth of an uplink BWP) is smaller than the second size. A quantity of zero bits may be equal to second size−(the first size+1), for example, if a 1-bit UL/SUL field is added. A quantity of zero bits may be equal to the second size−the first size, for example, if an UL/SUL field is not added. The zero-filled bits may be placed after the frequency domain resource allocation field or after the one or more DCI fields of the uplink scheduling DCI format 1704.

The wireless device may determine the first size and the second size of the frequency domain resource allocation fields as a larger of sizes of the two fields, for example, if the wireless device monitors the uplink scheduling DCI (e.g., DCI format 0_3) and the downlink scheduling DCI (e.g., DCI format 1_3) in a USS. The wireless device may add an UL/SUL field (if needed, 1 bit) to the uplink scheduling DCI, for example, if the second size is larger than the first size.

One or more DCI fields shown in FIG. 17 may be omitted from a DCI format 0_3 or a DCI format 1_3 (or the uplink scheduling DCI format 1704 or the downlink scheduling DCI format 1708). The TPC command field and/or the FH field may or may not be present in the uplink scheduling DCI format 1704. The TPC command field and/or the VRB-to-PRB mapping field may or may not be present in the downlink scheduling DCI format 1708. One or more other DCI fields may be added. A priority index field or a QoS index field may be present in the uplink scheduling DCI format 1704 and/or the downlink scheduling DCI format 1708. One or more DCI fields may not be used, for example, if the wireless device decodes a DCI format based on a first RNTI. The one or more DCI fields may be used, for example, if the wireless device decodes the DCI format based on a second RNTI. The first RNTI may be SI-RNTI, P-RNTI, RA-RNTI, and/or the like. The second RNTI may be C-RNTI, CS-RNTI, MCS-RNTI, and/or the like. The one or more DCI fields may comprise the HARQ process indicator/ID field, the RV field, and/or the TPC command field.

A base station may indicate if the base station may use multiple-stage DCI or single stage DCI for scheduling transmissiosn (e.g., PDSCH transmissions and/or PUSCH transmissions). The base station may determine and/or provide such an indication, for example, during an initial access procedure. The base station may indicate one or more DCI formats used in an initial access procedure via one or more SIBs. The base station may use the multiple-stage DCI in the initial access procedure, in one or more predetermined frequencies/bands. The base station may use the multiple-stage DCI during the initial access procedure, for example, if the base station operates in a scenario requiring a large round-trip time caused by a long propagation delay (e.g., more than 20 ms, or any other time delay). The base station may use the multiple stage DCI during the initial access procedure, for example, if the base station operates a network in a specific environment and/or for specific services (e.g., a smart factory environment, emergency services, and/or the like). The base station may use a multiple-stage DCI format, for example, ifthe base station operates in a satellite, uses high powers (e.g., more than 46 dBm, or any other value), and/or an average round-trip time is high (e.g., more than 10 ms, or any other value). A wireless device may determine to use multiple-stage DCI based on one or more similar conditions. A base station may use multiple-stage DCI for scheduling downlink data and/or uplink data during initial access, after initial access, and/or for communicating with wireless devices in an idle mode and/or a power saving mode (e.g., wireless devices in an RRC_IDLE state).

A base station may send (e.g., transmit) only first-stage DCI of multiple-stage downlink scheduling DCI (e.g., the downlink scheduling DCI), for example, if the base station sends (e.g., transmits) DCI to schedule broadcast data (e.g., based on SI-RNTI, P-RNTI, and/or RA-RNTI). The base station may or may not send (e.g., transmit) second-stage DCI if some RNTI(s) (e.g., SI-RNTI, P-RNTI, and/or RA-RNTI) are used for scheduling the first-stage DCI. A wireless device may or may not attempt to decode the second-stage DCI, for example, if the first-stage DCI is scrambled with the RNTI(s) (e.g., SI-RNTI, P-RNTI, and/or RA-RNTI). A wireless device may or may not attempt to decode the second-stage DCI, or may or may not assume a presence of the second-stage DCI, for example, if the multiple-stage DCI schedules broadcast data or group-cast data. The wireless device may or may not expect second-stage DCI, for example, if first-stage DCI is scheduled with a single cell point to multicast (SC-PTM) related RNTI or with a multicast-broadcast single-frequency network (MBSFN) related RNTI.

FIG. 18 shows an example downlink scheduling DCI format 1804 for a downlink scheduling DCI. The downlink scheduling DCI may be used to schedule a downlink PDSCH transmission with advanced features (e.g., multiple antenna, multiple transmission points, and/or the like). A wireless device may monitor the downlink scheduling DCI format 1804 in one or more USSs, for example, based on one or more RRC configurations (e.g., based on DCI format association with one or more search space configurations). A wireless device may determine (e.g., assume) that a first size of first-stage DCI (e.g., first level DCI 1804-1) of the downlink scheduling DCI format 1804 and a second size of a first-stage DCI of an uplink scheduling DCI format may be same. The wireless device may align the first-stage DCI of the downlink scheduling DCI format 1804 and the first-stage DCI of the uplink scheduling DCI format to a larger of the two. The base station may fill the DCI format which has smaller size with zero bits (e.g., bits with value 0) to align the sizes.

The first-stage DCI of the downlink scheduling DCI format 1804 may comprise one or more first DCI fields. The one or more first DCI fields may comprise: a DCI format indicator field (e.g., a value of 1 may indicate the downlink scheduling DCI format 1804), a carrier indicator field (if any, if cross-carrier scheduling is supported), BWP indicator/ID field (if any, if dynamic BWP adaptation/switching is used and/or more than one downlink BWPs are configured), a frequency domain resource allocation field, a time domain resource allocation field, an MCS field (e.g., corresponding to a first transport block), an NDI field (e.g., corresponding to the first transport block, an RV field (e.g., corresponding to the first transport block), a HARQ process indicator/ID field, an antenna ports field, a TCI field, a CBG information field, and/or the like. The second-stage DCI may comprise one or more second DCI fields. The one or more second DCI fields may comprise: VRB-to-PRB mapping field, a PRB bundling size field, a rate matching indicator field, a ZP-CSI trigger field, an MCS field (e.g., corresponding to a second transport block), an NDI field (e.g., corresponding to the second transport block), an RV field (e.g., corresponding to the second transport block), a DAI field, a TPC command field, a PUCCH ARI field, a HARQ feedback timing field, an SRS request field, a puncturing information field, a transform precoder field, and/or the like. One or more DCI fields from the one or more second DCI fields may be transmitted in the first-stage DCI (e.g., fields corresponding to the VRB-to-PRB mapping, the PRB bundling size, the rate matching indicator, the ZP-CSI trigger, the transform precoder) or may be sent/transmitted in separate DCI (e.g., via group common DCI, via third-stage DCI, via a MAC-CE, via an RRC signaling, etc.).

A first-stage DCI of downlink scheduling DCI (e.g., based on a multiple-stage DCI format) may comprise one or more first DCI fields. A wireless device may decode a scheduled PDSCH transmission (e.g., at least a first transport block of the scheduled PDSCH transmission) based on the one or more first DCI fields of the first-stage DCI. The wireless device may utilize one or more parameters available to and/or configured at the wireless device (e.g., prior to the decoding the scheduled PDSCH transmission) to decode the scheduled PDSCH transmission. The wireless device may receive the one or more parameters via RRC configuration, via MAC CEs, and/or via another DCI. Second-stage DCI of the downlink scheduling DCI may comprise DCI fields which may indicate other operations and/or comprise other information (e.g., triggering SRS, HARQ-ACK feedback, a second transport block information).

FIG. 19 shows an example uplink scheduling multiple-stage DCI format 1904 (e.g., DCI format 0_4) that may be used for an uplink scheduling DCI. First-stage DCI (e.g., first level DCI 1904-1) of the uplink scheduling DCI may comprise one or more first DCI fields. The one or more first DCI fields may comprise: a DCI format indicator field (e.g., a value of 0 may indicate the uplink scheduling DCI format 1904), a carrier indicator field (if any, if cross-carrier scheduling is supported), a UL/SUL indicator (if supported), a BWP indicator/ID field (if any, if dynamic BWP adaptation/switching is used and/or if more than one downlink BWPs are configured), frequency domain resource allocation field, time domain resource allocation field, an MCS field, an NDI field, an RV field, a HARQ process indicator/ID field, an SRS resource indicator (e.g., SRI) field, precoding information and number of layers field, and/or an antenna ports field. Second-stage DCI (e.g., second level DCI 1904-2) of the uplink scheduling DCI may comprise one or more second DCI fields. The one or more second DCI fields may comprise: a frequency hopping field, a first DAI field, a second DAI field, TPC command field (e.g., for PUSCH transmissions), a PTRS-DMRS association field, a beta offset field, a transform precoding field (e.g., may indicate if transform precoding is used or not), a UL-SCH indicator field (e.g., whether to transmit data or not), and/or the like. The one or more first DCI fields and the one or more second DCI fields may be partitioned between the first-stage DCI and the second-stage DCI in a different manner One or more DCI fields among the one or more second DCI fields may be transmitted in the first-stage DCI (e.g., frequency hopping field, transform precoding field, and/or the UL-SCH indicator field) or may be transmitted in separate DCI (e.g., via group common DCI, via third-stage DCI, via a MAC-CE, and/or via RRC signaling).

First-stage DCI of uplink scheduling DCI (e.g., scheduling a PUSCH transmission) may comprise one or more first DCI fields. The wireless device may encode the scheduled PUSCH transmission (e.g., at least a first transport block of the scheduled PUSCH transmission) based on the one or more first DCI fields and/or one or more parameters available to and/or configured at the wireless device (e.g., prior to encoding the scheduled PUSCH transmission). The wireless device may receive the one or more parameters via RRC configuration, via MAC CEs and/or via other DCIs. Second-stage DCI of the uplink scheduling DCI may comprise additional DCI fields which may indicate other operations and/or comprise other information (e.g., triggering CSI, HARQ-ACK feedback parameters, indication of a UCI-only transmission, information corresponding to UCI-piggybacking, PTRS assistance, etc.).

Various DCI formats may be used for scheduling downlink data and/or uplink data (such as shown in FIGS. 17-19 described above). Additional fields may be included in the DCI formats and/or some of indicatedfields may not be used. A base station may configure one or more first DCI fields, transmitted in first-stage DCI, for multiple-stage DCI. The base station may configure one or more second DCI fields, transmitted in second-stage DCI, for multiple-stage DCI. A wireless device may determine the one or more second DCI fields based on the one or more first DCI fields and one or more required DCI fields. The wireless device, based on determining that a DCI field among the one or more required DCI fields is not present in the first-stage DCI, may determine that the DCI field may be present in the second-stage DCI. The base station may indicate, to the wireless device, whether a DCI field of the one or more required DCI fields is present in the first-stage DCI or is not present in the first-stage DCI. An indication that a DCI field is not present in the first stage DCI may indicate that the DCI field may be present in the second-stage DCI. The one or more required DCI fields may be determined based on DCI format(s) of single-stage DCI, based on a legacy DCI format, and/or based on an existing DCI format.

A base station may send (e.g., transmit) first-stage DCI via a PDCCH and may send (e.g., transmit) second-stage DCI in one or more DCI messages via one or more PDCCHs, in a piggybacked DCI with a PDSCH, or in one or more MAC CEs. A resource (e.g., frequency domain resource and/or time domain resource) in which the second-stage DCI is transmitted may be determined by a wireless device, for example, based on successfully receiving/detecting/decoding the first-stage DCI, or prior to receiving/detecting/decoding the first-stage DCI. The wireless device may be configured, by the base station, with a default value for a DCI field corresponding to the second-stage DCI. The wireless device may apply the configured default value for the DCI field, for example, based on not detecting the second-stage DCI and detecting the first-stage DCI.

A base station may configure a set of default behaviors/actions corresponding to a multiple-stage DCI format. The base station may configure a default value for each DCI field of one or more second DCI fields transmitted in a second-stage DCI. The base station may configure (e.g., with reference to the downlink scheduling DCI format 1804): a default VRB-to-PRB mapping (e.g., no VRB-to-PRB mapping is used), a default PRB bundling size (e.g., 2 PRBs, or any other quantity of PRBs), a default rate matching indicator (e.g., indicating no rate matching or a same rate matching indicator value as in most recent DCI), a default ZP-CSI trigger (e.g., no ZP-CSI trigger or a same ZP-CSI trigger as in most recent DCI), that second TB MCS/NDI/RV is not be decoded, a default DAI (e.g., indicating that DAI is to be ignored), a default PUCCH ARI (e.g., indicating no PUCCH transmission), a default HARQ feedback timing (e.g., no HARQ feedback or postponement of a HARQ feedback), a default SRS request (e.g., no SRS trigger), a default puncturing indication (e.g., no puncturing), and/or a default transform precoder value (e.g., a same value as in most recent DCI, indicating that transform precoding is enabled, or indicating that transform precoding is disabled). A wireless device may apply the set of default behaviors and/or perform default actions, for example, based on not receiving/detecting the one or more second DCI fields. The wireless device may use the default values of one or more second DCI fields to apply the set of default behaviors and/or perform default actions.

A base station may allocate resources to send/transmit (e.g., reliably send/transmit) first-stage DCI (e.g., target BLER of $10^{-5}$). The base station may dynamically adapt a reliability target of second-stage DCI based on information requested from a wireless device. The base station may send (e.g., transmit) the second-stage DCI, with a CSI trigger request, with a higher reliability target (e.g., target BLER of $10^{-3}$), for example, if the base station needs a CSI report from the wireless device. The base station may allocate more resources for the second-stage DCI, for example, to achieve the higher reliability target. The base station may use a lower reliability target (e.g., target BLER target of $10^{-1}$), for example, if the base station does not have specific required operations for the wireless device to perform (e.g., transmitting a CSI report or HARQ-ACK feedback). The base station may allocate lower resource allocation for the second-stage DCI, for example, if the base station does not have specific required operations for the wireless device to perform. Applying different reliability targets for the first-stage DCI and the second-stage DCI enables a base station to dynamically determine necessary resources and a necessary QoS depending on operational requirements. Dynamic determination of resources and QoS may enable efficient resource utilization by the base station. The wireless device may receive a scheduled PDSCH transmission and/or send (e.g., transmit) a scheduled PUSCH transmission successfully, for example, if the wireless device has successfully received the first-stage DCI. The detection probability or the reliability of a first-stage DCI reception may be enhanced compared to that of a single stage DCI, for example, if the first-stage DCI size is a smaller compared to combined DCI of the first-stage DCI and the second-stage DCI.

A base station may indicate, via first-stage DCI, a code-rate, an aggregation level, and/or resource allocation of second-stage DCI. The base station may indicate a low code rate, a medium code rate, or a high code rate for the second-stage DCI via the first-stage DCI. The base station may indicate, via the first-stage DCI, a low resource allocation, a medium resource allocation, or a high resource allocation for the second-stage DCI. The base station may indicate, via the first-stage DCI, a sub-DCI format used in the second-stage DCI. Each sub-DCI format may comprise one or more DCI fields and may correspond to a code rate. The base station may indicate a beta-offset that may determine a quantity/number of resource elements used for the second-stage DCI, for example, if the second-stage DCI is transmitted using P-DCI.

Sidelink control information (SCI) may be used for scheduling transmissions via one or more shared channels (e.g., a PSSCH). Sidelink communications may be used for communications between a first node/wireless device and a second node/wireless device (or any quantity of additional nodes/wireless devices). Sidelink communications may be used for various applications such as vehicle communications (e.g., V2X, V2V, etc.) or any other node-to-node communications. A wireless device using a sidelink operation may monitor, based on SCI, a broadcast PSSCH transmission, a group-cast PSSCH transmission, and/or a unicast PSSCH transmission. Multiple-stage DCI formats may be used for sidelink operation. A wireless device may use, for monitoring SCI, a common sub-DCI format for first-stage DCI of multiple-stage DCI for scheduling a unicast PSSCH transmission, a group-cast PSSCH transmission, and/or a broadcast PSSCH transmission. The wireless device may use a first sub-DCI format for second-stage DCI for a group-cast PSSCH transmission. The wireless device may use a second sub-DCI format for second-stage DCI for a unicast PSSCH transmission. The wireless device may not use second-stage DCI for a broadcast PSSCH transmission. Various examples described herein may be used with reference to transmission and/or reception of SCI.

Figure 20:
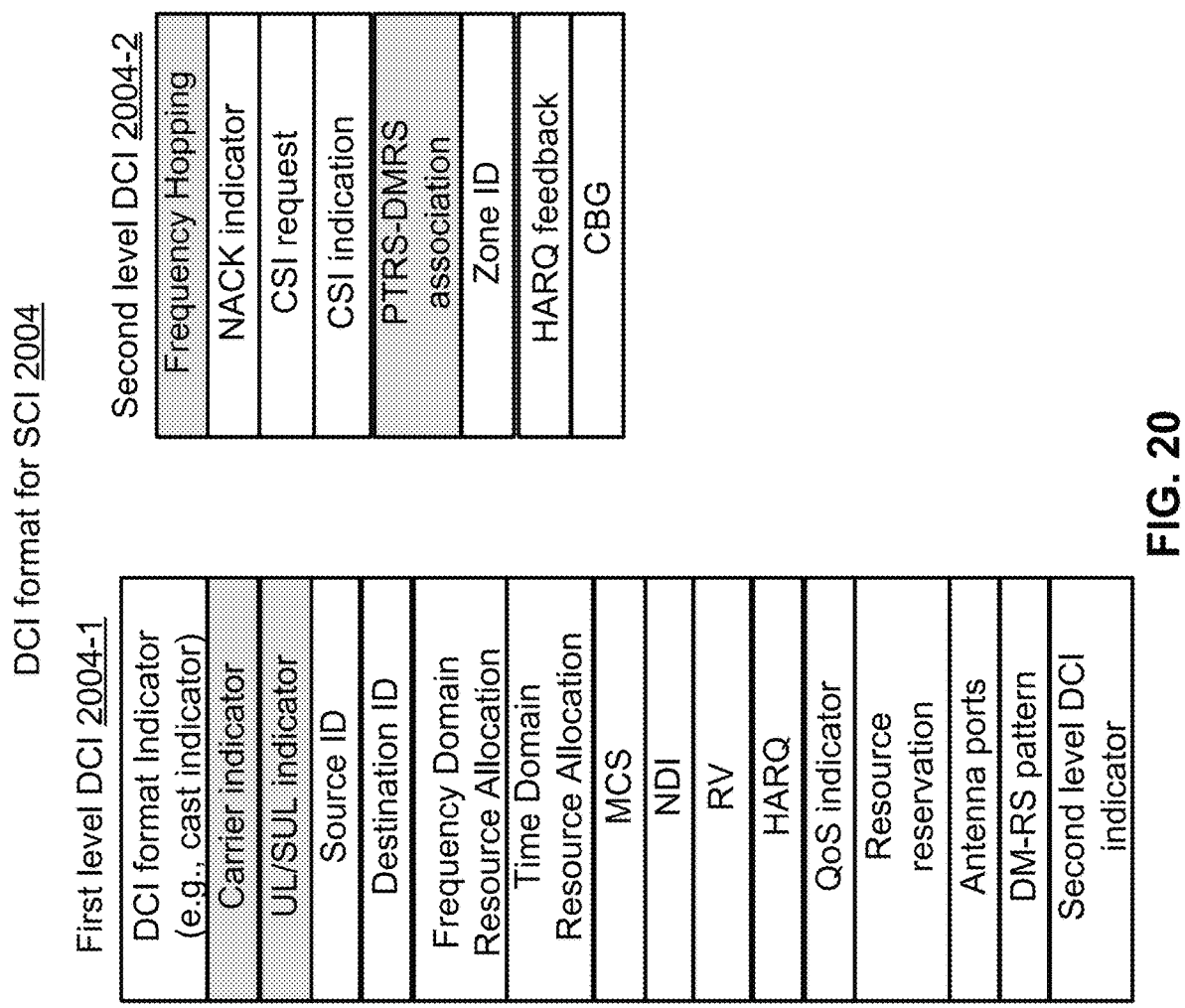
FIG. 20 shows an example multiple-stage DCI format 2004 for an SCI transmission.

FIG. 20 shows an example multiple-stage DCI format 2004 that may be used in an SCI transmission for a sidelink operation. The first-stage DCI (e.g., the first level DCI 2004-1) may comprise one or more DCI fields. The DCI fields of the first-stage DCI may comprise: a DCI format indicator field (e.g., indicating a PSSCH casting type among a unicast, a groupcast and a broadcast), a source indicator/ID field (e.g., indicating a transmitting device indicator/ID at a PHY layer), a destination indicator/ID field (e.g., indicating a receiving device indicator/ID), a frequency domain resource allocation field, a time domain resource allocation field, an MCS field, an NDI field, an RV field, a HARQ process indicator/ID field, a QoS indicator field (e.g., indicating a QoS class type of a PSSCH), a resource reservation field (e.g., indicating one or more resources reserved for one or more retransmissions corresponding to the PSSCH transmissions scheduled by SCI), an antenna ports field, and/or a DM-RS pattern field. One or more of the DCI fields may not be included in the first-stage DCI. The DCI format indicator field may not be present, for example, if a wireless device may determine a cast type based on the destination indicator/ID. One or more additional fields may be included in the first-stage DCI depending on the operation. A carrier indicator field may be included, for example, if cross-carrier scheduling of a PSSCH transmission is supported. A UL/SUL indicator field may be included, for example, if SCI transmitted in a UL carrier may schedule a PSSCH transmission in an SUL carrier. A UL/SUL indicator field may be included, for example, if SCI is transmitted by a base station to schedule one or more resources in either a UL carrier or an SUL carrier.

The second-stage DCI (e.g., second level DCI 2004-2) may comprise one or more DCI fields. The one or more DCI fields may comprise: a NACK indicator field (e.g., indicating whether to send (e.g., transmit) NACK only, ACK/NACK, or ACK only), a CSI request field, CSI indication field (e.g., indicating reference signals for CSI measurement), a zone indicator/ID field (e.g., indicating a zone indicator/ID used for a feedback transmission or a zone indicator/ID for a transmitter), a HARQ feedback field (e.g., indicating enabling HARQ feedback, indicating a HARQ feedback resource), and/or a CBG field (e.g., indicating a CBG). One or more DCI fields may not be included in the second-stage DCI. The CSI indication fioeld may not be included, for example, if reference signals for CSI measurement are pre-configured. One or more DCI fields may be added to the second-stage DCI. A second zone indicator/ID field may be included to indicate a zone used for determining whether or not to send (e.g., transmit) a HARQ-ACK feedbackt. A PTRS-DMRS association field may be added, for example, if PTRS is used for the sidelink operation. A frequency hopping field may be dynamically enabled or disabled. HARQ feedback timing may be dynamically indicated in the second-stage DCI. A wireless device, in response to receiving the first-stage DCI for a non-broadcast PSSCH transmission or a unicast PSSCH transmission, may attempt to decode the second-stage DCI. The wireless device may apply one or more default behaviors, for example, based on not receiving/decoding the second-stage DCI successfully. A transmitter or a base station of the first-stage DCI may configure the one or more default behaviors. The one or more default behaviors may be pre-configured (e.g., factory-stored values). The one or more default behaviors may comprise disabling HARQ feedback, disabling CSI feedback, disabling CBG transmission, and/or the like.

A base station may send (e.g., transmit) one or more RRC messages. The one or more RRC messages may comprise one or more first behavior parameters for downlink scheduling DCI. The one or more RRC messages may comprise one or more second behavior parameters for uplink scheduling DCI. The one or more first behavior parameters may be applied to/used for DCI based on DCI formats scheduling downlink data. The one or more second behavior parameters may be applied to DCI based on DCI formats scheduling uplink data. The one or more first behavior parameters may indicate default values that may be used for fields in second-stage DCI corresponding to the downlink scheduling DCI. The one or more second behavior parameters may indicate default values that may be used for fields in second-stage DCI corresponding to uplink scheduling DCI. The wireless device may use the default values of one or more fields in second-stage DCI to apply a set of default behaviors and/or perform default actions, for example, based on not receiving/detecting the second-stage DCI.

The one or more first behavior parameters may comprise: a VRB-to-PRB mapping parameter, a PRB bundling size parameter, a rate matching indicator parameter, ZP-CSI trigger parameter, a second TB MCS/NDI/RV parameter, DAI parameter, TPC parameter, PUCCH ARI parameter, HARQ feedback timing parameter, SRS request parameter, a puncturing indication parameter, and/or a transform precoder parameter. The VRB-to-PRB mapping parameter may indicate: a VRB-to-PRB mapping used in most recent downlink scheduling DCI, based on a same DCI format, may be used; VRB-to-PRB mapping may not be used; VRB-to-PRB mapping may be used; a VRB-to-PRB mapping used in a most recent PDSCH transmission comprising Msg 4 (e.g., a response to a Msg 3 PUSCH transmission, such as a contention resolution message) may be used; or a wireless device may select a value of VRB-to-PRB mapping.

The PRB bundling size parameter may indicate: a PRB bundling size in most recent downlink scheduling DCI, based on a same DCI format, may be used; a default size (e.g., 2 RBs, or any other quantity of RBs) may be used; or a PRB bundling size used in a most recent PDSCH transmission, comprising Msg 4, may be used. The rate matching indicator parameter may indicate: a rate matching indicator value in most recent downlink scheduling DCI, based on a same DCI format, may be used; no rate matching indication (e.g., rate matching indicator set to zeros); rate matching on all rate matching resources, or a wireless device may determine a rate matching pattern.

The ZP-CSI trigger parameter may indicate: a ZP-CSI trigger value in most recent downlink scheduling DCI, based on a same DCI format, may be used/applied; no ZP-CSI trigger (e.g., ZP-CSI trigger value set to zeros); all configured ZP-CSI resources may be used; or a wireless device may determine a ZP-CSI trigger value (e.g., a ZP-CSI configuration/index, a ZP-CSI pattern used for a rate matching). The second TB MCS/NDI/RV parameter may indicate: a wireless device may ignore a second TB by assuming that the second TB is disabled; the wireless device may assume same MCS, NDI, and/or RV for the second TB as indicated for a first TB in first-stage DCI; or the wireless device may determine MCS, NDI, and/or RV.

The DAI parameter may indicate if a DAI may be ignored (e.g., as if scheduling DCI is not successfully transmitted/received). The TPC parameter may indicate: a 0 dB value, a same TPC value as in most recent DCI (e.g., for PUSCH transmission, PUCCH transmission, or PSSCH transmission). The PUCCH ARI parameter may indicate: HARQ-ACK feedback may not be sent and/or HARQ-ACK feedback for scheduled downlink data may be dropped; a default resource for transmission of a HARQ-ACK feedback (e.g., a first resource in a resource set) may be used; HARQ-ACK feedback may be postponed; or HARQ-ACK feedback may be sent on a next available HARQ-ACK feedback occasion.

The HARQ feedback timing parameter may indicate: HARQ-ACK feedback may not be sent; a default value (e.g., K slots) for HARQ feedback timing; or no HARQ-ACK feedback timing. The SRS request parameter: no SRS request; or an SRS request for an SRS on a default SRS resource via a default uplink beam (e.g., determine a (default) spatial filter parameter based on the default uplink beam). The puncturing indication parameter may indicate that a puncturing indication may not be applied. The transform precoder parameter may indicate: a transform precoder option used in most recent downlink scheduling DCI (e.g., second-stage DCI), based on a same DCI format, may be used; transform precorder may not be used; transform precorder may be used; or a wireless device may determine a transform precoder option.

The one or more second behavior parameters may comprise: a frequency hopping parameter, one or more DAI parameters, a TPC parameter, a PTRS-DMRS association parameter, a beta offset parameter, a transform precoder parameter, and/or a UL-SCH indicator parameter. The frequency hopping parameter may indicate: a frequency mapping used in most recent uplink scheduling DCI, based on a same DCI format may be used; no frequency hopping is used; frequency hopping is used; a frequency hopping option used in a most recent transmission of a Msg 3 PUSCH transmission is used; or a wireless device may select a value for frequency hopping. The DAI parameters may indicate, for a first DAI field, that the first DAI field may be ignored, or may be set as zeros. The DAI parameters may indicate, for a second DAI field, that the second DAI field may be ignored, or may be set as zeros.

The TPC parameter may indicate: a 0 dB value, or a same TPC value as in most recent DCI (e.g., for a PUSCH transmission, a PUCCH transmission, or a PSSCH transmission). The PTRS-DMRS association parameter may indicate: a same value used in most recent uplink scheduling DCI, based on a same DCI format, may be used, no association may be assumed, a mapping used in a most recent transmission of a Msg3 PUSCH transmission may be used, or a default PTRS-DMRS association may be used.

The beta offset parameter may indicate: UCI piggybacking on a scheduled PUSCH transmission is not allowed, a beta-offset value indicated in most recent uplink scheduling DCI, based on a same DCI format, may be used, ora default beta-offset value may be used. The transform precoder parameter may indicate: a transform precoder option used in most recent downlink scheduling DCI (e.g., second-stage DCI), based on a same DCI format, may be used, transform precorder may not be used, transform precorder may be used, or a wireless device may determine a transform precoder option. The UL-SCH indicator parameter may indicate: a PUSCH transmission without UL-SCH transmission may not be supported, or a default value for the UL-SCH indicator may be used.

A wireless device may not piggyback UCI on a scheduled PUSCH transmission, for example, if a value indicating that UCI piggyback (e.g., on a scheduled PUSCH transmission) is not allowed option is configured as default value for one or more DCI fields (e.g., a beta-offset field). UCI piggyback on another PUSCH transmission may be supported, for example, if there are other PUSCH transmissions. One or more PUSCH transmissions for which second-stage DCI, with the option (e.g., UCI piggyback option), were not succssfully received may not be considered for selecting a PUSCH transmission for USI piggybacking. The wireless device may drop a scheduled PUSCH transmission and send (e.g., transmit) a PUCCH transmission for UCI, for example, if there is no PUSCH transmission to piggyback the UCI (e.g., other than the scheduled PUSCH transmission for which the second-stage DCI was not received). The wireless device may send (e.g., transmit) the PUSCH transmission and drop UCI, for example, if the scheduled PUSCH has higher priority than the PUCCH transmission. The PUSCH transmission may selected over the PUCCH transmission, for example, if the wireless device handles multiple uplink channel collisions based on a priority/order. The wireless device may determine whether or not to perform UCI piggybacking on a PUSCH transmission. The wireless device may determine to not perform piggybacking, for example, if at least one PUSCH transmission, among the plurality of PUSCH transmissions, has been scheduled without successful reception of second-stage DCI. A PUSCH transmission that is scheduled based only on single-stage DCI may be excluded from consideration for UCI piggybacking.

A base station or a transmitter may configure one or more messages comprising one or more third behavior parameters used for second-stage DCI of multiple-stage SCI. The one or more third behavior parameters may indicate default values that may be used for fields in the second-stage DCI of multiple-stage SCI or may indicate default behavior/actions. The wireless device may use the default values to apply a set of default behaviors and/or perform default actions, for example, based on not receiving/detecting the second-stage DCI of multiple-stage SCI. Examples of the one or more third behavior parameters may comprise one or more of: a frequency hopping parameter, a NACK indicator parameter, a CSI request parameter, a CSI indication parameter, a zone indicator/ID parameter, a HARQ feedback parameter, and/or a CBG parameter.

The frequency hopping parameter may indicate: a frequency mapping used in most recent SCI from a same transmitter may be used, no frequency hopping is used, frequency hopping is used, or a wireless device may select a value for frequency hopping. The NACK indicator parameter may indicate: sending NACK only, sending ACK-NACK, or disabling HARQ-ACK feedback. The CSI request parameter may indicate: disabling a CSI request, or using a default value for the CSI request. The CSI indication parameter may indicate: disabling a CSI request, or a default reference signal. The zone indicator/ID parameter may indicate: a default value for zone indicator/ID, or that a zone is not defined. The HARQ feedback parameter may indicate: a HARQ feedback is disabled, or a default parameter. The CBG parameter may indicate: a CBG may not be used, a fallback to a TB transmission.

Utilizing one or more default behaviors/values based on a failure of second-stage DCI may enhance reliability of SCI, and a unicast and/or a group-cast PSSCH reception. A transmitter may use first-stage DCI with a high reliability target or with a high transmission power such that the first-stage DCI may be successfully received by multiple sidelink devices. The transmitter may send (e.g., transmit) a second-stage DCI with dynamically adapted reliability targets (e.g., dynamically determined transmission powers). The transmitter may effectively use resources for scheduling the second-stage DCI depending on the reliability targets and use cases.

A base station (e.g., a transmitter) may send (e.g., transmit) second-stage DCI via piggybacked DCI (e.g., P-DCI) with a scheduled PDSCH transmission. A quantity/number of resource elements (REs) used for transmitting the second-stage DCI may be determined based on a quantity/number of bits for the second-stage DCI, an aggregation level of first-stage DCI (e.g., corresponding to the second-stage DCI), a configured code rate for the second-stage DCI (e.g., the base station may configure a code rate of the second-stage DCI), a code rate indicated in the first-stage DCI, an MCS indicated for a scheduled PDSCH transmission or PSSCH transmission, a beta-offset value indicated in the first-stage DCI, and/or a parameter indicated in the first-stage DCI.

A wireless device may be configured with a code-rate of second-stage DCI (e.g., ⅓, or any other code rate) and configured with a size of the second-stage DCI (e.g., 20 bits, or any other quantity of bits). The wireless device may determine the quantity/number of REs used for the second-stage DCI based on the code-rate, the payload size, a parameter (e.g., beta-offset value, ratio). A first quantity of REs (e.g., 30 REs, or any other quantity of REs) may be assumed for the second-stage DCI, for example, if a first modulation scheme (e.g., QAM, or any other modulation scheme) is being used. The quantity/number of REs, among allocated resources for a scheduled PDSCH transmission or PSSCH transmission may be indicated as a parameter in first-stage DCI. A ratio (e.g., 0.1, 0.2, . . . , 0.5) may be indicated in the first-stage DCI. The quantity/number of REs used for the second-stage DCI may be determined based on the indicated ratio and a total quantity/number of REs scheduled for the PDSCH transmission or the PSSCH transmission. The encoded bits of the second-stage DCI may be mapped over the quantity/number of determined REs. The code-rate of the second-stage DCI may be predetermined/preconfigured, and actual code-rate used may be changed based on the allocated quantity/number of REs.

An aggregation level of the second-stage DCI may be indicated in the first-stage DCI. A first aggregation level (e.g., AL=1) may correspond to a quantity/number of REs (e.g., 60 REs, or any other quantity of REs). A quantity/number of REs used for the second-stage DCI may be determined, for example, based on the indicated aggregation level. A quantity/number of REs used for the second-stage DCI for a second aggregation level (e.g., AL=2) may be equal to twice the quantity of REs used for the first aggregation level. A quantity/number of REs corresponding to an aggregation level may vary depending on a size of the second-stage DCI. A base station may send (e.g., transmit) one or more RRC messages indicating a quantity/number of REs corresponding to an aggregation level (e.g., for the first aggregation level, AL=1) for the second-stage DCI format. A quantity/number of REs corresponding to an aggregation level (e.g., for the first aggregation level, AL=1) may be predetermined for a range of DCI sizes. A first quantity/number of REs (e.g., 40 REs) may be used for the first aggregation level (e.g. AL=1), for example, if the second-stage DCI is within a first range of a quantity of bits (e.g., 1-20 bits, or any other range). A second quantity/number of REs (e.g., 60 REs) may be used for the first aggregation level (e.g., AL=1), for example, if the second-stage DCI is within a second range of a quantity of bits (e.g., 21-40 bits, or any other range). A wireless device may determine a quantity/number of REs used for the second-stage DCI, for example, based on one or more mappings between a DCI size, a quantity of REs for an aggregation level (e.g., the first aggregation level), and an indicated aggregation level.

A wireless device may determine a quantity/number of REs used for second-stage DCI based on an MCS value of a first TB indicated in first-stage DCI. The indicated MCS value may determine a modulation scheme of the second-stage DCI. A first modulation scheme (e.g., 16 QAM, or any other modulation scheme) may be used for the second-stage DCI, for example, if a PDSCH transmission or a PSSCH transmission is scheduled with the first modulation scheme (e.g., 16 QAM, or any other modulation scheme). A code-rate may be assumed as a fixed value (e.g., ⅓, or any other code rate). A quantity/number of REs for the second-stage DCI may be determined based on a modulation order, a quantity/number of bits of the second-stage DCI, and/or a code-rate. A quantity/number of REs used for the second-stage DCI may be determined based on an MCS value of a first TB (e.g., as a default behavior). The wireless device may override the default behavior and use an indicated parameter for determining the quantity/number of REs of the second-stage DCI, for example, if the first-stage DCI includes the parameter. The wireless device may override the default behavior and use an indicated configuration for determining the quantity of REs of the second-stage DCI, for example, if a base station configures the indicated configuration, a code-rate, and/or a quantity/number of REs for the second-stage DCI.

A dynamic aggregation level or a parameter to adjust a quantity/number of REs used for second-stage DCI may allow a base station to efficiently adjust a reliability target of the second-stage DCI and/or adjust allocated resources, for example, based on (e.g., in response to) varying channel conditions. A default behavior for determining a quantity/number of REs and/or a modulation order of the second-stage DCI being based on an MCS value of a scheduled PDSCH transmission and/or a scheduled PSSCH transmission may allow adjustment of the second-stage DCI based on varying channel conditions without additional DCI overhead.

Second-stage DCI may be sent (e.g., transmitted) using a specific modulation scheme (e.g., a QAM) only, or using any one of different modulation schemes. A modulation scheme used in the second-stage DCI may be configured, by a base station, to a wireless device via RRC messaging, a MAC CE, and/or DCI messages.

Second-stage DCI may be sent (e.g., transmitted) around or near resources used for a scheduled PDSCH transmission or a scheduled PSSCH transmission. The second-stage DCI may be transmitted, for example, using subcarriers that are next to (e.g., subcarriers corresponding to higher frequencies than) subcarriers corresponding to allocated resources (e.g., for PDSCH transmissions and/or PUSCH transmissions), using subcarriers that are prior to (e.g., subcarriers corresponding to lower frequencies than) subcarriers corresponding to the allocated resources, OFDM symbols that follow OFDM symbols corresponding to the allocated resources, OFDM symbols that are prior to OFDM symbols corresponding to the allocated resources). A frequency resource and/or a time resource of REs for the second-stage DCI may be determined based on resource allocation of a scheduled PDSCH transmission. A quantity/number of subcarriers, starting from a first subcarrier index, (e.g., a largest subcarrier index in a current active DL BWP that is smaller than a first subcarrier index of a frequency domain resource allocation of the scheduled PDSCH transmission) to a second subcarrier index corresponding to a quantity/number of required consecutive subcarriers (e.g., smaller than the first subcarrier index) may be used. One or more subcarriers around resource blocks scheduled for the PDSCH transmission and/or the PSSCH may be used for mapping the second-stage DCI. A quantity/number of subcarriers (e.g., consecutive subcarriers) which are larger than a last subcarrier index of the frequency domain resource allocation of the scheduled PDSCH may be used for the second-stage DCI. A time-first and a frequency-second mapping may be used for mapping the second-stage DCI. A time-domain for the second-stage DCI may be determined based on a time domain resource allocation of the scheduled PDSCH transmission and/or the scheduled PSSCH transmission. A first slot may be used to determine the time domain resource allocation of the second-stage DCI, for example, if multi-slot scheduling is used for the scheduled PDSCH transmission and/or the scheduled PSSCH transmission.

A base station may map second-stage DCI over one or more OFDM symbols, starting from a last OFDM symbol in a first PDSCH transmission, a first PSSCH transmission, or a first slot of scheduled data, for example, if a listen-before-talk (LBT) procedure is used. Only a last OFDM symbol of a scheduled PDSCH transmission and/or a scheduled PSSCH transmission may be used, for example, for mapping the second-stage DCI. Using only the last OFDM symbol may ensure transmission of the second-stage DCI regardless of an LBT result, for example, if the base station may send (e.g., transmit) the PDSCH transmission and/or the PSSCH transmission. A quantity/number of OFDM symbols used for the second-stage DCI may be configured by the base station. A frequency-first and time-second mapping may be used for mapping the second stage-DCI. A time mapping may start from a last OFDM symbol towards smaller OFDM symbol indices in a slot. Various mapping procedures of second-stage DCI described herein may be used for a mapping UCI over a PUSCH transmission and/or a PSSCH transmission.

Figure 21:
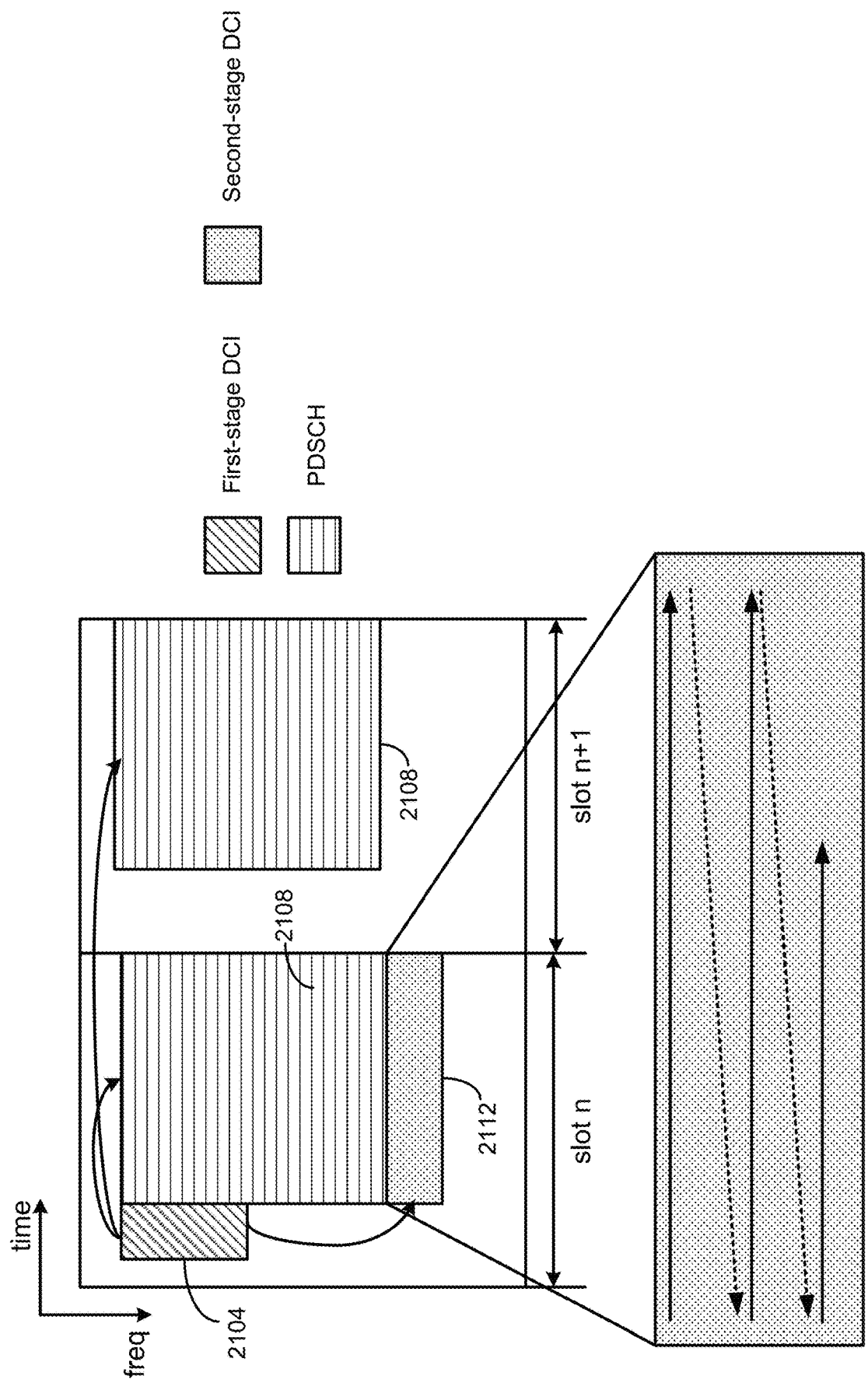
FIG. 21 shows an example mapping of piggybacked-DCI.

FIG. 21 shows an example mapping of P-DCI corresponding to second-stage DCI. A wireless device may receive first-stage DCI 2104 at a slot n. The first-stage DCI 2104 may schedule a multi-slot PDSCH transmission 2108 (or a PSSCH transmission) at the slot n and slot n+1. Second-stage DCI 2112 may be sent (e.g., transmitted) over consecutive subcarriers (e.g., larger subcarrier indices) starting from a last subcarrier of the scheduled PDSCH 2108 in a first slot. A mapping of the second-stage DCI 2112 may be performed from a lowest subcarrier first, in which the mapping may first start from a first OFDM symbol to a last OFDM symbol in the same carrier. The mapping may move to a next subcarrier (e.g., the lowest subcarrier+1), and so on. A mapping of the second-stage DCI 2112 may start from a highest subcarrier index to lower subcarriers, for example, if one or more lower subcarriers are used for second-stage DCI 2112.

A wireless device may utilize DM-RS in a scheduled PDSCH transmission for channel estimation to decode second-stage DCI. A base station may send (e.g., transmit) DM-RS on one or more PRBs used for the second-stage DCI, and based on a same DM-RS configuration used for the scheduled PDSCH. A base station may configure a DM-RS configuration used for second-stage DCI resources. A wireless device may assume (e.g., if the second-stage DCI is mapped around a PDSCH transmission after a last subcarrier of the PDSCH transmission) that second-stage DCI is not transmitted, for example, if the PDSCH transmission is scheduled to the end of a current active DL BWP and/or there are no sufficient resources for the second-stage DCI. A wireless device may apply one or more default behaviors and/or perform one or more default actions, for example, in a manner similar to a scenario in which the wireless device does not successfully decode second-stage DCI.

Second-stage DCI may be sent (e.g., transmitted) via REs allocated for a scheduled PDSCH transmission. One or more REs near a first DM-RS (e.g., a first OFDM symbol in a slot carrying a DM-RS in a PDSCH transmission) of the scheduled PDSCH transmission may be used for the second-stage DCI. A base station may perform rate matching on such REs in mapping encoded bits for the scheduled PDSCH transmission. One or more OFDM symbols immediately before (e.g., prior to) a first DM-RS symbol may be used for mapping the second-stage DCI.

Figure 22:
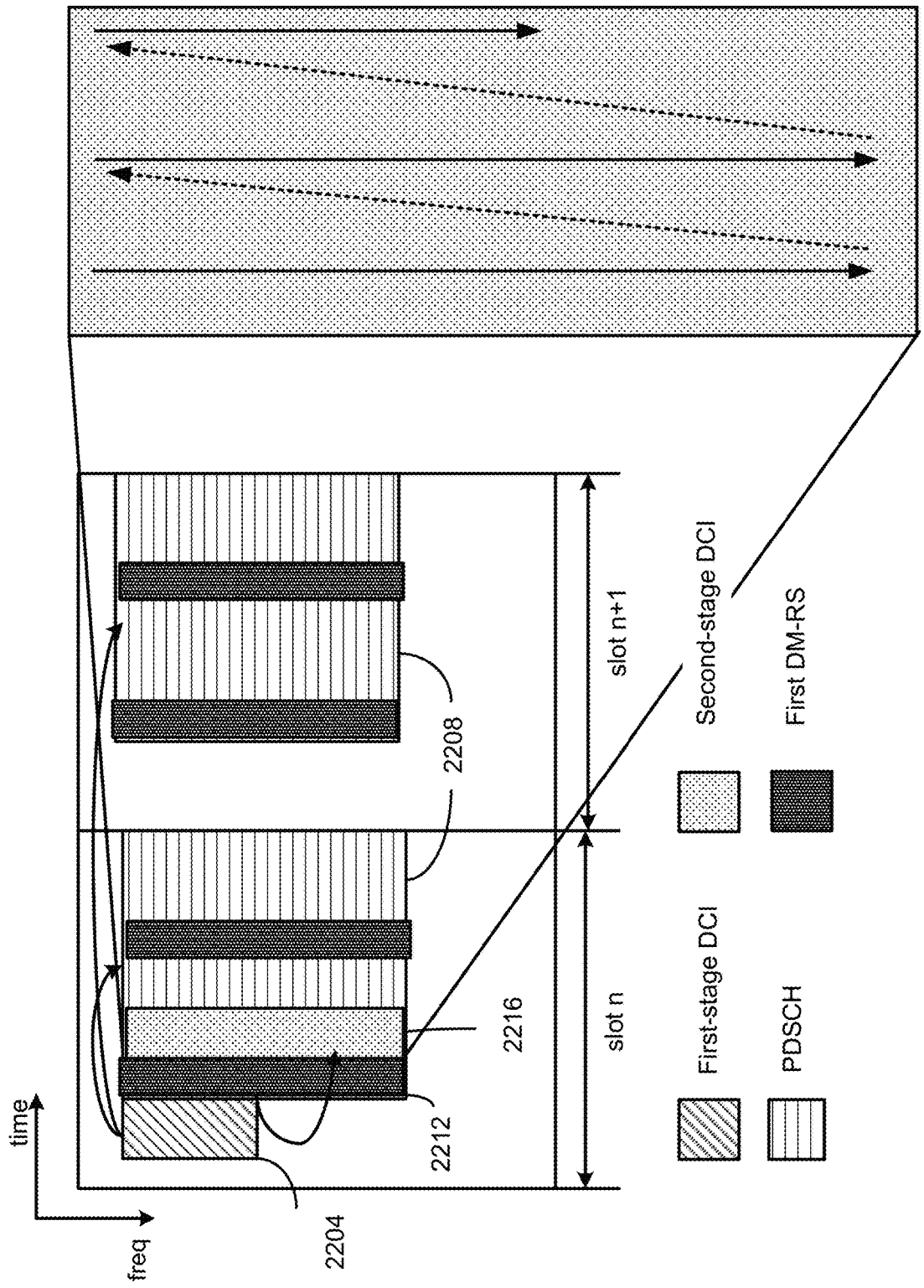
FIG. 22 shows an example mapping of DCI.

FIG. 22 shows an example mapping of DCI. A wireless device may receive first-stage DCI 2204 at a slot n. The first-stage DCI 2204 may schedule a multi-slot PDSCH transmission 2208 at slot n and slot n+1. A first DM-RS 2212 may be transmitted in a first OFDM symbol of the scheduled PDSCH transmission 2208. One or more OFDM symbols immediately after first DM-RS symbols may be used for mapping second-stage DCI 2216. A frequency-first and time-second mapping may be used for mapping the second-stage DCI 2216. The first-stage DCI 2204 and the second stage-DCI 2216 may correspond to SCI, with the first-stage DCI scheduling resource(s) for one or more PSSCH transmissions.

Figure 23:
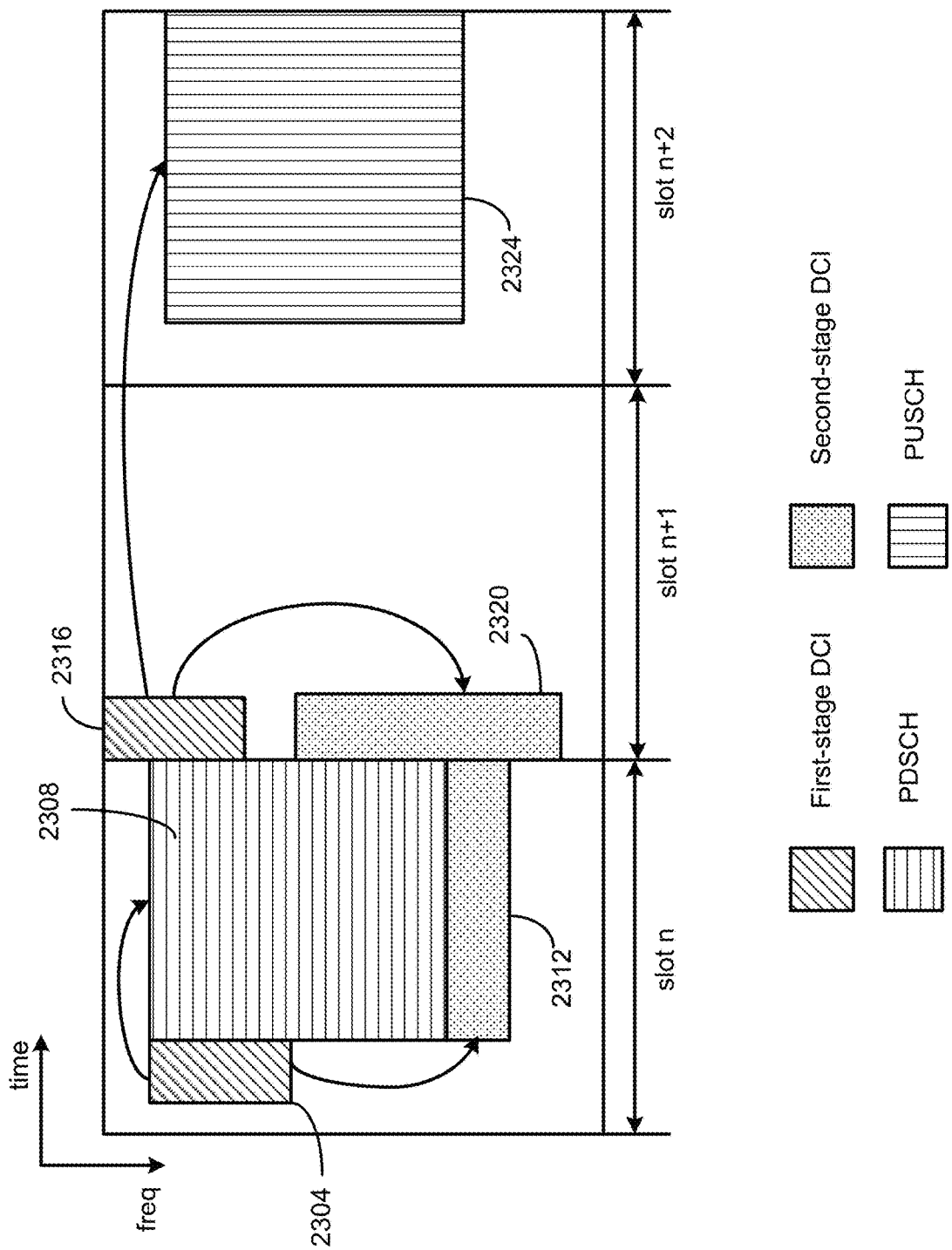
FIG. 23 shows an example mapping of downlink scheduling DCI and uplink scheduling DCI.

FIG. 23 shows an example mapping of downlink scheduling DCI and uplink scheduling DCI.

A wireless device may receive first-stage DCI 2304 of the downlink scheduling DCI in a slot n. The first-stage DCI 2304 may schedule a PDSCH transmission 2308 at the slot n. The wireless device may attempt to receive second-stage DCI 2312 corresponding to the first-stage DCI 2304 at the slot n. Resources for the second-stage DCI 2312 may be assumed to be allocated around (e.g., in a proximity of) resources corresponding to the scheduled PDSCH transmission 2308 (e.g., immediately higher subcarriers from a last subcarrier of the scheduled PDSCH transmission 2308) at the slot n. The wireless device may use DCI fields transmitted in the second-stage DCI 2312, for example, based on (e.g., in response to) successfully receiving/decoding the second-stage DCI 2312. The wireless device may receive first-stage DCI 2316 of the uplink scheduling DCI. The first-stage DCI 2316 may schedul a PUSCH transmission 2324 at a slot n+2. Second-stage DCI 2320 of the uplink scheduling DCI may be transmitted via a separate PDCCH transmission, either at a same slot as the first-stage DCI 2316 or in a different slot from the first-stage DCI 2316. The wireless device may receive the second-stage DCI 2320 in the slot n+1 (e.g., in a same slot as the first-stage DCI 2316). The wireless device may use DCI fields from the first-stage DCI 2316 and the second-stage DCI 2320 to send (e.g., transmit) the scheduled PUSCH transmission 2324 in the slot n+2.

A base station, for mapping second-stage DCI, may or may not perform rate matching operation on any rate matching resources which are dynamically enabled or disabled based on the second-stage DCI. A rate matching indication in first-stage DCI may be applied for mapping of second-stage DCI. Second-stage DCI may be mapped without assuming any dynamic rate matching resources, for example, if a rate matching indication is not delivered via first-stage DCI. A base station, for mapping second-stage DCI, may perform rate matching of the second-stage DCI over one or more semi-static rate matching resources. A semi-static rate matching resource may be configured by a base station and may be applied in a data mapping to be rate matched around, regardless of a dynamic rate matching indication. The base station may perform rate matching around one or more semi-static resources in mapping a control message (e.g., second-stage DCI) or a data message (e.g., a PDSCH transmission).

Second-stage DCI may be sent (e.g., transmitted) via a PDCCH. A base station may configure one or more first search spaces for monitoring first-stage DCI corresponding to a DCI format. The base station may configure one or more second search spaces for monitoring second-stage DCI corresponding to the DCI format. A base station may send (e.g., transmit) second-stage DCI corresponding to first-stage DCI. The base station may send (e.g., transmit) second-stage DCI for one or more first-stage DCIs, where the second-stage DCI may be applied to the one or more first-stage DCIs.

CRC bits may be appended to second-stage DCI, for example, if a size of the second-stage DCI is larger than a threshold value (e.g., 20 bits, or any other quantity of bits). A base station may encode the second-stage DCI using a first coding scheme (e.g., a polar code), for example, if the CRC bits are appended to the second-stage DCI. The base station may use a second coding scheme (e.g., a Reed-Muller cod) and not append the CRC bits, for example, if a size of the second-stage DCI is equal to or smaller than the threshold value.

A base station may configure one or more semi-persistent resource (SPR) allocations for a BWP of a cell. The base station may configure one or more first SPR for a downlink PDSCH. The base station may configure one or more second SPRs for an uplink PUSCH. Tthe base station may configure one or more second SPRs for one or more PSSCH transmissions. A transmitter wireless device may configure one or more third SPRs for PSSCH transmissions to a receiver wireless device. The base station may configure an SPR which may be activated upon configuration of the SPR, or may be activated based on additional activation signaling (e.g., a MAC CE, an activation DCI). The transmitter wireless device may activate a second SPR which may be activated upon configuration of the second SPR, or may be activated based on additional activation signaling (e.g., a MAC CE, an activation SCI). The base station may indicate whether an SPR is implicitly activated (e.g., upon configuration) or whether additional activation signaling is required, for example, based on a selection of an SPR type, an explicit configuration, one or more parameters of the SPR, etc. Each SPR may be associated with an SPR indicator (e.g., an SPR index). The base station may indicate (e.g., send, transmit) an SPR index in DCI. A wireless device may apply resource allocation information, activated (e.g., configured) under the indicated SPR index, for example, based on receiving the DCI comprising the SPR index. Multiple-stage DCI based on one or more SPRs may comprise a single first-stage DCI only, or may comprise multiple first-stage DCIs. The single first-stage DCI may comprise an indicator (e.g., index) indicating an SPR resource configuration used for a resource allocation. A size of the single first-stage DCI, with one or more configured SPR resources, may be reduced compared to a normal DCI. A reduced size of the DCI may improve transmission reliability.

Figure 24:
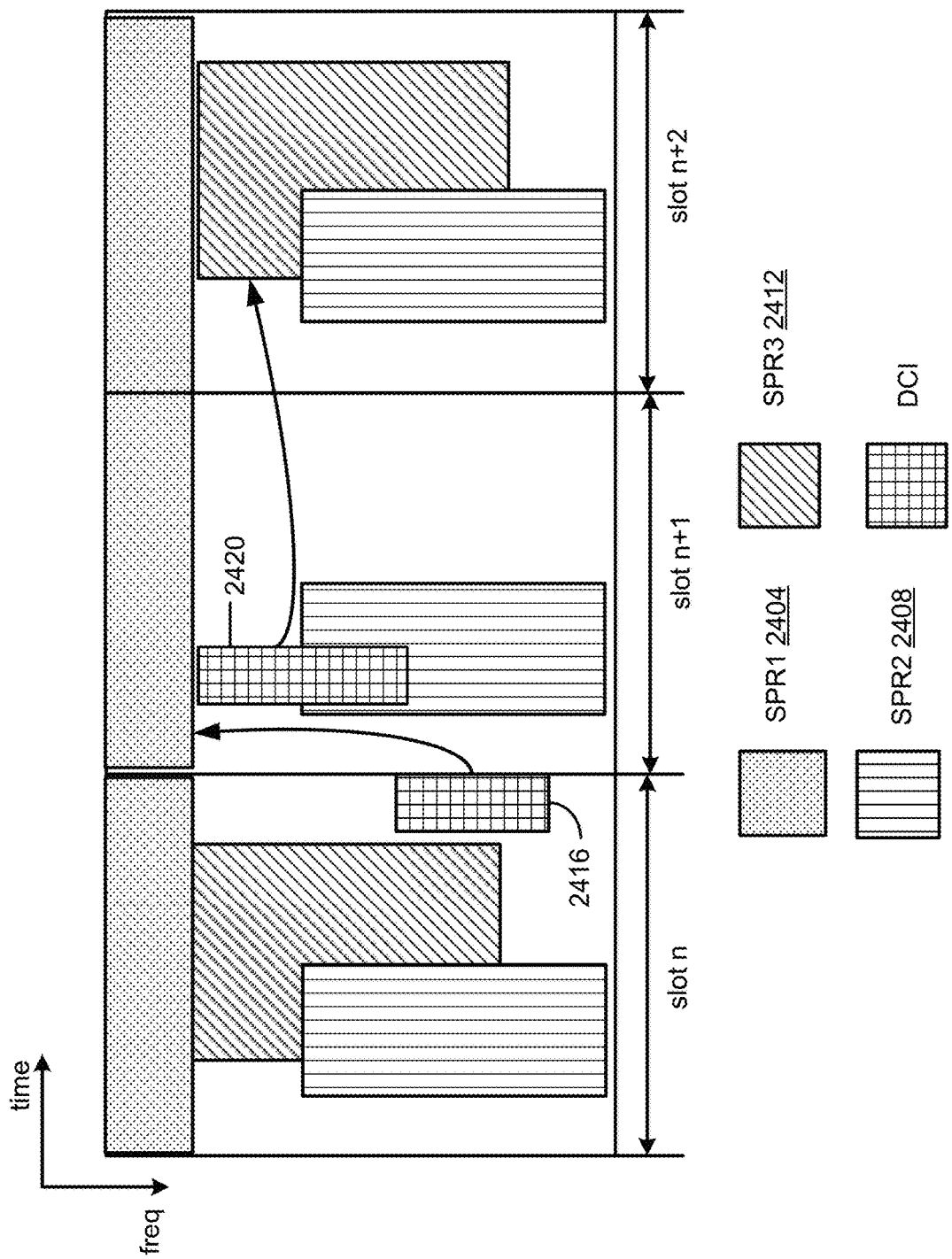
FIG. 24 shows an example semi-persistent resource (SPR) configuration.

FIG. 24 shows an example SPR configuration. A base station may configure a first SPR (e.g., SPR1 2404). The SPR1 2404 may comprise a first quantity of OFDM symbols (e.g., 14, or any other quantity) within a a first frequency domain resource allocation in every slot. The base station may configure a second SPR (e.g., SPR2 2408). The SPR2 2408 may comprise a second quantity of OFDM symbols within a second frequency domain resource allocation each slot. The first quantity of OFDM symbols may be greater than the second quantity of OFDM symbols, and the first frequency domain resource allocation may be smaller than the second frequency domain resource allocation. The base station may configure a third SPR (e.g., SPR3 2412) The SPR3 2412 may comprise a quantity/number of OFDM symbols in a large frequency domain resource allocation in every alternate (e.g., even) slot (e.g., slot n, slot n+2). The base station may send (e.g., transmit) first first-stage DCI 2416 (e.g., via a PDCCH) at a slot n indicating a first SPR index (e.g., 1, or any other SPR index). A wireless device may apply resource allocation information of the SPR1 2404 based on receiving the first first-stage DCI 2416 indicating the first SPR index. The wireless device may apply the resource allocation information of the SPR1 2404 and one or more DCI fields transmitted in the first first-stage DCI 2416 to decode a PDSCH transmission in slot n+1 and perform required behaviors/actions (e.g., a HARQ feedback). The base station may send (e.g., transmit) second first-stage DCI 2420 that indicates a second SPR index (e.g., 3, or any other SPR index) in a slot n+1. The wireless device may apply resource allocation information based on the SPR3 2412 to decode a scheduled PDSCH transmission, for example, based on receiving the second first-stage DCI 2420 indicating the second SPR index.

Resource allocation for PUSCH transmissions or sidelink transmissions (e.g., based on PSCCH/PSSCH) may be performed in a similar manner A wireless device may apply resource allocation information corresponding to an SPR index based on receiving, via DCI, the SPR index. The wireless device, to send a PUSCH transmission (e.g., a CSI trigger based on DCI) or schedule/send a PSSCH transmission, may use one or more DCI fields in DCI in addition to the resource allocation information based on the SPR index. A base station may send (e.g., transmit) second-stage DCI to schedule a PDSCH transmission, a PUSCH transmission, and/or a PSSCH transmission. The base station may skip transmission of first-stage DCI, in multiple-stage DCI, based on adopting a multiple SPR allocation mechanism. The second-stage DCI may comprise an an SPR index (e.g., if more than one SPRs are configured for a downlink transmission or an uplink transmission) to indicate information corresponding to one or more DCI fields (e.g., resource allocation information). Each SPR index may indicate parameters corresponding to DCI fields of first-stage DCI (e.g., as shown in FIG. 17-19). The second-stage DCI may be transmitted using a PDCCH.

A receiver wireless device may apply resource allocation information corresponding to an SPR index based on receiving, via SCI from a transmitter wireless device, the SPR index. The receiver wireless device may use, to receive one or more PSSCH transmissions from the transmitter wireless device, one or more SCI fields in SCI in addition to the resource allocation information based on the SPR index.

One or more SPRs may be configured per cell and/or per BWP. An SPR for a downlink transmission may correspond to one or more of: a BWP indicator/ID, frequency domain resource allocation, time domain resource allocation (e.g., a periodicity of SPR), an MCS, TCI, a rate matching indicator, VRB-to-PRB mapping, a PRB bundling size, a ZP-CSI trigger, antenna ports, a transform precoder configuration (e.g., whether transform precoder is enabled or disabled), and/or the like. Scheduling DCI for a PDSCH transmission may comprise (e.g., indicate) one or more of: a DCI format indicator, a carrier indicator, an NDI, CBG information, a DAI, a TPC command, a PUCCH ARI, HARQ feedback timing, SRS request, and/or the like. A set of DCI fields and/or parameters configured for an SPR may vary. A set of DCI fields and/or parameters transmitted in scheduling DCI may vary depending on DCI fields and/or parameters configured in one or more SPR configurations, or based on a base station configuration.

A base station may or may not dynamically change a resource allocation for a wireless device for one or more packets of a same application and/or of a same logical channel mapping. The base station may configure one or more sets of resource allocations, in which each set may support an application, a logical channel mapping, a range of packet size, and/or a range of channel conditions. Separating resource allocations by sets and using SPR configurations may reduce a size of DCI needed for scheduling downlink data or uplink data. A smaller DCI size may improve overall reliability of DCI transmission. A smaller DCI size may result in requiring less resources for DCI transmission and meeting a same QoS compared to DCI transmissions that do not separate resource allocations by sets and/or do not use SPR configurations.

Various examples described herein enhance QoS and reduces control resource overhead for multiple-stage DCI. A base station may send (e.g., transmit) first-stage DCI at a first frequency (e.g., with a first periodicity, in a first set of transmission occasions) and send (e.g., transmit) a second-stage DCI at a second frequency (e.g., with a second periodicity, in a second set of transmission occasions). The base station may send (e.g., transmit) the first-stage DCI with a scheduling occasion (e.g., one first-stage DCI with a scheduling occasion or one first-stage DCI for a scheduled data). The base station may send (e.g., transmit) the second-stage DCI at a lower frequency (e.g., every K transmission occasions, every L scheduling occasions, every M slots, and/or every N ms) compared to the first-stage DCI. The base station may change contents of DCI fields corresponding to the second-stage DCI at a lower rate as compared to contents of DCI fields corresponding to the first-stage DCI. The second-stage DCI may be transmitted with a higher reliability target (e.g., a higher transmission power) such that reliability of multiple-stage DCI is maintained. Reducing the frequency of transmission of the second-stage DCI and/or using higher reliability target for the second-stage DCI may reduce control resource overhead for DCI transmission.

A wireless device may process reception of first-stage DCI and second-stage DCI differently. The wireless device may determine that multiple-stage DCI is successfully received, for example, if the wireless device has received at least the first-stage DCI. The second-stage DCI may comprise additional DCI fields and the wireless device may not perform functionalities indicated in the second-stage DCI, for example, based on not receiving the second-stage DCI. The wireless device may determine that multiple-stage DCI is successfully received, for example, if the wireless device has successfully decoded the first-stage DCI of the multiple-stage DCI. Determining that the multiple-stage DCI is successfully received based on successful reception/decoding of the first-stage DCI may allow efficient resource allocation (e.g., by reducing redundant transmission of second-stage DCI and/or by reducing reliability requirements of the second-stage DCI) and maintain quality of DCI reception.

A base station may send (e.g., transmit) second-stage DCI in a PDCCH (e.g., a second-stage PDCCH) that is separate from first-stage DCI of a multiple-stage DCI based on a same DCI format. A size of the second-stage DCI may be aligned to a size of the first-stage DCI such that complexity of blind decoding of control channels is not be increased. The second-stage DCI (e.g., in the second-stage PDCCH) may indicate a duration. One or more DCI fields transmitted in the second-stage DCI may be effective within (e.g., valid for) the indicated duration following reception of the second-stage DCI.

A base station may send (e.g., transmit) one or more configuration messages (e.g., RRC messages) indicating an effective duration used for second-stage DCI. A VRB-to- PRB setting indicated in the second-stage DCI may be valid for the indicated duration. A wireless device may perform an SRS transmission once within the indicated duration (e.g., at an earliest SRS resource). A wireless device may use, within the indicated duration, a PUCCH resource indicator based on a value of PUCCH ARI field in the second-stage DCI. The wireless device may use, within the indicated duration, an indicated HARQ feedback timing (e.g., for a PDSCH-to-HARQ feedback) for each scheduled PDSCH transmission. The wireless device may send (e.g., transmit) a HARQ-ACK feedback message at a slot n+k, for example, if the wireless device has been scheduled with a PDSCH transmission in a slot n and if the HARQ feedback timing is indicated to be k slots (e.g., k=2, or any other quantity). Multiple HARQ feedback messages may be transmitted, in which HARQ-ACK feedback timing is determined based on the indicated HARQ feedback timing, for example, if multiple PDSCH transmissions are scheduled within the indicated duration. The wireless device may drop a HARQ-ACK feedback message or postpone HARQ-ACK feedback to a next HARQ-ACK feedback occasion (or a next PUSCH transmission occasion), for example, if the slot n+k is a flexible slot, a downlink slot, or OFDM symbols in which a PUCCH transmission is scheduled are not uplink symbols.

A wireless device may use one or more DCI fields indicated by a second second-stage DCI (e.g., overriding contents of previously received first second-stage DCI), for example, if the wireless device receives the second second-stage DCI before the first second-stage DCI has expired (e.g., the second second-stage DCI is received within an indicated duration in the first second-stage DCI). A wireless device may use one or more parameters configured as default behaviors/actions and/or use default values for one or more DCI fields indicated in second-stage DCI, for example, if the wireless device has not received a second second-stage DCI following expiration of a first second-stage DCI (e.g., an indicated duration in the first first-stage DCI has elapsed).

A base station may configure one or more sets of parameters via RRC configuration and/or via MAC CEs. Each set of parameters may comprise one or more DCI fields transmitted in second-stage DCI (e.g., as described in examples shown in FIGS. 17-19). Each set may comprise one or more values corresponding to one or more DCI fields and an indicator (e.g., an index). The base station may send scheduling DCI. The scheduling DCI may be first-stage DCI. The scheduling DCI may indicate an index of a set of parameters. A wireless device may determine a set of DCI fields based on the set of parameters indicated by the index and one or more DCI fields transmitted in the scheduling DCI, for example, based on receiving the scheduling DCI with the index of the set of parameters. The base station may configure (e.g., via RRC configuration and/or MAC CEs) DCI fields corresponding to VRB-to-PRB mapping, a PRB bundling size, a rate matching indicator, a ZP-CSI trigger, a PUCCH ARI, a HARQ feedback timing, antenna ports, TCI, and/or the like. The base station may configure DCI fields corresponding to a BWP indicator/ID, a frequency domain resource allocation, a time domain resource allocation, an MCS, an NDI, an RV, a HARQ process indicator/ID, a CBG, an SRS request and/or the like. The wireless device may determine parameters for a first set of DCI fields (e.g., configured via RRC configuration and/or MAC-CEs), for example, based on receiving the index. The wireless device may determine a second set of DCI fields, for example, based on receiving the scheduling DCI with the second set of DCI fields. The wireless device may apply behaviors and/or perform actions, for example, based on combining the first set of DCI fields and the second set of DCI fields. The wireless device may receive a scheduled PDSCH (e.g., based on information in DCI fields) and/or send (e.g., transmit) a scheduled PUSCH. The wireless device may send a HARQ-ACK feedback message based on receiving a scheduled PDSCH transmission.

A wireless device (e.g., multi-subscriber identity module (SIM) device) may not receive a signal (e.g., a paging indication) via a first communication system (e.g., via a first wireless network, a first PLMN, a first access technology, a first network, etc.) and/or may receive but may not be able to respond to the signal (e.g., may not be able to initiate a connection establishment procedure), for example, if the wireless device is actively engaged in another communication via another communication system (e.g., via a second wireless network, second public land mobile network (PLMN), second access technology, second network, etc.). Missing, by the wireless device, the signal (e.g., a paging indication) via the first communication system and/or an inability of the wireless device to communicate via the first communication system if the wireless device is communicating via the second communication system may decrease service reliability and increase service latency.

Various examples described herein may enable enhanced signaling for wireless devices and support simultaneous communications via multiple communication systems. A wireless device may indicate, to/via a second communication system (e.g., a second network), assistance information for the wireless device to monitor signals via a first system (e.g., first network) and/or to communicate via the first communication system. The wireless device may receive system information (e.g., paging configuration parameters) via the first communication system and send assistance information, based on the system information, to/via the second communication system. The second communication system may configure resource gaps for the wireless device to monitor signals from and/or communicate via the first communication system. The assistance information may indicate network type information (e.g., PLMN, V2X, service-based network, etc.) of the first communication system for the second communication system. The second communication system may use the network type of the first communication system to configure the resource gaps. Example embodiments may increase service reliability and decrease service latency.

Figure 25:
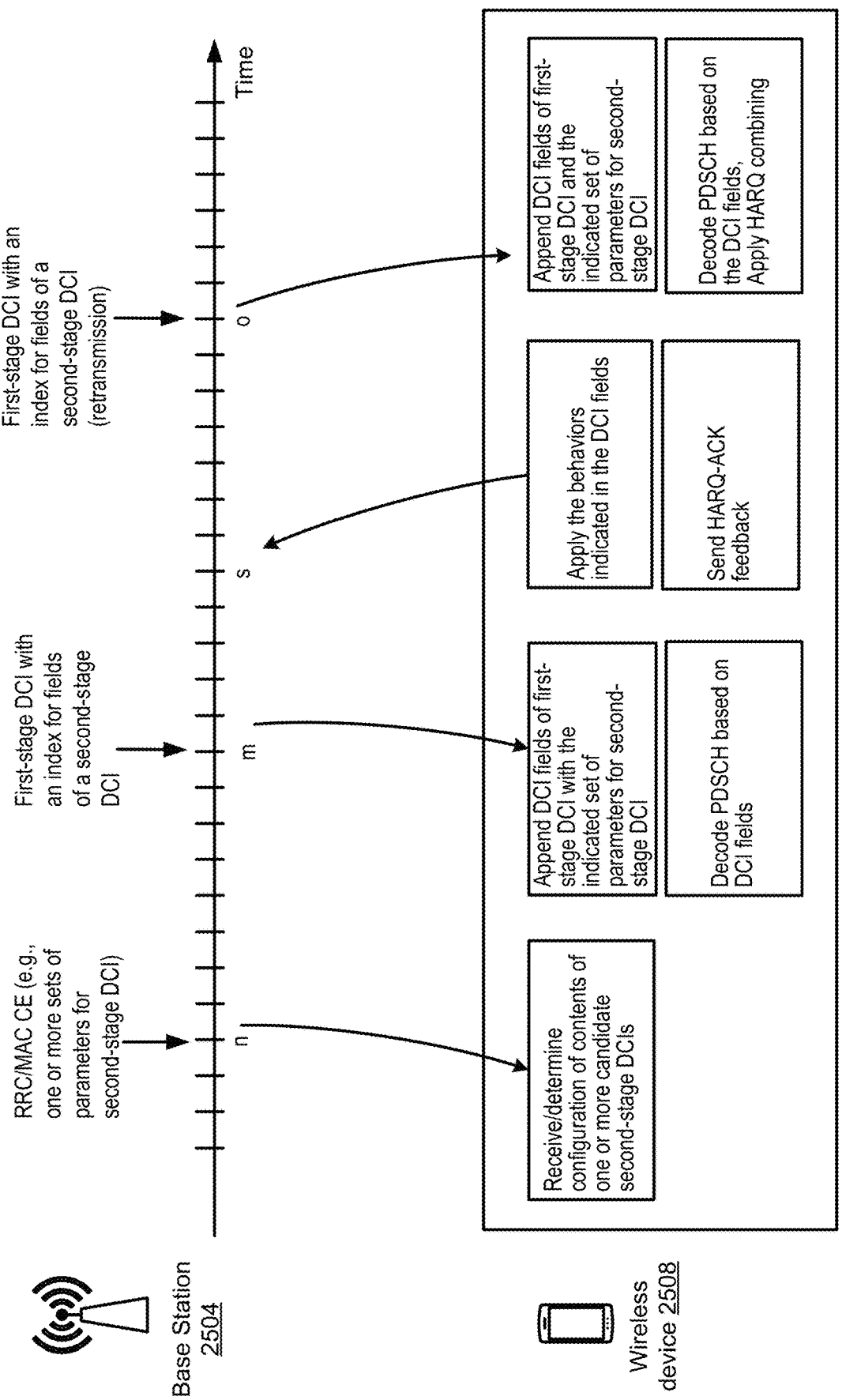
FIG. 25 shows an example DCI transmission.

FIG. 25 shows an example DCI transmission. A base station 2504 may configure (e.g., at or after time n) one or more sets of parameters (e.g., using one or more RRC messages and/or one or more MAC CE messages). Each set of parameters may be associated with a corresponding indicator (e.g., index) and corresponding one or more second DCI fields (e.g., corresponding values of the one or more second DCI fields). The wireless device 2508 may store the one or more sets of parameters based on receiving the configuration. The one or more second DCI fields may comprise one or more DCI fields transmitted in second-stage DCI (e.g., as described with reference to FIGS. 17-20). The one or more second DCI fields may comprise one or more DCI fields transmitted in first-stage DCI (e.g., as described with reference to FIGS. 17-20).

The base station 2504 may send (e.g., transmit) (e.g., at or after time m) first-stage DCI or scheduling DCI. The first-stage DCI may comprise an index indicating a set of parameters from the one or more sets of parameters (e.g., configured at or after the time n). The wireless device 2508 may determine one or more second DCI fields (e.g., values corresponding to the one or more second DCI fields) based on the indicated set of parameters. The wireless device 2508 may append one or more first DCI fields from the first-stage DCI with the one or more second DCI fields. The wireless device 2508 may (e.g., at or after time m) use the DCI fields (e.g., the one or more first DCI fields and/or the one or more second DCI fields) to decode a scheduled PDSCH transmission.

The wireless device 2508 may (e.g., at or after time s) apply apply behaviors and/or perform actions, for example, based on the DCI fields. The wireless device 2508 may send (e.g., transmit) a HARQ-ACK message based on the appended DCI fields received at the time m. The wireless device 2508 may (e.g., at or after time o) receive second first-stage DCI. The wireless device 2508 may determine one or more DCI fields by appending one or more first DCI fields transmitted in the second first-stage DCI to one or more second DCI fields (e.g., determined based on an index indicated in the second first-stage DCI and the one or more sets of parameters received at the time n). The wireless device 2508 may attempt to decode a scheduled PDSCH transmission and/or perform various indicated operations (e.g., HARQ-ACK combining, HARQ-ACK feedback, transmitting CSI-feedback, and/or the like).

The wireless device 2508 may determine (e.g., select) one or more parameters (e.g., to determine the one or more second DCI fields) from the indicated set of parameters, for example, based on a DCI format used in the first-stage DCI (e.g., the first-stage DCI received at or after time m, or the second first stage-DCI received at or after time o). All parameters in the indicated set of parameters may be used, for example, if the first-stage DCI is based on a first downlink scheduling DCI format (e.g., a non-fallback downlink DCI format, a DCI format 1_1, a DCI format 1_4). Only parameters corresponding to DCI fields present in a second downlink scheduling DCI format (e.g., a fallback downlink DCI format, a DCI format 1_0, DCI format 1_3) may be used, for example, if the first-stage DCI is based on the second downlink scheduling DCI format. The base station 2504 may send (e.g., transmit) one or more first sets of parameters that may be used for the first downlink scheduling DCI format. The base station 2504 may send (e.g., transmit) one or more second sets of parameters that may be used for the second downlink scheduling DCI format. The base station 2504 may use the various procedures described herein with reference to FIG. 25 for sending downlink scheduling DCI, uplink scheduling DCI, and/or DCI scheduling one or more sidelink resources. A transmitter wireless device may use the various procedures described herein with reference to FIG. 25 for sending/scheduling a SCI scheduling one or more sidelink resources to one or more receiver wireless devices.

Values of one or more DCI fields may not change very dynamically (e.g., frequently). A value of a transform precoding field (e.g., indicating whether a transform precoder is enabled or disabled) may not change between (e.g., subsequent) PDSCH transmissions (or PUSCH transmissions or PSSCH transmissions). TCI or SRI information (e.g., spatial filter information) may not change dynamically at least from a single transmission point. A base station may reduce overall resources used to send (e.g., transmit) DCI to wireless devices, for example, by separating one or more DCI fields that are frequently updated from one or more other DCI that are sporadically updated. Reduced DCI size may result in lower latency, lower resource utilization, and/or higher reliability.

A base station may send (e.g., transmit) one or more sets of parameters using group-common DCI or wireless device-specific DCI. Each set of parameters may comprise corresponding values of one or more second DCI fields. The one or more second DCI fields may correspond to one or more DCI fields transmitted in second-stage DCI (e.g., as shown in examples of FIG. 17-20). The one or more second DCI fields may correspond to one or more DCI fields transmitted in first-stage DCI (e.g., as shown in examples of FIG. 17-20).

Figure 26:
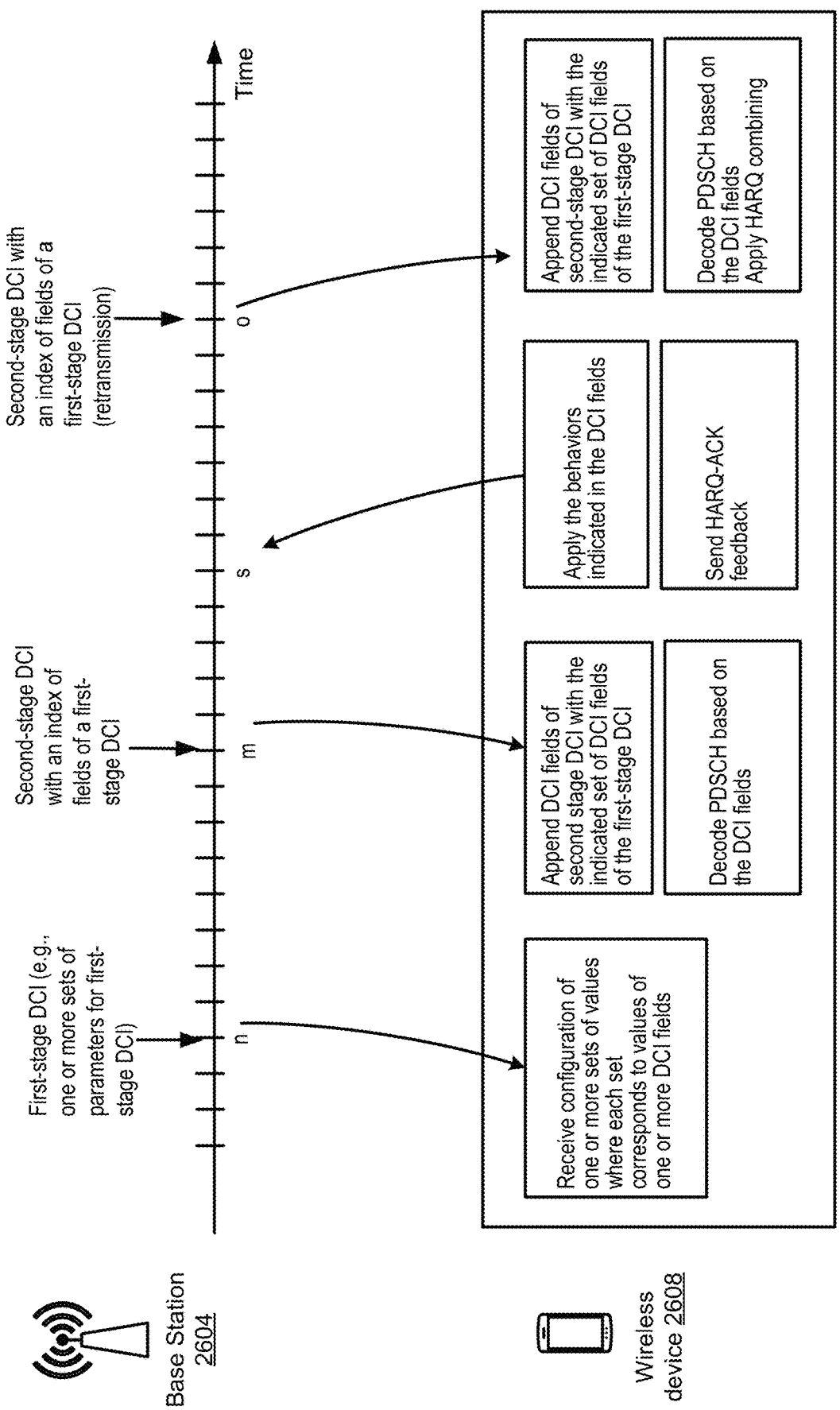
FIG. 26 shows an example DCI transmission.

FIG. 26 shows an example DCI transmission. A base station 2504 may (e.g., at or after time n) send (e.g., transmit) one or more sets of parameters via DCI. Each set of parameters may be associated with a corresponding indicator (e.g., index) and corresponding one or more first DCI fields (e.g., corresponding values of the one or more first DCI fields). A wireless device 2608 may store the one or more sets of parameters based on receiving the DCI. The one or more first DCI fields may comprise one or more DCI fields transmitted in first-stage DCI (e.g., as described with reference to FIGS. 17-20).

The base station 2604 may (e.g., at or after time m) send (e.g., transmit) second-stage DCI or scheduling DCI. The second-stage DCI may comprise an index indicating a set of parameters from the one or more sets of parameters configured at or after the time n. The wireless device 2608 may determine one or more first DCI fields (e.g., values corresponding to the one or more first DCI fields) based on the indicated set of parameters. The wireless device 2608 may append the one or more first DCI fields to one or more second DCI fields from the second-stage DCI. The wireless device 2608 may use the DCI fields (e.g., the one or more first DCI fields and the one or more second DCI fields) to decode a scheduled PDSCH transmitted.

The wireless device 2608 may (e.g., at or after time s) apply apply behaviors and/or perform actions, for example, based on the DCI fields. The wireless device 2608 may send (e.g., transmit) a HARQ-ACK feedback message based on the appended DCI fields. The wireless device 2608 may (e.g., at or after time o) receive second second-stage DCI. The wireless device 2608 may determine one or more DCI fields by appending one or more second DCI fields transmitted in the second second-stage DCI with one or more first DCI fields determined (e.g., based on an index transmitted in the second second-stage DCI and the one or more sets of parameters received at the time n). The wireless device 2608 may attempt to decode, based on the one or more DCI fields, a scheduled PDSCH transmission and/or perform various indicated operations (e.g., HARQ-ACK combining, HARQ-ACK feedback, transmitting CSI-feedback, and/or the like.)

The wireless device 2608 may determine (e.g., select) one or more parameters (e.g., to determine the one or more first DCI fields) from the indicated set of parameters based on a DCI format used in the second-stage DCI (e.g., the second-stage DCI receive at or after time m, or the second second-stage DCI received at or after time o). All the parameters in the indicated set of parameters may be used, for example, if the second-stage DCI is based on a first downlink scheduling DCI format (e.g., non-fallback downlink DCI format, a DCI format 1_1, DCI format 1_4). Only parameters corresponding to DCI fields present in a second downlink-scheduling DCI format (e.g., a fallback DCI format, a DCI format 1_0, DCI format 1_3) may be used, for example, if the second-stage DCI is based on the second downlink-scheduling DCI format. The base station 2604 may send (e.g., transmit) one or more first sets of parameters that may be used for the first downlink scheduling DCI format. The base station 2604 may send (e.g., transmit) one or more second sets of parameters that may be used for the second downlink scheduling DCI format. The base station 2604 may use the various procedures described herein with reference to FIG. 26 for sending downlink scheduling DCI, uplink scheduling DCI, and/or DCI scheduling sidelink resources for one or more sidelink transmissions (e.g., PSCCH transmissions, and/or PSSCH transmissions). A transmitter wireless device may use various procedures described herein with reference to FIG. 26 for sending SCI scheduling one or more PSSCHs.

A base station may determine a DCI transmission procedure based on use cases supported by a wireless device, network congestion level, scheduling policy, etc. A wireless device may receive a configuration (e.g., an RRC configuration) indicating a DCI transmission procedure. DCI transmission procedures may be based on RRC configuration/MAC CE signaling (e.g., indicating parameters for first-stage/second-stage DCI) and transmission of second-stage/first-stage DCI (e.g., as shown in FIG. 25); transmission of group-common DCI (e.g., indicating paramaters for first-stage/second-stage DCI) and transmission of second-stage/first-stage DCI (e.g., as shown in FIG. 26), transmission of first-stage DCI and second-stage DCI for each PDSCH or PUSCH, transmission of single stage DCI, and/or the like.

A base station may send (e.g., transmit) one or more first DCI fields, via first-stage DCI, wherein the one or more first DCI fields may dynamically change in each scheduling of a PDSCH transmission. The base station may send (e.g., transmit) one or more second DCI fields (e.g., values for which are being updated at a lower frequency than values in the one or more first DCI fields) via second-stage DCI. The base station may include a new second-stage DCI indicator (NSSDI) in the first-stage DCI. The NSSDI may indicate whether one or more DCI fields in the second-stage DCI comprise values that have been updated from previously transmitted second-stage DCI. The NSSDI may be a 1-bit indicator in which a value of 1 may be used to indicate that one or more DCI fields in the second-stage DCI have been updated from previously transmitted second-stage DCI. The base station may toggle the NSSDI bit based on a change in second-stage DCI. A wireless device may determine whether the one or more DCI fields in the second-stage DCI have been updated based on the NSSDI and/or a HARQ process indicator/ID. The wireless device may maintain a status of second-stage DCI update for a HARQ process for downlink or uplink respectively.

Figure 27:
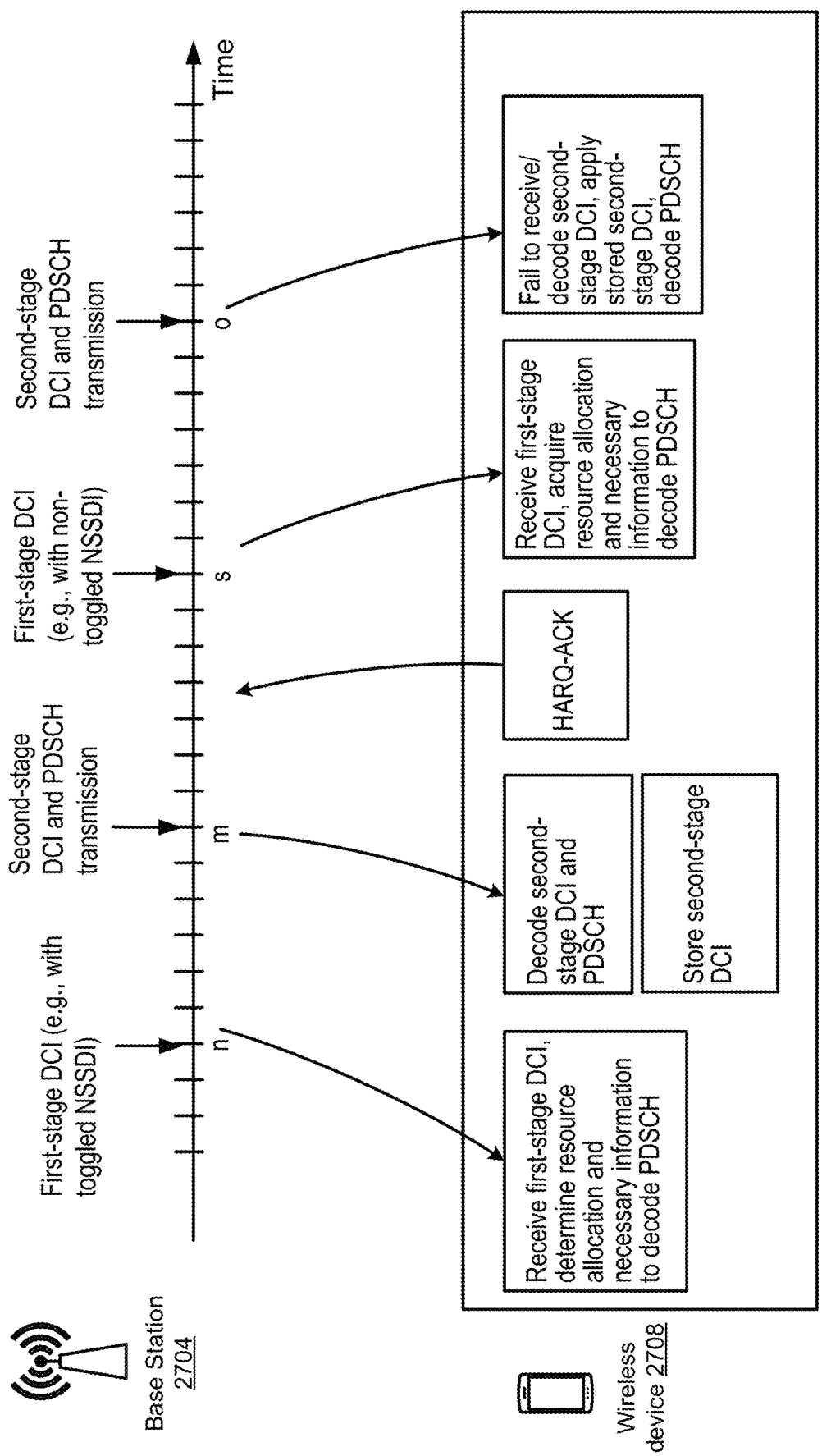
FIG. 27 shows an example DCI transmission.

FIG. 27 shows an example DCI transmission. A base station 2704 may (e.g., at or after time n) send (e.g., transmit) first-stage DCI scheduling a PDSCH. The first-stage DCI may comprise a toggled NSSDI bit (e.g., toggled with respect to an NSSDI bit in prior transmitted first-stage DCI) indicating that second-stage DCI comprises one or more updated DCI fields. A wireless device 2708 may receive one or more first DCI fields in the first-stage DCI and determine resource allocation and information for decoding a scheduled PDSCH transmission. The base station 2704 may (e.g., at or after time m) send (e.g., transmit) second-stage DCI and the PDSCH transmission. The wireless device 2708 may attempt to decode the scheduled PDSCH transmission and the second-stage DCI. The wireless device 2708 may store the second-stage DCI based on the toggled NSSDI bit. The wireless device 2708 may send (e.g., transmit), to the base station 2704, a HARQ-ACK feedback message based on one or more second DCI fields in the second-stage DCI and a status of decoding of the scheduled PDSCH. The HARQ-ACK feedback message may comprise an ACK message or a NACK message.

The base station 2704 may (e.g., at or after time s) send (e.g., transmit) a second first-stage DCI. The second first-stage DCI may comprise an untoggled NSSDI bit (e.g., not toggled with respect to the NSSDI bit in the first-stage DCI sent/transmitted at or after time n). The untoggled NSSDI bit may indicate that contents of a second second-stage DCI has not changed with respect to the second-stage DCI sent/transmitted at or after time m. The wireless device 2708 may use the one or more second DCI fields from the stored second-stage DCI. The wireless device 2708 may determine (e.g., assume) that contents of the stored second-stage DCI and the second second-stage DCI are same based on the untoggled NSSDI bit. The wireless device 2708 may (e.g., at or after time o) use the one or more second DCI fields from the stored second-stage DCI. The wireless device 2708 may use the one or more second DCI fields from the stored second-stage DCI, for example, based on not receiving the second second-stage DCI. The wireless device 2708 may use one or more second DCI fields from the second second-stage DCI, for example, based on successfully receiving/decoding the second second-stage DCI. The base station 2704 may use the various procedures described herein with reference to FIG. 27 for sending downlink scheduling DCI, uplink scheduling DCI, and/or DCI scheduling sidelink resource(s) for one or more sidelink transmissions. A transmitter wireless device may use the various procedures described herein with reference to FIG. 27 for sending SCI scheduling sidelink resource(s) for one or more sidelink transmissions.

A wireless device may use second-stage DCI, received prior to receiving first-stage DCI, for example, if contents of the second-stage DCI are not changed. Allowing utilization of a previously received second-stage DCI may enhance DCI signaling reliability. A base station may allocate different target reliability targets for first-stage DCI and second-stage DCI. The second-stage DCI may be sent/transmitted with a lower reliability target, anticipating that the wireless device may still use the previously received second-stage DCI even if the second-stage DCI is not received. The base station may skip sending/transmitting the second-stage DCI and instead indicate (e.g., via NSSDI) that the wireless device may use a previously received second-stage DCI.

A QoS (e.g., a reliability) targets of first-stage DCI and second-stage DCI may be differently configured. A base station may allocate a higher reliability target for the first-stage DCI and a lower reliability target for the second-stage DCI. One or more first DCI fields, required for decoding a PDSCCH transmission and/or encoding a PUSCH transmission, may be transmitted in the first-stage DCI with first reliability target (e.g., $10^{-5}$ BLER, or any other BLER). One or more second DCI fields, indicating additional commands (e.g., a CSI request, an SRS request, etc.) may be transmitted in the second-stage DCI with a second reliability target (e.g., $10^{-1}$ BLER, or any other BLER) lower than the first reliability target. Transmission of the first-stage DCI may be repeated for a higher reliability. A higher aggregation level may be used to send (e.g., transmit) the first-stage DCI. A wireless device may support a higher aggregation level (e.g., an aggregation level of 32 control channel elements (CCEs), 64 CCEs additionally). The first-stage DCI may be piggy-backed in a previous PDSCH transmission.

Figure 28:
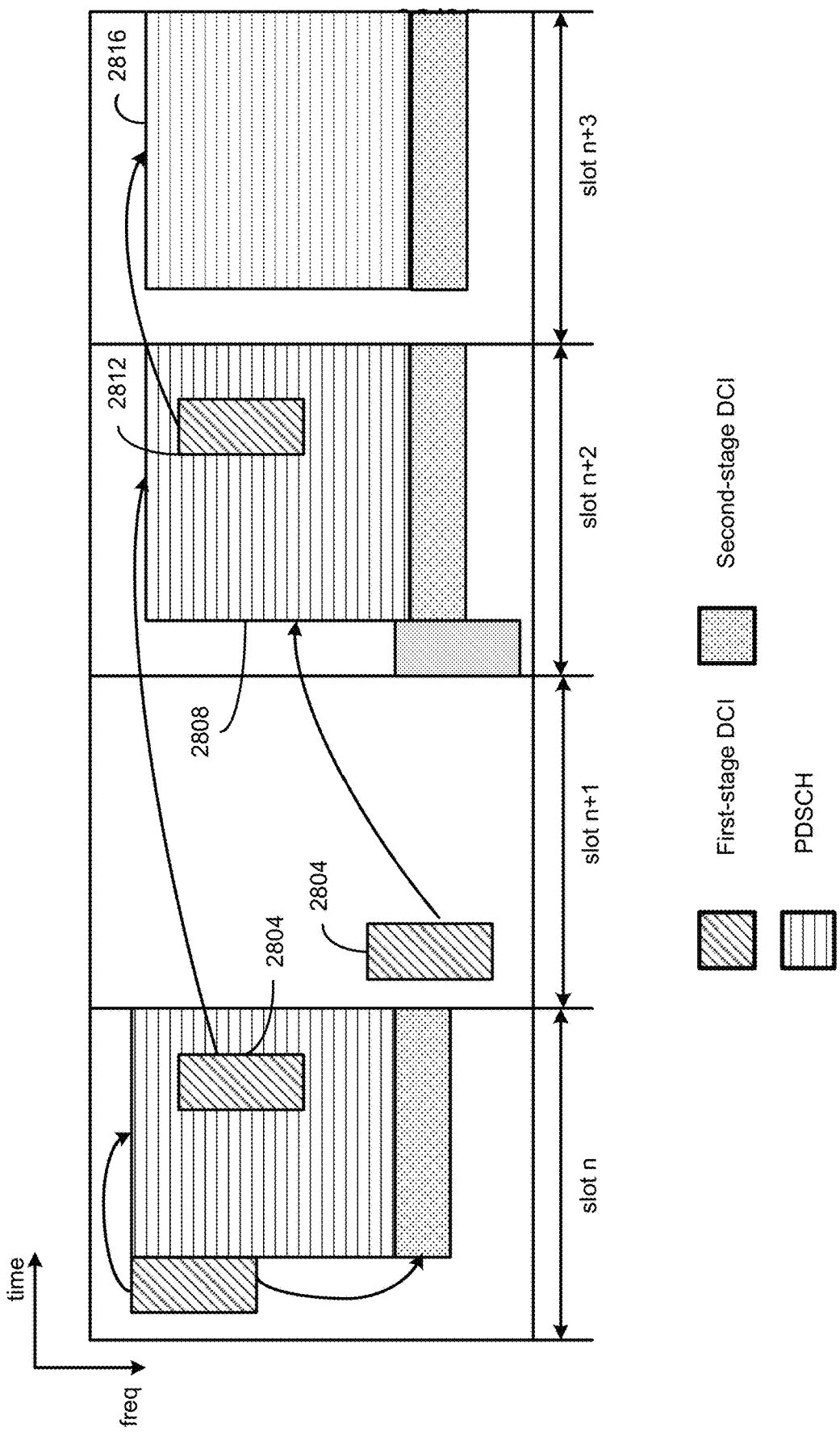
FIG. 28 shows an example mapping of DCI.

FIG. 28 shows an example mapping of DCI. A base station may send (e.g., transmit) first-stage DCI 2804 (e.g., scheduling a PDSCH transmission 2808 in a slot n+2) via a PDCCH in a slot n+1 and/or via piggybacked DCI in a slot n. A wireless device may successfully receive either transmission or both transmissions, and may decode the scheduled PDSCH 2808 in the slot n+2. The base station may send (e.g., transmit) first-stage DCI 2812 (e.g., scheduling a PDSCH transmission 2816 in a slot n+3). The wireless device may not successfully receive the first-stage DCI 2812 at the slot n+2. The wireless device may use the first-stage DCI 2804 (e.g., piggybacked DCI at the slot n+2) to decode the scheduled PDSCH 2816 at the slot n+3, for example, based on being unable to receive/decode the the first-stage DCI 2812.

A base station may send (e.g., transmit) one or more repetitions of first-stage DCI. The one or more repetitions may schedule a same PDSCH transmission.

Figure 29:
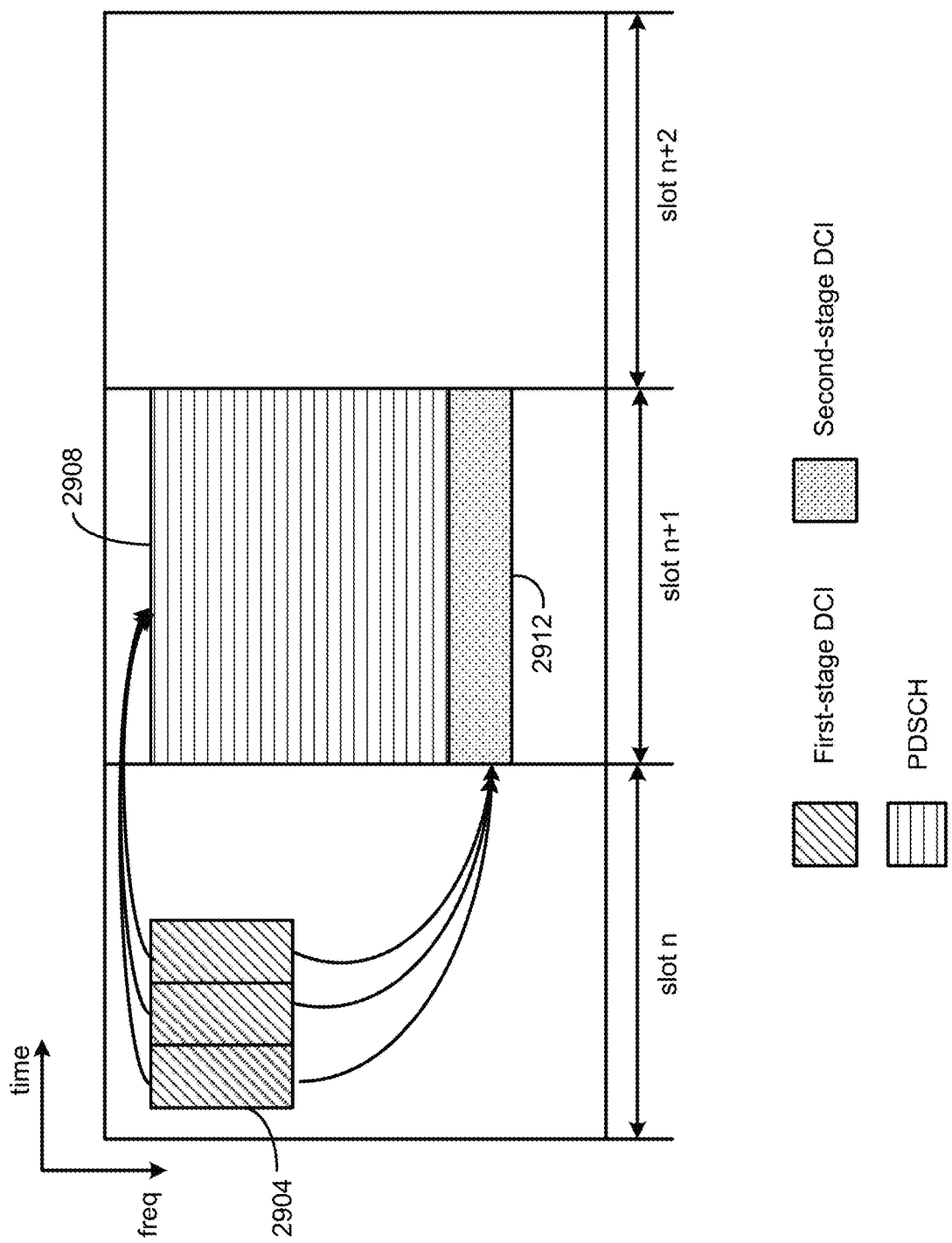
FIG. 29 shows an example of repeated DCI transmissions.

FIG. 29 shows an example of repeated DCI transmissions. A base station may send multiple transmissions of first-stage DCI 2904 (e.g., three, or any other quantity of transmissions) scheduling a same PDSCH transmission 2908. Each first-stage DCI 2904 may comprise a same set of DCI fields/values. A wireless device, may use a single first-stage DCI 2904 of the multiple transmissions, for example, based on detecting the multiple transmissions. The wireless device may that the multiple transmissions are duplicated transmissions of the first-stage DCI 2904 based on determining that resource allocations (e.g., frequency and/or time resource allocations) indicated by the multiple transmissions are fully overlapped. The base station may send (e.g., transmit) single transmission of second-stage DCI 2912.

A base station may send multiple transmissions of first-stage uplink scheduling DCI scheduling same resource(s) for one or more PUSCH transmissions. A base station may send multiple transmissions of first-stage DCI scheduling same sidelink resource(s) for one or more PSSCH transmissions. A base station may send multiple transmissions of first-stage DCI scheduling same resource(s) for one or more PDSCH transmissions. A wireless device may determine that the first-stage DCI is successfully received, for example, based on successfully receiving at least one transmission of first-stage DCI of the multiple transmissions of the first-stage DCI.

A base station may configure one or more sub-DCI formats. The one or more sub-DCI formate may share a same DCI size, to reduce wireless device complexity. A sub-DCI format may comprise one or more DCI fields of a master DCI format. A master DCI format may be a DCI format comprising one or more DCI fields used for decoding a scheduled PDSCH transmission, encoding a scheduled PUSCH transmission, and/or for other operations/commands (e.g., an SRS trigger, a CSI trigger, HARQ feedback, and/or TPC). A master DCI format may provide sufficient parameters for decoding the scheduled PDSCH transmission, encoding the scheduled PUSCH transmission, and/or for the other operations/commands. The one or more DCI fields in the sub-DCI format may comprise a subset of one or more DCI fields of the master DCI format. A wireless device may determine one or more DCI fields, for example, based on a sub-DCI format corresponding to received DCI.

The wireless device may determine one or more second DCI fields that are not present in the sub-DCI format, but are present in the master DCI format, for example, based on one or more configured parameters (e.g., via RRC signaling and/or MAC CE signaling). The base station may send (e.g., transmit) one or more configuration messages (e.g., RRC messages) comprising default values of the one or more second DCI fields of the master DCI format. The wireless device may apply a configured default value of a DCI field which is absent from the sub-DCI format but is present in the master-DCI format based on the one or more configuration messages/default values.

FIG. 30 shows an example of different sub-DCI formats. A first sub-DCI format 3004-1 may comprise one or more DCI fields (e.g., as used in the first-stage DCI shown in FIG. 18). A second sub-DCI format 3004-2 may comprise PUCCH related information (e.g., instead of antenna ports information and/or TCI information). A third sub-DCI format 3004-3 may comprise one or more parameters (e.g., parameters other than resource allocation related parameters). The base station may indicate a sub-DCI format being used, for example, using a DCI format indicator. The wireless device may append additional DCI fields based on one or more parameters and/or a sub-DCI format of received DCI. The wireless device may determine, for example, based on receiving sub-DCI corresponding to the first sub-DCI format 3004-1, additional parameters corresponding to VRB-to-PRB mapping, a PRB bundling size, a rate matching indicator, a ZP-CSI-trigger, a DAI, TPC, HARQ feedback related information, an SRS request, etc. The additional parameters may be determined based on one or more configuration messages (e.g., RRC configuration messages) and/or default values. The wireless device may receive a PDSCH transmission and/or send (e.g., transmit) a PUSCH transmission, for example, based on the received sub-DCI and/or the determined additional parameters.

FIG. 31 shows example DCI fields in second-stage DCI corresponding to different sub-DCI formats. A first sub-DCI format 3104-1 of second-stage DCI may comprise fields corresponding to second TB MCS, second TB RV, second TB NDI, a DAI and/or TPC. The first sub-DCI format 3104-1 may be used, for example, if HARQ-ACK feedback is not needed. A second sub-DCI format 3104-2 of the second-stage DCI may comprise fields corresponding to VRB-to-PRB mapping, a PRB bundling size, a rate matching indicator, a ZP-CSI trigger, a DAI, TPC, a PUCCH ARI, HARQ feedback timing, and/or an SRS request. The second sub-DCI format 3104-2 may be used, for example, if there a second TB is not scheduled or if the second TB is disabled. A third sub-DCI format 3104-3 of the second-stage DCI may comprise fields corresponding to VRB-to-PRB mapping, a PRB bundling size, a rate matching indicator, a ZP-CSI trigger, a second TB MCS, a second TB NDI, a second TB RV, a DAI, TPC, a PUCCH ARI, HARQ feedback timing, an SRS request, a puncturing indication, a transform precoder, and/or the like. The third sub-DCI format 3104-3 may comprise configured DCI fields of a DCI format that are not included in first-stage DCI. First-stage DCI may indicate an indicator (e.g., index) of a sub-DCI format corresponding to a second-stage DCI, for example, if multiple sub-DCI formats are configured for the second-stage DCI. First-stage DCI may comprise a field indicating a presence or absence of second-stage DCI, for example, if a single sub-DCI format is configured for the second-stage DCI.

A base station may use multiple-stage DCI for scheduling a semi-persistent scheduling (SPS) data (e.g., an SPS PDSCH transmission, a configured grant (CG) PUSCH transmission). The base station may use the multiple-stage DCI for activating and/or releasing one or more SPS configurations or CG configurations. The base station may use first-stage DCI in the multiple-stage DCI for activating and/or releasing the one or more SPS configurations or CG configurations. The first-stage DCI may be transmitted using an RNTI that is different from an RNTI for scheduling a dynamic scheduled PDSCH transmission and/or PUSCH transmission. One or more DCI fields in the first-stage DCI may be set to one or more preconfigured values that indicate a first code point for activation and/or a second code point to release.

A HARQ process number and a redundancy version may be preset with all zeros, for first-stage DCI corresponding to a multiple-stage DCI format, for activation. A HARQ process number and a redundancy version may be preset to all zeros (e.g., 0 . . . 0) for first-stage DCI for release, and an MCS and frequency domain may be set with all ones (e.g., 1 . . . 1) for release. A base station may or may not use the second-stage DCI for one or more SPS resources and/or CG resources. A wireless device, in response to receiving an activation DCI, may assume that one or more SPS resources and/or CG resources are activated, for which data may be scheduled without second-stage DCI. The base station may indicate, in first-stage DCI used for activation of an SPS configuration and/or CG configuration, a use of second-stage DCI.

A DCI field in the first-stage DCI may indicate if second-stage DCI may be transmitted. A DCI field in the first-stage DCI may indicate a second-stage DCI format (e.g., no use of second-stage DCI, a first second-stage DCI format, a second second-stage DCI format, etc.). A wireless device may expect second-stage DCI in one or more SPS PDSCHs, scheduled based on an activated SPS configuration, for example, if first-stage DCI activating the SPS configuration indicates a use of the second-stage DCI.

The wireless device may expect second-stage DCI in a first SPS PDSCH scheduled by an activation DCI, for example, if first-stage DCI corresponding to the activation indicates a use of the second-stage DCI. The wireless device may or may not expect the second-stage DCI in other SPS PDSCHs of an activated SPS configuration. The wireless device may blindly search for a presence of second-stage DCI in an SPS PDSCH corresponding to an activated SPS configuration, for example, if first-stage DCI corresponding to the activation indicates a use of the second-stage DCI. The wireless device may assume that an SPS PDSCH transmission will be mapped with rate matching around resources used for the second-stage DCI if the second-stage DCI is transmitted within the SPS PDSCH.

The wireless device may assume that second-stage DCI is not transmitted with the SPS PDSCH transmission, for example, if the wireless device does not detect the second-stage DCI. The wireless device may perform one or more operations and/or functionalities requested in the second-stage DCI, for example, based on receiving the second-stage DCI in the SPS PDSCH. The wireless device may, for example, transmit SRS. The base station may send (e.g., transmit) second-stage DCI outside of an allocated resource for an SPS PDSCH transmission, for example, if a wireless device may blindly detect a presence of the second-stage DCI. Transmitting the second-stage DCI outside of the allocated resource may reduce decoding error of the SPS PDSCH transmission as a rate matching pattern of the SPS PDSCH transmission may not be impacted by the detection of the second-stage DCI.

Figure 32:
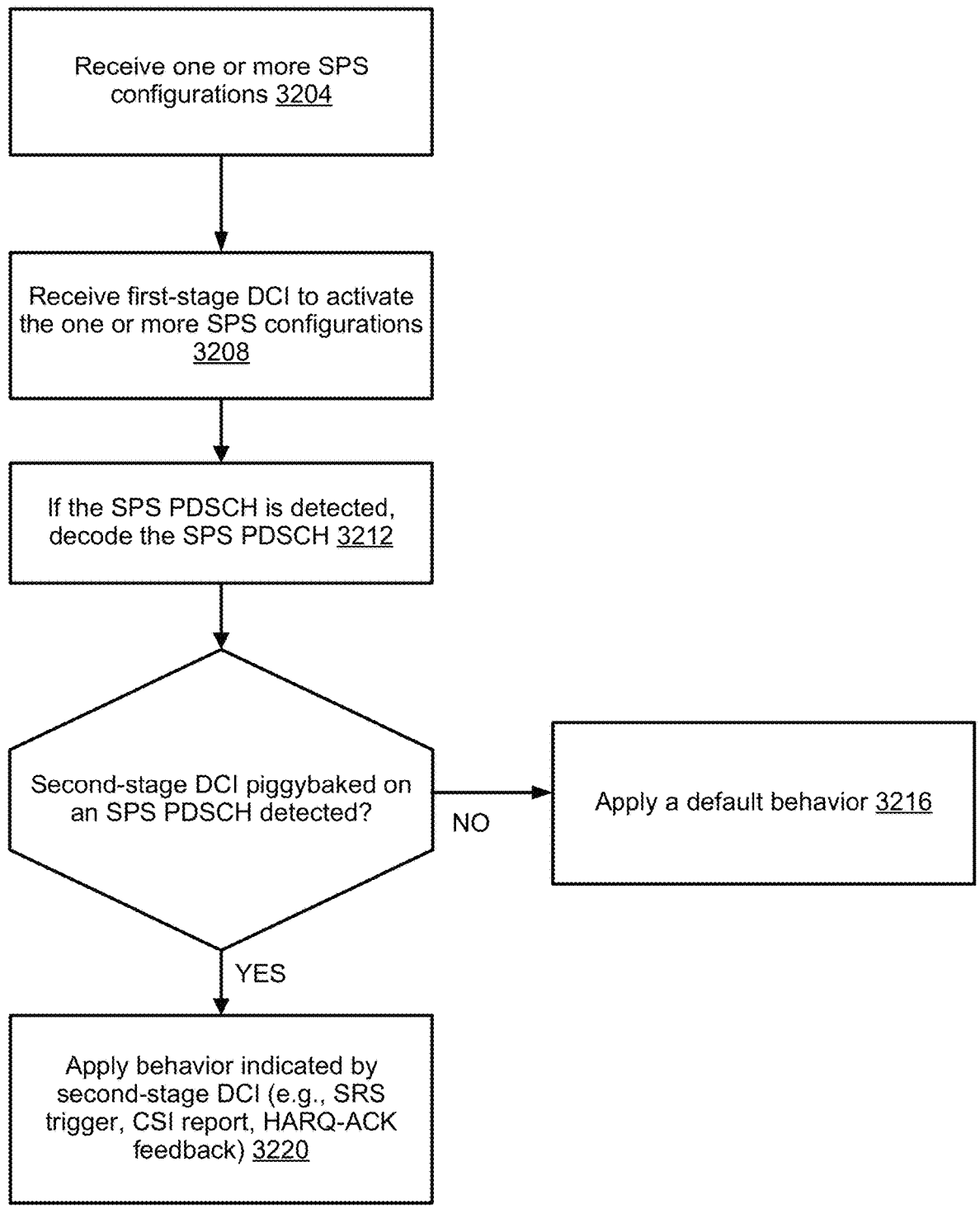
FIG. 32 shows an example method, at a wireless device, for multiple-stage DCI.

FIG. 32 shows an example method 3200 for multiple-stage DCI. For example, a wireless device may perform the method 3200. At step 3204, the wireless device may receive one or more SPS configurations. At step 3208, the wireless device may receive first-stage DCI as an activation message activating one or more SPS configurations. At step 3208, the wireless device may attempt to decode an SPS PDSCH transmission based on the first-stage DCI. The wireless device may attempt to receive second-stage DCI, for example, if the first-stage DCI indicates a presence of the second-stage DCI or if the wireless device is blindly searching for the second-stage DCI. At step 3220, the wireless device may perform one or more operations indicated and/or use parameters indicated by the second-stage DCI, for example, if the wireless device receives the second-stage DCI. At step 3216, the wireless device may perform default operations and/or use default values for example, if the wireless device does not receive the second-stage DCI.

Figure 33:
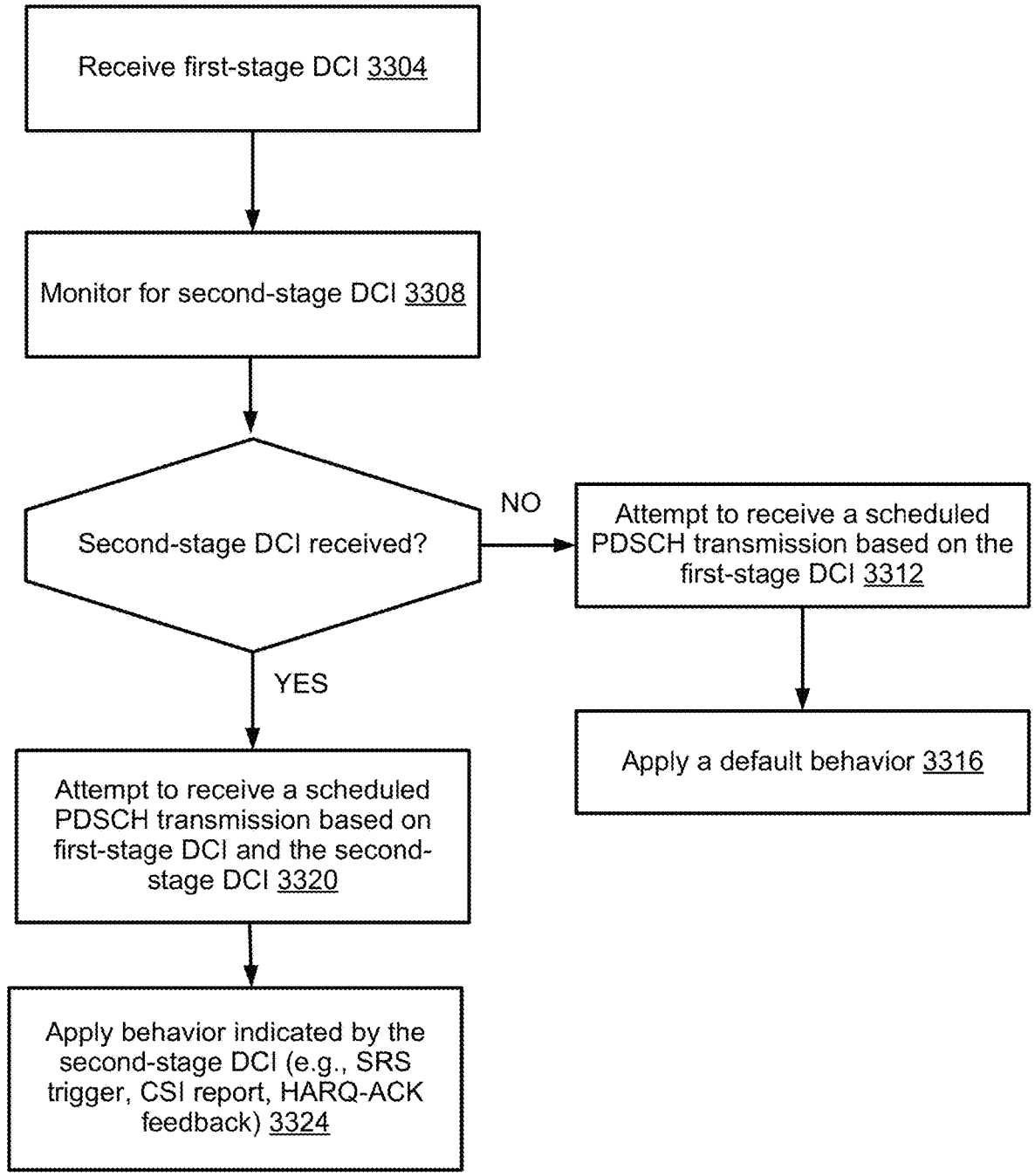
FIG. 33 shows an example method, at a wireless device, for multiple-stage DCI.

FIG. 33 shows an example method 3300 for multiple-stage DCI. For example, a wireless device may perform the method 3300. At step 3304, a wireless device may receive first-stage DCI (e.g., 1st level DCI). At step 3308, the wireless device may monitor a channel for second stage DCI (e.g., second level DCI). At step 3320, the wireless device 3320 may attempt to receive and/or decode a scheduled PDSCH based on the first-stage DCI, RRC parameters configured for the wireless device, and the second-stage DCI, for example, if the wireless device receives the second-stage DCI. At step 3324, the wireless device may perform one or more operations indicated by the second-stage DCI. At step 3312, the wireless device may attempt to receive and/or decode the scheduled PDSCH transmission based on the first-stage DCI and RRC parameters configured to the wireless device, for example, if the wireless device does not receive the second-stage DCI. At step 3316, the wireless device may perform default operations and/or use default values, for example, if the wireless device does not receive the second-stage DCI.

Figure 34:
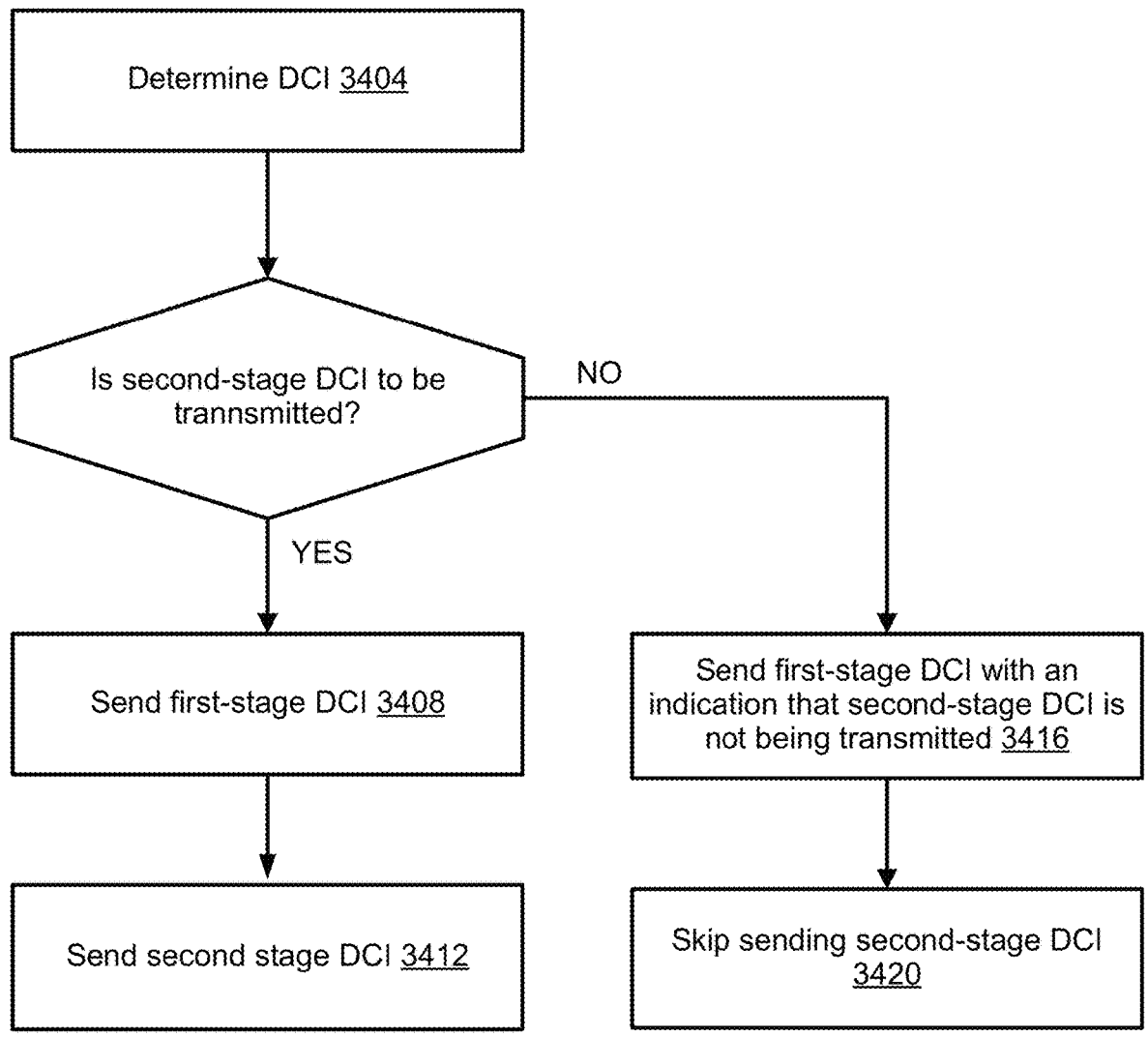
FIG. 34 shows an example method, at a base station, for multiple-stage DCI.

FIG. 34 shows an example method 3400 for multiple-stage DCI. For example, a base station may perform the method 3400. At step 3404, the base station may determine information corresponding to DCI to be sent to a wireless device. The base station may determine if multiple-stage DCI is to be sent comprising second-stage DCI. The base station may determine to skip sending the second-stage DCI, for example, if the channel conditions are poor and/or if a wireless device is not required to perform one or more actions (e.g., send HARQ feedback, send CSI feedback) etc. At step 3416, the base station may send first-stage DCI and indicate, in a field in the first-stage DCI, that the second-stage DCI is not being sent, for example, if the base station determines that the second-stage DCI is not to be sent. At step 3420, the base station may skip sending the second-stage DCI. At step 3408, the the base station may send first-stage DCI and indicate, in a field in the first-stage DCI, that the second-stage DCI is being sent, for example, if the base station determines that the second-stage DCI is not to be sent. At step 3412, the base station may send the second stage DCI. The second stage DCI may indicate parameters corresponding to a HARQ-ACK feedback.

A wireless device may receive first-stage DCI comprising a first DCI field. The first-stage DCI may indicate one or more first parameters of a single PDSCH occasion or a single PUSCH occasion. The first-stage DCI may indicate parameters for a single data channel occasion (e.g., for downlink transmission or uplink transmission). The single data channel may correspond to one or more transport block transmissions over a single slot or a plurality of slots. A single PDSCH or PUSCH occasion may correspond to a single slot or may correspond to a plurality of slots, in which repeated PDSCH transmissions or repeated PUSCH transmissions may be transmitted over the plurality of slots. A single PDSCH or PUSCH transmission may be transmitted over a plurality of slots, in which one or more transport blocks may be transmitted over the plurality of slots over a plurality of PDSCHs or a plurality of PUSCHs. The wireless device may receive second-stage DCI comprising a second DCI field. The second-stage DCI may indicate one or more second parameters of a plurality of PDSCH occasions or a plurality of PUSCH occasions. The wireless device may receive the first-stage DCI at slot n scheduling a PDSCH transmission at a slot n+2, and may receive the second-stage DCI at a slot n-k. The second-stage DCI may be applied on/used for one or more PDSCH transmissions from a slot n-m to a slot n+p (where 0<m<k, p>1). The wireless device may use the first-stage DCI received the slot n and the second-stage DCI received at the slot n-k to decode the PDSCH transmission at slot n+2. The wireless device may receive another first-stage DCI at a slot n+1 scheduling another PDSCH transmission at a slot n+1. The wireless device may use the another first-stage DCI and the second-stage DCI to decode the another PDSCH transmission at the slot n+1. The wireless device may determine DCI fields of multiple-stage DCI based on at least the first DCI field and the second DCI field. The wireless device may receive downlink data or send (e.g., transmit) uplink data based on the DCI fields.

The first-stage DCI may be transmitted via a PDCCH. The second-stage DCI may be transmitted via a PDCCH or PDSCH(s).

The second-stage DCI may be transmitted using one or more RRC messages via one or more PDSCHs. The wireless device may attempt to decode third-stage DCI, for example, based on receiving the first-stage DCI. The third-stage DCI may determine one or more parameters of the single PDSCH occasion or the single PUSCH occasion. The wireless device may attempt to decode the third-stage DCI in each reception of the first-stage DCI. The wireless device may determine a third DCI field of the multiple-stage DCI based on the third-stage DCI, for example, based on successfully receiving the third-stage DCI. The third DCI field of the third-stage DCI may override the second DCI field of the second-stage DCI. The wireless device may determine the DCI fields of the multiple-stage DCI based on at least the first DCI field and the third DCI field, for example, if the wireless device successfully receives the third DCI. The wireless device may determine the DCI fields of the multiple-stage DCI based on at least the first DCI field and the second DCI field, for example, if the wireless device does not successfully receive the third DCI.

A base station may send (e.g., transmit) first DCI and second DCI for data scheduling (e.g., downlink transmission and/or uplink transmission). The base station may configure one or more parameters comprising values of DCI fields of the second DCI. A wireless device may attempt to decode the first DCI. The wireless device may attempt to decode the second DCI, for example, based on (e.g., in response to) successful decoding of the first DCI. The wireless device may use, for receiving and/or transmitting the scheduled data, indicated values of parameters in DCI fields from the first DCI and indicated values of parameters DCI fields from the second DCI, for example, based on the successful decoding of the second DCI. The wireless device may use, for receiving and/or transmitting the scheduled data, indicated values of parameters in DCI fields from the first DCI and the one or more parameters configured by the base station, for example, if the wireless device fails to receive/decode the second DCI. DCI fields of the first DCI may comprise a frequency domain resource allocation, a time domain resource allocation, an MCS, an antenna ports indication, and/or the like. DCI fields of the second DCI may comprise a PUCCH resource indicator, PDSCH-to-HARQ feedback timing, SRS trigger, and/or the like. The base station may configure a disabled HARQ operation for the one or more parameters (e.g., no PUCCH resource, not applicable timing for PDSCH-to-HARQ feedback timing, no SRS trigger).

The second-stage DCI may be transmitted via a second PDCCH. The second PDCCH may comprise one or more second-stage DCIs of one or more wireless devices. The second PDCCH may comprise one or more second-stage DCIs of a single wireless device. The first-stage DCI may indicate an indicator (e.g., index) to indicate a selected second-stage DCI from the one or more second-stage DCIs. The second PDCCH may activate one or more second-stage DCIs or may deactivate one or more second-stage DCIs. The first-stage DCI may indicate an index to indicate a selected second-stage DCI from active second-stage DCIs. The second-stage DCI may comprise a frequency domain resource allocation, a time-domain resource allocation, and/or MCS indication.

The wireless device may receive one or more RRC messages. The one or more RRC messages may comprise one or more SPR configurations. An SPR configuration may comprise a periodicity and an offset. SPRs may be based on the periodicity and starting offset. The second-stage DCI may activate one or more SPR configurations. The second-stage DCI may allocate a frequency-domain resource allocation, a time-domain resource allocation (e.g., quantity/number of OFDM symbols, starting and ending OFDM symbols in a slot, MCS, etc.) for the activated SPR. The first-stage DCI may comprise an index of an SPR configuration among the one or more active semi-persistent resource configurations.

The base station may send (e.g., transmit) one or more repetitions of first-stage DCI. The base station may send (e.g., transmit) single second-stage DCI. The one or more repetitions of the first-stage DCI may be transmitted in a same slot or over a plurality of slots. The one or more repetitions of the first-stage DCI may indicate a same frequency domain and/or a same time-domain resource allocation for a scheduled PDSCH occasion or a scheduled PUSCH occasion. A first repetition of the first-stage DCI may be transmitted in a slot n and schedule a PDSCH transmission in a slot n+2. The time domain resource allocation in the first repetition indicates that a gap between the first-stage DCI and its scheduled PDSCH is 2. A second repetition of the first-stage DCI may be transmitted in a slot n+1. The second repetition indicate a gap of 1 to schedule a same resource as scheduled by the first repetition.

A wireless device may receive one or more RRC messages. The one or more RRC messages may comprise one or more parameters used for a default behavior and/or operation based on failure in detecting of a second-stage DCI. The one or more RRC messages may comprise one or more search space configurations, and one or more DCI formats to be monitored in a search space. The one or more RRC messages may indicate a first search space with a first DCI format, wherein the first DCI format comprises multiple DCI stages. The first DCI format may comprise a first sub-DCI format used for a first-stage DCI. The first DCI format may comprise a second sub-DCI format used for a second-stage DCI. One or more first DCI fields of the first DCI format may be transmitted using the first-stage DCI format. One or more second DCI fields of the first DCI format may be transmitted using the second-stage DCI format. The first DCI format may have same set of DCI fields as a DCI format 0_0, a DCI format 1_0, DCI format 1_1, or DCI format 0_1. The first-stage DCI format may comprise one or more third DCI fields (e.g., comprising an indication of a second-stage DCI). The wireless device may receive the first-stage DCI corresponding to the first DCI format. The one or more first DCI fields in the first-stage DCI may comprise resource allocation fields (e.g. indication a frequency domain resource allocation and/or a time domain resource allocation), MCS field, an NDI field and a redundancy version field. The one or more third DCI fields in the first-stage DCI may comprise information corresponding to the second-stage DCI (e.g., a code rate of the second-stage DCI, an indication of a presence of the second-stage DCI, and/or a quantity/number of resource elements used for the second-stage DCI). The wireless device may attempt to decode the second-stage DCI, for example, based on successfully decoding the first-stage DCI. The wireless device may successfully decode the second state DCI. The wireless device may attempt to decode a scheduled PDSCH transmission or encode a scheduled PUSCH transmission based on at least DCI fields from the first-stage DCI and the second-stage DCI. The wireless device may perform one or more requested functionalities and/or operations (e.g., HARQ-ACK feedback, SRS transmission, CSI feedback, etc.), based on at least the first-stage DCI and the second-stage DCI. The wireless device may attempt to decode a scheduled PDSCH transmission or encode a scheduled PUSCH transmission based on at least DCI fields from the first-stage DCI and the one or more parameters of default behavior, for example, if the wireless device fails to decode the second-stage DCI. The wireless device may perform one or more requested functionalities and/or operations (e.g., HARQ-ACK feedback, SRS transmission, CSI feedback, etc.), for example, based on at least the first-stage DCI and the one or more parameters of default behavior. The one or more parameters of the default behavior may indicate disabling HARQ-ACK feedback, SRS transmission, and/or CSI feedback.

A DCI field of the one or more third DCI fields for the first-stage DCI of the first DCI may indicate presence (or absence) of the second-stage DCI, a first sub-format of the second-stage DCI, a second sub-format of the second-stage DCI, etc. The base station may send (e.g., transmit) one or more RRC messages comprising the first sub-format and the second sub-format of the second-stage DCI.

A wireless device may receive a first DCI. The first DCI may comprise a plurality of sets of values. Each set of values corresponds to a set of DCI fields. The wireless device may receive second DCI. The second DCI may comprise a resource assignment for downlink data and/or uplink data. The second DCI may comprise an indicator (e.g., index) indicating a set of values from the plurality of sets of values indicated in the first DCI. The wireless device may determine one or more DCI fields for receiving (transmitting) the downlink data (uplink data), for example, based on receiving the second DCI. The wireless device may determine one or more DCI fields based on the set of values indicated by the index and one or more other DCI fields in the second DCI. The wireless device may receive (transmit) the downlink data (uplink data) based on the determining. The first DCI may comprise two sets indicating respective PUCCH ARI and HARQ feedback timing. The first set may indicate that PUCCH ARI and HARQ feedback timing are both disabled. The second set may indicate that PUCCH ARI is a lowest indexed PUCCH resource (or any other PUCCH resource) and HARQ feedback timing is equal to K slots. The second DCI may comprise an indication selecting a set from the first set and the second set. The wireless device may disable HARQ-ACK feedback and/use a default parameter for HARQ-ACK feedback (e.g., a default quantity of slots), for example, if the second DCI indicates the first set.

The first DCI may be based on a first DCI format. The second DCI may be based on a second DCI format. The wireless device may receive the first DCI and the second DCI at different times. The wireless device may use a most recently received DCI based on the first DCI format for consideration with the indication in the second DCI. The set of values may comprise a PUCCCH resource indicator, a CSI feedback trigger, an SRS trigger, and a TPC command. The wireless device may use a set of default values, for example, if the wireless device receiving a second DCI with no available first DCI. The base station may configure the set of default values via RRC signaling. The set of default values may indicate, for example, disabling of HARQ-ACK feedback, disabling of CSI feedback, no SRS trigger, and a TPC value of 0 dB.

A wireless device may perform a method comprising multiple operations. The wireless device may receive one or more radio resource control messages indicating (e.g., comprising) configuration parameters for multi-stage downlink control information (DCI). The wireless device may receive a first-stage DCI, of the multi-stage DCI, comprising: an indication of allocated resources; and information associated with a second-stage DCI of the multi-stage DCI. The wireless device may receive, via the allocated resources (e.g., based on the first-stage DCI), data. The wireless device may determine to skip a scheduled transmission associated with the multi-stage DCI, based on at least one of: the information associated with the second-stage DCI indicating an absence of the second-stage DCI; or an unsuccessful decoding of the second-stage DCI. The wireless device may also perform one or more additional operations. The determining to skip the scheduled transmission may be based on the information associated with the second-stage DCI indicating the absence of the second-stage DCI. The wireless device may perform, based on the information associated with the second-stage DCI, a decoding operation for the second-stage DCI. The decoding operation may comprise the unsuccessful decoding of the second-stage DCI and the determining to skip the scheduled transmission may be based on the unsuccessful decoding of the second-stage DCI. The scheduled transmission may comprise at least one of: hybrid automatic repeat request acknowledgement (HARQ-ACK) feedback associated with the data; a sounding reference signal; or channel state information (CSI) feedback associated with the multi-stage DCI. The one or more radio resource control messages may further indicate: a default behavior associated with skipping the scheduled transmission; and a search space associated with the multi-stage DCI. The allocated resources may comprise at least one of: a downlink resource for a physical downlink shared channel (PDSCH); or a resource for a sidelink. The wireless device may, after the unsuccessful decoding of the second-stage DCI, successfully decode the second-stage DCI. The wireless device may transmit, based on the second-stage DCI, a message. The wireless device may determine to skip decoding the second-stage DCI, based on the information associated with the second-stage DCI indicating the absence of the second-stage DCI. The first-stage DCI may indicate at least one resource for the second-stage DCI. The information associated with the second-stage DCI may indicate a format used for the second-stage DCI. The one or more radio resource control messages may indicate one or more formats used for the second-stage DCI, wherein second-stage DCI may indicate a first format from the one or more formats. The second-stage DCI may indicate at least one of: a physical uplink control channel (PUCCH) resource of one or more PUCCH resources; and a time gap between the data and a hybrid automatic repeat request acknowledgement (HARQ-ACK) feedback associated with the data. The first-stage DCI may be received via a physical downlink control channel (PDCCH). The second-stage DCI may be multiplexed with data scheduled by the first-stage DCI. The second-stage DCI may be received via a physical downlink control channel (PDCCH). The second-stage DCI may be received via one or more second radio resource control (RRC) messages or one or more medium access control (MAC) control elements. The wireless device may determine at least one resource for the second-stage DCI based on the allocated resources. At least one resource for the second-stage DCI may overlap with the allocated resources. At least one resource for the second-stage DCI may be adjacent to the allocated resources. The first-stage DCI may indicate at least one of: a frequency domain resource allocation; a time domain resource allocation comprising an offset between the first-stage DCI and the data; a modulation and coding scheme; or one or more parameters related to demodulation reference signals. The second-stage DCI may indicate a downlink assignment index, wherein the scheduled transmission is based on the downlink assignment index. Systems, devices and media may be configured with the method. A wireless device may comprise one or more processors; and memory storing instructions that, when executed, cause the wireless device to perform the described method, additional operations and/or include the additional elements. A system may comprise a wireless device configured to perform the described method, additional operations and/or include the additional elements; and a base station configured to send the first-stage DCI. A computer-readable medium may store instructions that, when executed, cause performance of the described method, additional operations and/or include the additional elements.

A wireless device may perform a method comprising multiple operations. The wireless device may receive one or more radio resource control messages indicating configuration parameters for multi-stage downlink control information (DCI). The wireless device may receive a first-stage DCI, of the multi-stage DCI, comprising: an indication of allocated resources; and information associated with a second-stage DCI of the multi-stage DCI. The wireless device may receive, via the allocated resources (e.g., based on the first-stage DCI), data. The wireless device may perform, based on the information associated with the second-stage DCI, a decoding operation for the second-stage DCI. The wireless device may determine, based on the decoding operation for the second-stage DCI being unsuccessful, to skip a scheduled transmission. The wireless device may also perform one or more additional operations. The determining to skip the scheduled transmission may be further based on the information associated with the second-stage DCI indicating an absence of the second-stage DCI. The scheduled transmission may comprise at least one of: hybrid automatic repeat request acknowledgement (HARQ-ACK) feedback associated with the data; a sounding reference signal; or channel state information (CSI) feedback associated with the multi-stage DCI. The one or more radio resource control messages may further indicate: a default behavior associated with skipping the scheduled transmission; and a search space associated with the multi-stage DCI. The allocated resources may comprise at least one of: a downlink resource for a physical downlink shared channel (PDSCH); or a resource for a sidelink. The information associated with the second-stage DCI may indicate a presence of the second-stage DCI. Systems, devices and media may be configured with the method. A wireless device may comprise one or more processors; and memory storing instructions that, when executed, cause the wireless device to perform the described method, additional operations and/or include the additional elements. A system may comprise a wireless device configured to perform the described method, additional operations and/or include the additional elements; and a base station configured to send the first-stage DCI. A computer-readable medium may store instructions that, when executed, cause performance of the described method, additional operations and/or include the additional elements.

A wireless device may perform a method comprising multiple operations. The wireless device may receive one or more radio resource control messages indicating configuration parameters for multi-stage downlink control information (DCI). The wireless device may receive a first-stage DCI, of the multi-stage DCI, comprising: an indication of allocated resources; and information associated with a second-stage DCI of the multi-stage DCI. The wireless device may receive, via the allocated resources (e.g., based on the first-stage DCI), data. The wireless device may determine, based on the information associated with the second-stage DCI, an absence of the second-stage DCI. The wireless device may determine, based on the absence of the second-stage DCI, to skip a scheduled transmission. The wireless device may also perform one or more additional operations. The scheduled transmission may comprise at least one of: hybrid automatic repeat request acknowledgement (HARQ-ACK) feedback associated with the data; a sounding reference signal; or channel state information (CSI) feedback associated with the multi-stage DCI. The one or more radio resource control messages may indicate: a default behavior associated with skipping the scheduled transmission; and a search space associated with the multi-stage DCI. The allocated resources may comprise at least one of: a downlink resource for a physical downlink shared channel (PDSCH); or a resource for a sidelink. The first-stage DCI may indicate at least one resource for the second-stage DCI. Systems, devices and media may be configured with the method. A wireless device may comprise one or more processors; and memory storing instructions that, when executed, cause the wireless device to perform the described method, additional operations and/or include the additional elements. A system may comprise a wireless device configured to perform the described method, additional operations and/or include the additional elements; and a base station configured to send the first-stage DCI. A computer-readable medium may store instructions that, when executed, cause performance of the described method, additional operations and/or include the additional elements.

A wireless device may perform a method comprising multiple operations. The wireless device may receive a first-stage DCI comprising a first downlink control information (DCI) field, wherein the first-stage DCI comprises parameters of a single physical downlink scheduled channel (PDSCH) occasion. The wireless device may receive a second-stage DCI comprising a second DCI field, wherein the second-stage DCI comprises parameters of a plurality of PDSCH occasions. The wireless device may receive, based on the first-stage DCI and the second-stage DCI, downlink data. Systems, devices and media may be configured with the method. A wireless device may comprise one or more processors; and memory storing instructions that, when executed, cause the wireless device to perform the described method, additional operations and/or include the additional elements. A system may comprise a wireless device configured to perform the described method, additional operations and/or include the additional elements; and a base station configured to send the first-stage DCI. A computer-readable medium may store instructions that, when executed, cause performance of the described method, additional operations and/or include the additional elements.

A wireless device may perform a method comprising multiple operations. The wireless device may receive a first-stage DCI comprising a first downlink control information (DCI) field, wherein the first-stage DCI comprises parameters of a single physical uplink scheduled channel (PUSCH) occasion. The wireless device may receive a second-stage DCI comprising a second DCI field, wherein the second-stage DCI comprises parameters of a plurality of PUSCH occasions. The wireless device may send, based on the first-stage DCI and the second-stage DCI, uplink data. Systems, devices and media may be configured with the method. A wireless device may comprise one or more processors; and memory storing instructions that, when executed, cause the wireless device to perform the described method, additional operations and/or include the additional elements. A system may comprise a wireless device configured to perform the described method, additional operations and/or include the additional elements; and a base station configured to send the first-stage DCI. A computer-readable medium may store instructions that, when executed, cause performance of the described method, additional operations and/or include the additional elements.

A wireless device may perform a method comprising multiple operations. The wireless device may receive one or more radio resource control messages indicating one or more parameters of a default behavior. The wireless device may receive a first-stage downlink control information (DCI), of a multi-stage DCI, comprising a resource allocation for a physical downlink scheduled channel (PDSCH) and information for a second-stage DCI of the multi-stage DCI. The wireless device may receive, via the resource allocation, a PDSCH transmission. The wireless device may receive the second-stage DCI of the multi-stage DCI. The wireless device may perform, based on the information for the second-stage DCI, a decoding operation of the second-stage DCI. The wireless device may apply, based on the result of decoding being successful, one or more parameters of the second-stage DCI. The wireless device may apply, based on the result of decoding being unsuccessful, the one or more parameters of the default behavior. Systems, devices and media may be configured with the method. A wireless device may comprise one or more processors; and memory storing instructions that, when executed, cause the wireless device to perform the described method, additional operations and/or include the additional elements. A system may comprise a wireless device configured to perform the described method, additional operations and/or include the additional elements; and a base station configured to send the first-stage DCI. A computer-readable medium may store instructions that, when executed, cause performance of the described method, additional operations and/or include the additional elements.

Figure 35:
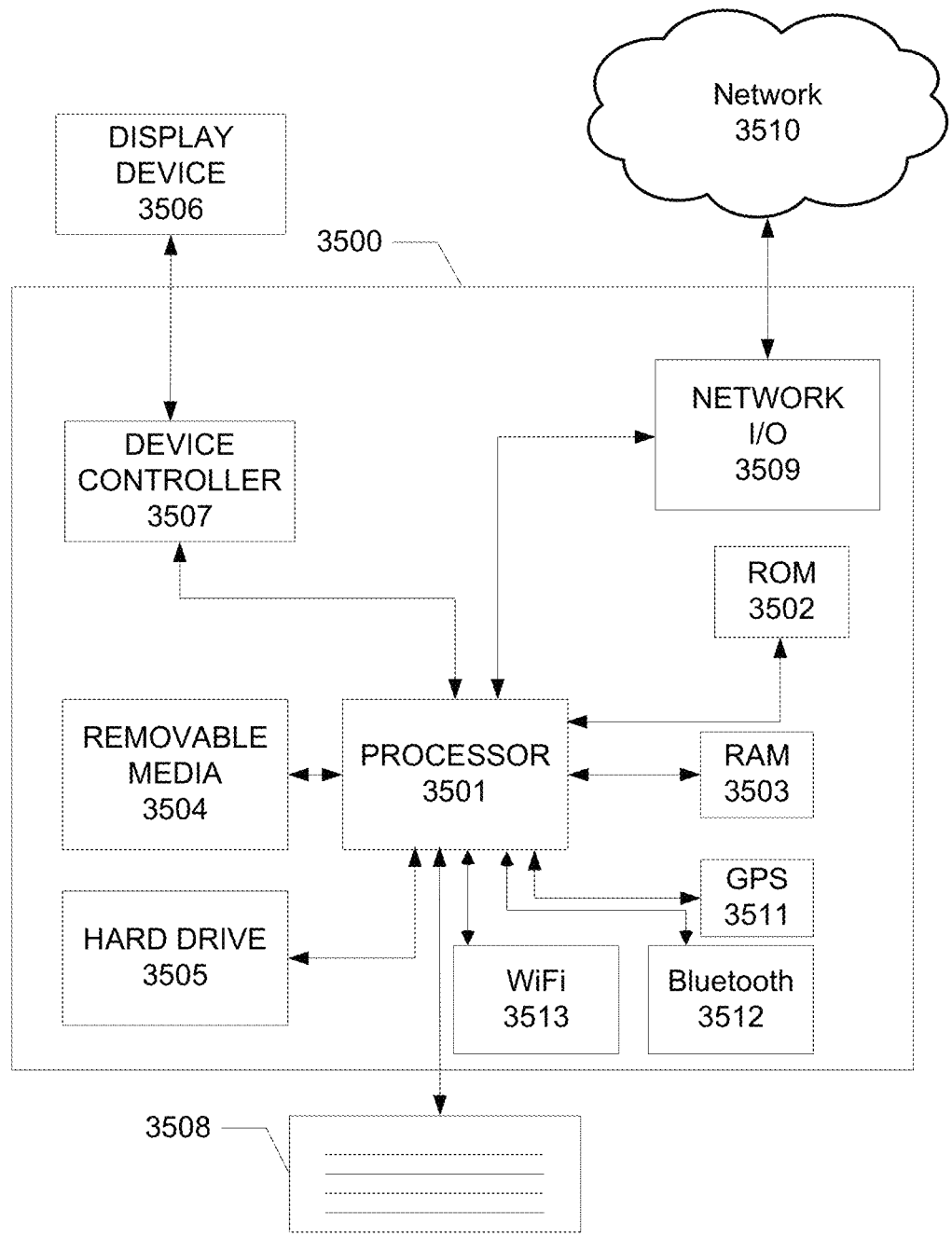
FIG. 35 shows example elements of a computing device that may be used to implement any of the various devices described herein.

FIG. 35 shows example elements of a computing device that may be used to implement any of the various devices described herein, including, e.g., the base station 120A and/or 120B, the wireless device 110 (e.g., 110A and/or 110B), or any other base station, wireless device, or computing device described herein. The computing device 3500 may include one or more processors 3501, which may execute instructions stored in the random-access memory (RAM) 3503, the removable media 3504 (such as a Universal Serial Bus (USB) drive, compact disk (CD) or digital versatile disk (DVD), or floppy disk drive), or any other desired storage medium. Instructions may also be stored in an attached (or internal) hard drive 3505. The computing device 3500 may also include a security processor (not shown), which may execute instructions of one or more computer programs to monitor the processes executing on the processor 3501 and any process that requests access to any hardware and/or software components of the computing device 3500 (e.g., ROM 3502, RAM 3503, the removable media 3504, the hard drive 3505, the device controller 3507, a network interface 3509, a GPS 3511, a Bluetooth interface 3512, a WiFi interface 3513, etc.). The computing device 3500 may include one or more output devices, such as the display 3506 (e.g., a screen, a display device, a monitor, a television, etc.), and may include one or more output device controllers 3507, such as a video processor. There may also be one or more user input devices 3508, such as a remote control, keyboard, mouse, touch screen, microphone, etc. The computing device 3500 may also include one or more network interfaces, such as a network interface 3509, which may be a wired interface, a wireless interface, or a combination of the two. The network interface 3509 may provide an interface for the computing device 3500 to communicate with a network 3510 (e.g., a RAN, or any other network). The network interface 3509 may include a modem (e.g., a cable modem), and the external network 3510 may include communication links, an external network, an in-home network, a provider's wireless, coaxial, fiber, or hybrid fiber/coaxial distribution system (e.g., a DOCSIS network), or any other desired network. Additionally, the computing device 3500 may include a location-detecting device, such as a global positioning system (GPS) microprocessor 3511, which may be configured to receive and process global positioning signals and determine, with possible assistance from an external server and antenna, a geographic position of the computing device 3500.

The example in FIG. 35 may be a hardware configuration, although the components shown may be implemented as software as well. Modifications may be made to add, remove, combine, divide, etc. components of the computing device 3500 as desired. Additionally, the components may be implemented using basic computing devices and components, and the same components (e.g., processor 3501, ROM storage 3502, display 3506, etc.) may be used to implement any of the other computing devices and components described herein. For example, the various components described herein may be implemented using computing devices having components such as a processor executing computer-executable instructions stored on a computer-readable medium, as shown in FIG. 35. Some or all of the entities described herein may be software based, and may co-exist in a common physical platform (e.g., a requesting entity may be a separate software process and program from a dependent entity, both of which may be executed as software on a common computing device).

The disclosed mechanisms herein may be performed if certain criteria are met, for example, in a wireless device, a base station, a radio environment, a network, a combination of the above, and/or the like. Example criteria may be based on, for example, wireless device and/or network node configurations, traffic load, initial system set up, packet sizes, traffic characteristics, a combination of the above, and/or the like. If the one or more criteria are met, various examples may be used. It may be possible to implement examples that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. A base station communicating with a plurality of wireless devices may refer to base station communicating with a subset of the total wireless devices in a coverage area. Wireless devices referred to herein may correspond to a plurality of wireless devices of a particular LTE or 5G release with a given capability and in a given sector of a base station. A plurality of wireless devices may refer to a selected plurality of wireless devices, and/or a subset of total wireless devices in a coverage area. Such devices may operate, function, and/or perform based on or according to drawings and/or descriptions herein, and/or the like. There may be a plurality of base stations or a plurality of wireless devices in a coverage area that may not comply with the disclosed methods, for example, because those wireless devices and/or base stations perform based on older releases of LTE or 5G technology.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:

1. A method comprising:
  receiving, by a wireless device, one or more radio resource control messages indicating configuration parameters for multi-stage downlink control information (DCI);
  receiving first-stage DCI of the multi-stage DCI, wherein the first-stage DCI comprises:
    an indication of allocated resources; and
    information associated with second-stage DCI of the multi-stage DCI;
  receiving, by the wireless device and via the allocated resources, data; and
  determining to skip a scheduled transmission, of the wireless device, that is associated with the multi-stage DCI, wherein the skip is based on at least one of:
    the information associated with the second-stage DCI indicating an absence of the second-stage DCI; or
    an unsuccessful decoding of the second-stage DCI.

2. The method of claim 1, wherein the skip is based on the information associated with the second-stage DCI indicating the absence of the second-stage DCI.

3. The method of claim 1, further comprising:
  performing, based on the information associated with the second-stage DCI, a decoding operation for the second-stage DCI, wherein the decoding operation comprises the unsuccessful decoding of the second-stage DCI, and wherein the skip is based on the unsuccessful decoding of the second-stage DCI.

4. The method of claim 1, wherein the scheduled transmission comprises at least one of:
hybrid automatic repeat request acknowledgement (HARQ-ACK) feedback associated with the data;
a sounding reference signal; or
channel state information (CSI) feedback associated with the multi-stage DCI.

5. The method of claim 1, wherein the one or more radio resource control messages further indicate:
a default behavior associated with skipping the scheduled transmission; and
a search space associated with the multi-stage DCI.

6. The method of claim 1, wherein the allocated resources comprise at least one of:
a downlink resource for a physical downlink shared channel (PDSCH); or
a resource for a sidelink.

7. The method of claim 1, further comprising:
after the unsuccessful decoding of the second-stage DCI, successfully decoding the second-stage DCI; and
transmitting, based on the second-stage DCI, a message.

8. The method of claim 1, further comprising:
determining to skip decoding the second-stage DCI, based on the information associated with the second-stage DCI indicating the absence of the second-stage DCI.

9. The method of claim 1, wherein the first-stage DCI indicates at least one resource for the second-stage DCI.

10. A method comprising:
receiving, by a wireless device, one or more radio resource control messages indicating configuration parameters for multi-stage downlink control information (DCI);
receiving first-stage DCI of the multi-stage DCI, wherein the first-stage DCI comprises:
an indication of allocated resources; and
information associated with second-stage DCI of the multi-stage DCI;
receiving, by the wireless device and via the allocated resources, data;
performing, based on the information associated with the second-stage DCI, a decoding operation for the second-stage DCI; and
determining, based on the decoding operation for the second-stage DCI being unsuccessful, to skip a scheduled transmission of the wireless device.

11. The method of claim 10, wherein the scheduled transmission comprises at least one of:
hybrid automatic repeat request acknowledgement (HARQ-ACK) feedback associated with the data;
a sounding reference signal; or
channel state information (CSI) feedback associated with the multi-stage DCI.

12. The method of claim 10, wherein the one or more radio resource control messages further indicate:
a default behavior associated with skipping the scheduled transmission; and
a search space associated with the multi-stage DCI.

13. The method of claim 10, wherein the allocated resources comprise at least one of:
a downlink resource for a physical downlink shared channel (PDSCH); or
a resource for a sidelink.

14. The method of claim 10, wherein the information associated with the second-stage DCI indicates a presence of the second-stage DCI.

15. A method comprising:
receiving, by a wireless device, one or more radio resource control messages indicating configuration parameters for multi-stage downlink control information (DCI);
receiving first-stage DCI of the multi-stage DCI, wherein the first-stage DCI comprises:
an indication of allocated resources; and
information associated with second-stage DCI of the multi-stage DCI;
receiving, by the wireless device and via the allocated resources, data;
determining, based on the information associated with the second-stage DCI, an absence of the second-stage DCI; and
determining, based on the absence of the second-stage DCI, to skip a scheduled transmission of the wireless device.

16. The method of claim 15, wherein the scheduled transmission comprises at least one of:
hybrid automatic repeat request acknowledgement (HARQ-ACK) feedback associated with the data;
a sounding reference signal; or
channel state information (CSI) feedback associated with the multi-stage DCI.

17. The method of claim 15, wherein the one or more radio resource control messages further indicate:
a default behavior associated with skipping the scheduled transmission; and
a search space associated with the multi-stage DCI.

18. The method of claim 15, wherein the allocated resources comprise at least one of:
a downlink resource for a physical downlink shared channel (PDSCH); or
a resource for a sidelink.

19. The method of claim 15, wherein the first-stage DCI indicates at least one resource for the second-stage DCI.

20. The method of claim 15, wherein the information associated with the second-stage DCI indicates the absence of the second-stage DCI.

* * * * *